US008666801B2

(12) United States Patent     (10) Patent No.:    US 8,666,801 B2
Cho                                                   (45) Date of Patent:    Mar. 4, 2014

(54) LONG-RANGE LOCATION-SPECIFIC MENU-DRIVEN MOBILE PAYMENT PLATFORM MOUNTED ON VEHICLE DASHTOP

(75) Inventor: Kyu Hwang Cho, Fairfield, CA (US)

(73) Assignee: ErgonoTech, Inc., Wilmington, DE (US)

( * ) Notice: Subject to any disclaimer, the term of this patent is extended or adjusted under 35 U.S.C. 154(b) by 0 days.

(21) Appl. No.: 11/758,004

(22) Filed: Jun. 5, 2007

(65) Prior Publication Data

US 2008/0208680 A1     Aug. 28, 2008

Related U.S. Application Data

(60) Provisional application No. 60/804,061, filed on Jun. 6, 2006.

(51) Int. Cl.
     *G07B 15/00*      (2011.01)
(52) U.S. Cl.
     USPC ............................................................. 705/13
(58) Field of Classification Search
     USPC .......................................................... 705/13
     See application file for complete search history.

(56) References Cited

U.S. PATENT DOCUMENTS

| | | | |
|---|---|---|---|
| 2005/0060069 A1* | 3/2005 | Breed et al. ..................... | 701/29 |
| 2006/0184456 A1* | 8/2006 | de Janasz ......................... | 705/72 |
| 2007/0050240 A1* | 3/2007 | Belani et al. .................... | 705/13 |
| 2007/0061155 A1* | 3/2007 | Ji et al. ............................ | 705/1 |

OTHER PUBLICATIONS

Jiji Press English News Service, "Automated Road Toll Gates Debuting in Japan Mar. 30," Tokyo, Jan. 29, 2001, 1.*

* cited by examiner

*Primary Examiner* — Nathan Erb

(57) ABSTRACT

A method, computer system, and non-transitory computer-readable medium storing software for performing wireless payment of road tolls from a vehicle. An in-vehicle device includes a way for a vehicle occupant to communicate input to the device, as well as a screen for outputting data to the vehicle occupant. The device communicates with a base station, exchanging various codes and data, including a method of payment for the toll selected by the vehicle occupant. Eventually, the device acquires a Gate ID code from the base station, which is then transmitted to the tollroad gate prior to the vehicle passing that tollroad gate. Codes are created using a particular described approach.

3 Claims, 90 Drawing Sheets

WELCOME SCREEN – MetroGate OnGate

Welcome Screen for MG OnGate

Welcome stays on for 20 seconds unless "BACK" key is hit to resume the previous screen.
At bottom left of the screen, GFT is a location code indicating the location of the tollgate.

If User is driving on the OffGate stretch, then User may hit 'NEXT MOVE' key to
do sessions other than OnGate.

If a differential toll system is enforced during the time indicated on screen, then
<$3.00 + $5.00> shows up on screen, indicating a regular toll for $3.00 and a differential toll of
an extra $5.00>.

The START button begins to blink, the moment the Welcome screen is on.
It keeps blinking for 20 seconds, during which it is enabled to send the stored vehicle data <VIN
PLUS> to GMAN, the BS for a 'DriveOn Pay' tollgate.
It blinks in red so as to catch the eye of User immediately. Besides, VIMO delivers a brief speech
as a secondary alert to User.

Meantime, the SHOOT button starts to blink in green, after User has picked and sent a payment
option on the next screen <Payment Option Menu> and the picked option has been authorized
by either GMAN dBase or by Payment Service Provider.

Fig. 1 WELCOME SCREEN – MetroGate OnGate formerly Fig.10.1 Welcome Screen for MG OnGate

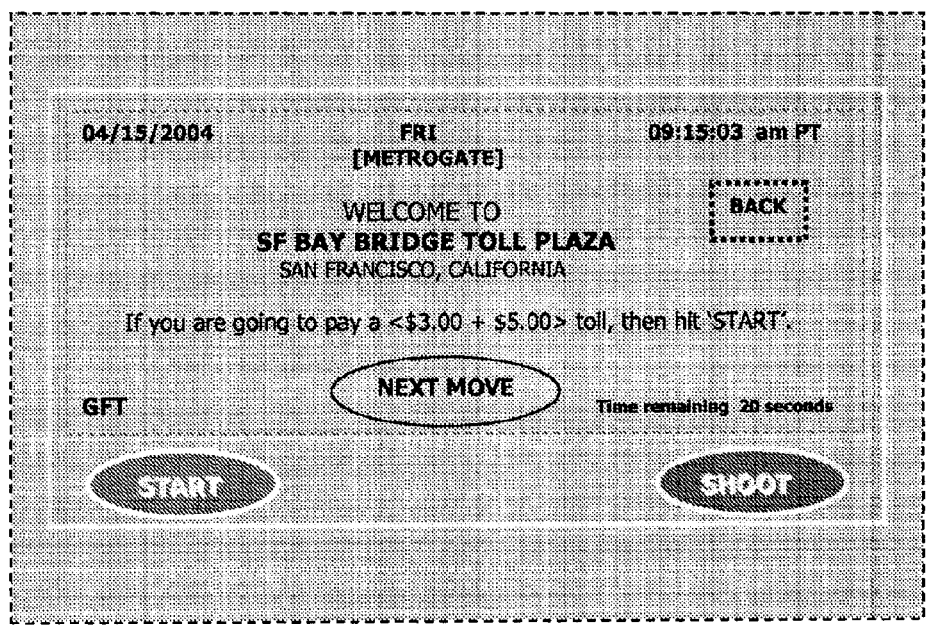

Welcome stays on for 20 seconds unless "BACK" key is hit to resume the previous screen.
At bottom left of the screen, GFT is a location code indicating the location of the tollgate.

If User is driving on the OffGate stretch, then User may hit 'NEXT MOVE' key to
do sessions other than OnGate.

If a differential toll system is enforced during the time indicated on screen, then
<$3.00 + $5.00> shows up on screen, indicating a regular toll for $3.00 and a differential toll of
an extra $5.00>.

The START button begins to blink, the moment the Welcome screen is on.
It keeps blinking for 20 seconds, during which it is enabled to send the stored vehicle data <VIN PLUS> to GMAN, the BS for a 'DriveOn Pay' tollgate.
It blinks in red so as to catch the eye of User immediately. Besides, VIMO delivers a brief speech as a secondary alert to User.

Meantime, the SHOOT button starts to blink in green, after User has picked and sent a payment option on the next screen <Payment Option Menu> and the picked option has been authorized by either GMAN dBase or by Payment Service Provider.

MENU PAGE
Fig. 2 formerly Fig.10.2 : Payment Option Menu screen for MG OnGate session

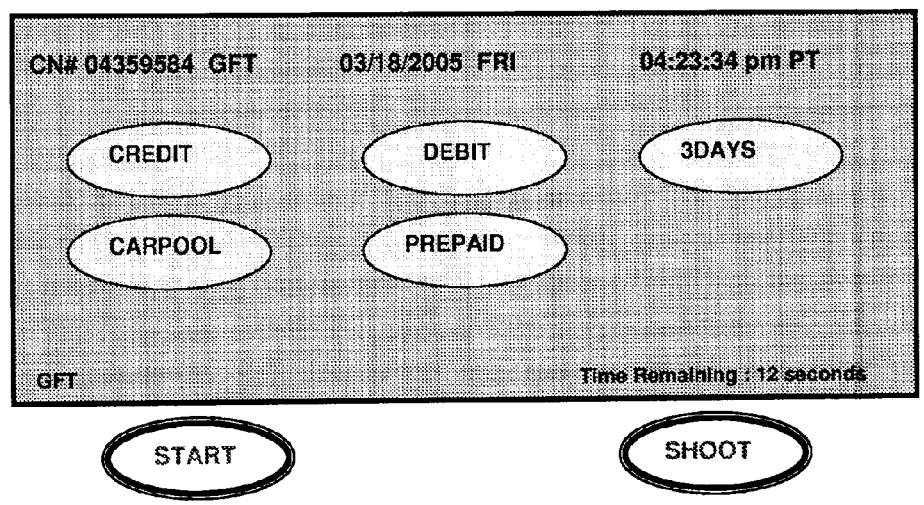

Hitting any payment option key will immediately authorize a transaction. If a transaction fails, then an error popup window will show up immediately, directing User back to this menu screen.

Any redundancy of hitting a YES key for confirmation of picking the payment option is precluded here since by sending VIN to GMAN, User is already committed to paying a toll by any means available in the menu.

This menu screen is to last 12 seconds until any key on the screen is hit by User.
After a lapse of 6 second without any option being selected, the screen will show a reminder popup, indicating another 6 seconds left to choose an option.

"Back to Previous Screen" is inhibited here.

Diagram for Thank You screen/MG OnGate formerly Fig.10.3 AP-Thank You screen

User is given 15 seconds to hit the blinking SHOOT button.
In case of failure, GMAN will take an initiative to generate TVD and send it to VIMO. As a result, User has to pay a tracking charge. This time limit is intended to save bandwidth.

Diagram for VD Sent [MG OnGate]
formerly Fig.10.4 VD SENT

The screen indicates VD has been received by GMAN. In the event that a motorist has to exit the tollgate before this snapshot, then the already paid transaction will be void and nullified.

Diagram for Time Extension Request/MG OnGate
Fig. 5 formerly Fig.10.5 Time Extension Request

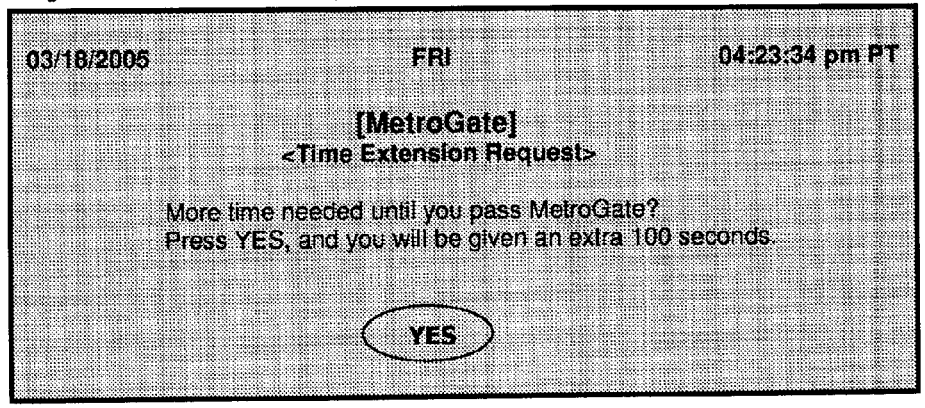

For an MG OnGate session, each VIMO is given a total of 300 seconds until successful completion of a toll-paying process. However, if any accident or an unusual traffic situation is causing a delay before passing MGX, then this screen shows up after a lapse of 250 seconds from the moment of the START button blinking.

This screen stays on until the vehicle has passed MGX. After the first extension, it shows up again and again, after a lapse of 100 seconds after each extension.

If you decide to exit via an off-ramp before a video shot, then this screen will stay on until you get out of the effective range of 5 miles or until the timer expires.

Diagram for TVD Received/MG OnGate formerly Fig.10.6 TVD Received

Under DriveOn Pay system, each motorist has to hit the blinking SHOOT button in 15 seconds in order to save bandwidth. This extra charge for tracking will discourage motorists to waste bandwidth.

Diagram for Goodbye Screen/MG OnGate formerly Fig.10.7 Goodbye

Right after passing MGX, this screen loads up, showing a VCN# 371R489 J031805.
The character 'R' indicates time between 04:00 and 04:59p.m., and the first number '3' and the 6th number '9' combined together indicate that this SID was generated between 04:19p.m.
Meantime,'J031805' represents the lane code 'J' date-stamped with March 18, 2005.

Diagram for D/O formerly Fig.10.8 Differential Toll for Oversized Private Vehicle

Right after passing MGX, this screen follows the Goodbye screen, if the vehicle has turned out to exceed the limit of allowed length for its registered length. D/O is not in force all day long, seven days a week, but can be applicable to rush hours and to specific routes during some period.

Diagram for NEXT MOVE screen formerly Fig.10.9 Next Move Screen

If you hit 'NEXT MOVE' key on WELCOME SCREEN MG ONGATE(Fig.10.1),
then you will get the above screen.

Even after passing MGX upon completion of an OnGate session, Welcome screen comes back on. Then, User is to press WNEXT MOVE' key to get the above screen.

MG OffGate Screens formerly Fig.20.1 Off-Gate Service Options

Unless otherwise mentioned, every screen is designed to last 12 seconds formerly Fig.20.2 Off-Gate PAYMENT OPTION

If transaction fails, there comes an error popup that prompts User to pick another option.
If both options fail, then User has to cancel the transaction formerly Fig.20.3 Off-Gate [Pay Bills ]

formerly Fig.20.4 Off-Gate [Buy]

formerly Fig.20.3.1 Pay Bills, 3DAYS TOLLS DUE formerly Fig.20.3.2 Pay Bills, REGISTRATION RENEWAL formerly Fig.20.3.3 Pay Bills, LICENSE RENEWAL formerly Fig.20.3.4 Pay Bills, TRAFFIC FINES formerly Fig.20.4.1 Buy PREPAID TOLLS formerly Fig.20.4.2 Buy DISCOUNT TOLLS formerly Fig 20.4.3 Buy Raffle

Prize Information will show up when the green banner is hit.
e.g. Top prize for 1 : $5,000   Second Prize for 1 :$2,000   Third Prize for 1 : $1,000
Fourth Prize for 10 : one-month free toll up to 30 trips formerly Fig.20.5 AP-Thank You formerly Fig.20.6 Goodbye formerly Fig.20.4.3.1 Buy, Raffle, Ticket Number

Fig. 24 formerly Fig.30.1 Welcome to Shopping Center with Directory MP DAS

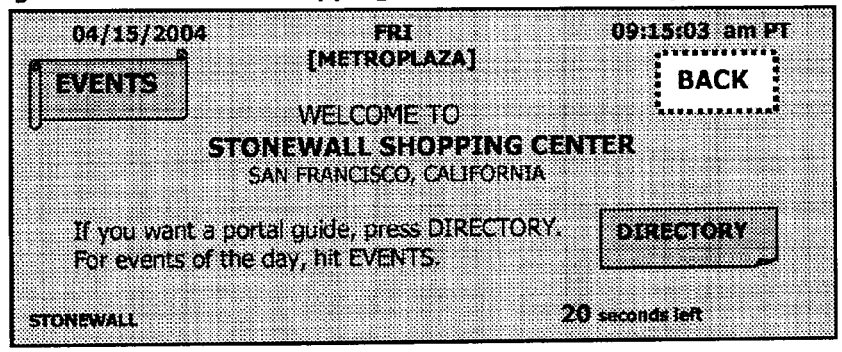

If you hit 'DIRECTORY', then you will get an alphabetical directory, a portal guide for this shopping center listing up all the merchants and stores in alphabetical order.

Hit 'Events" banner, and you will see a lot of events of the day plus any virtual gift or discount coupons saved in your VIMO.

Hitting "BACK" will take you back to the previous session.

Fig. 25 formerly Fig.30.2 Directory in alphabetical order MP DAS

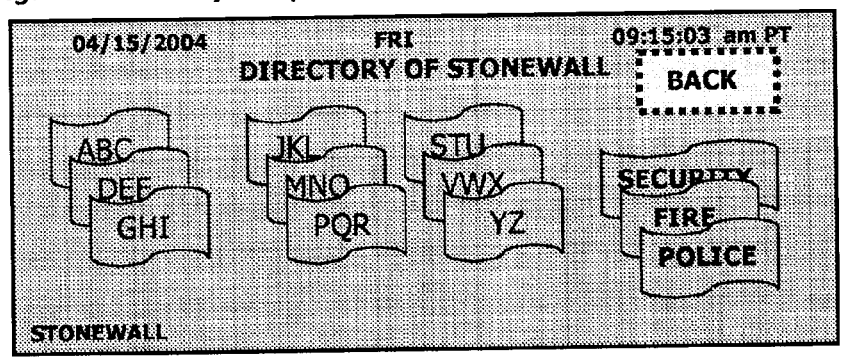

Pressing and holding any banner will lead to detailed lists in alphabetical order.
Hitting any banner will move the banner to the farthest rear.
Press 'BACK' to go back to the previous screen, which is Welcome Screen.

Hitting any banner to move it hindmost will reset the screen timer to 12 seconds recursively. However, pressing and holding any banner will not reset the screen timer, but will shift to a page linked to the banner.

Fig. 26 formerly Fig.30.2 Directory in alphabetical order MP DAS

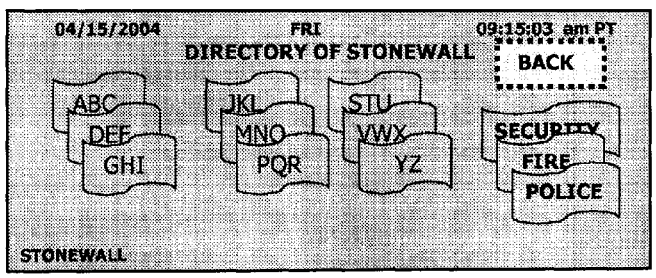

Pressing and holding any banner will lead to detailed lists in alphabetical order.
Hitting any banner will move the banner to the farthest rear.
Press 'BACK' to go back to the previous screen, which is Welcome Screen.

Hitting any banner to move it hindmost will reset the screen timer to 12 seconds recursively.
However, pressing and holding any banner will not reset the screen timer, but will shift to a page linked to the banner.

Fig. 27 formerly Fig.30.3 Top Events of the day < MP DAS >

Press and hold any banner that interests you, and you will be led to details.
The banners keep flickering and come and go on the screen at some intervals
so that they should be rotated. Instead, if you press any banner, it will disappear from the screen
and will be replaced by a new banner from another frame.

If you hit the FLIP key, the whole page flips to another page with EVENTS banners.

formerly Fig.30.4 Example of stores listed in the Directory MP DAS

Hit any banners on Fig.30.2, and you will see the above screen.
Hit the business name on this screen to get details.
"Grand Opening" is a sort of commercial.

Fig. 29 formerly Fig.30.4.1 Examples of Menu Offering MP DAS

Example #1 Fast Food <Carryout Order for JIT pickup>

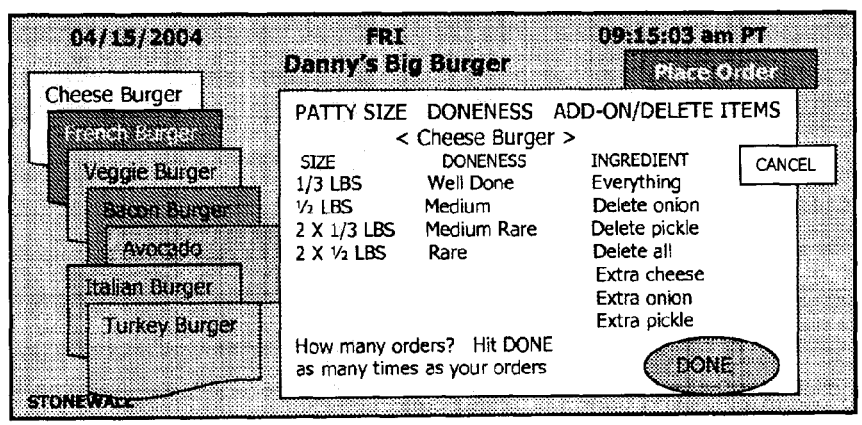

To make your pick, you have to 'press & hold' a banner. If you press it, then it will go hindmost.
You pick Cheese Burger, and the yellow menu screen shows up on the right as above. You fix up
your order on the right, and hit DONE to order one. You hit DONE twice for two orders, thrice for
three orders. And then, you make your pick on the left again, and do the same procedures.
You can hit CANCEL to cancel your picks. Hit "Place Order" to see order details and payment
options.

Example #2 Dinner House <Reservation for JIT Service>

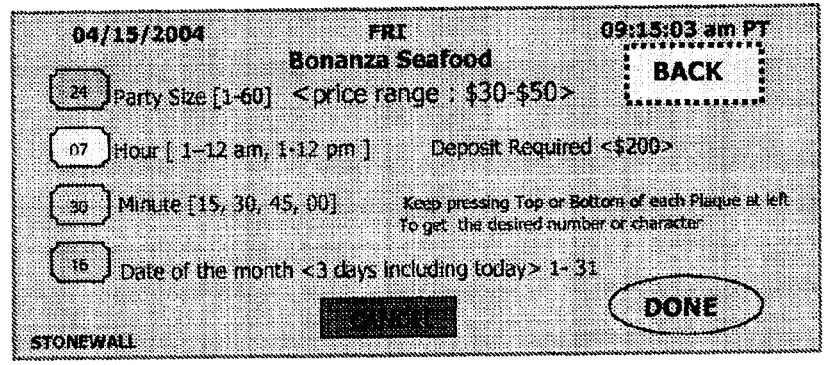

Fig. 30

(formerly) Fig.30.4.2 Payment Options

Example #1 Danny's Burger < Payment Option plus Details of Orders>

| 04/15/2004 | | FRI | | 09:15:03 am PT |
|---|---|---|---|---|
| | | Danny's Big Burger | | |
| Item | Order Qty | Doneness | Add-On or Delete | Unit Price |
| Cheese B. | 2 | well | delete onion | $5.95 |
| Italian B. | 1 | medium | everything | $6.45 |
| Veggie. B. | 1 | well | delete pickle | $5.45 |
| | | | extra cheese | $0.75 |
| Drinks | 4 | | 2 Pepsi, 1 Coke, 1 Diet Pepsi | $1.99 |
| Total | 8 | | | $32.51 |
| Add tax 7% | | | CANCEL ORDER | $2.28 |
| | | PAY $34.79 | | |
| | CREDIT | DEBIT | PREPAID | |
| STONEWALL | | | | |

Hit "CANCEL ORDER" to cancel the order.
If you hit one of the three payment options, the order will be placed and
paid for, and it can't be cancelled.

Example #2 McCormick & Schmick's Seafood
    < Payment Option & Reservation Details>

| 04/15/2004 | FRI | 09:15:03 am PT |
|---|---|---|
| | McCormick & Schmick's Seafood | |
| Party Size : 13 | | Option : Banquet |
| Date and Time : 04/16/04  SAT  07:15 pm | | |
| Deposit required : $520.00 | | |
| | Pay $520 now to make a reservation | CANCEL ORDER |
| CREDIT | DEBIT | PREPAID |
| STONEWALL | | |

User has to settle the balance after dinner as the prepaid deposit has
been made.

Fig. 31 formerly Fig.30.4.3 Thank You. Transaction Approved

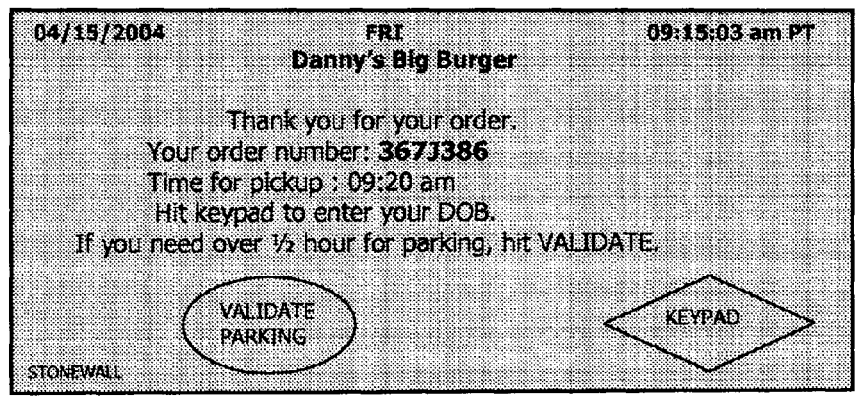

At the time of order pickup, you will need to enter Ticket ID on a keypad at the store and then Date of Birth<8-digit> to authenticate it.

If a shopping center give a ½-hour free parking, and you think you will need more time, then you will need to validate your parking. The benefits of validation will vary from place to place and will be determined during implementations stages. For example, whether validation benefits will give a 20% discount of parking fee, or a totally free parking or a pro rata discount may be determined during implementation.

Fig. 32
formerly Fig. 30.5 JIT Service at Dinner House
Example: You get this message on the screen, right after hitting the smiling face.

Fig. 33 formerly Fig.30.6 Virtual Gift/Discount Coupons

After dining at this restaurant, you have cleared the balance less the prepaid amount, using your VIMO, since you had reserved this dinner on your VIMO. The chances are you may receive a virtual gift coupon as above. You don't need to do anything, but next time you happen to pass by this restaurant, then this virtual coupon might pop up on the screen, when you hit "Events" banner.

Fig. 34 formerly Fig.30.7 Brief Commercials to passing-by vehicles

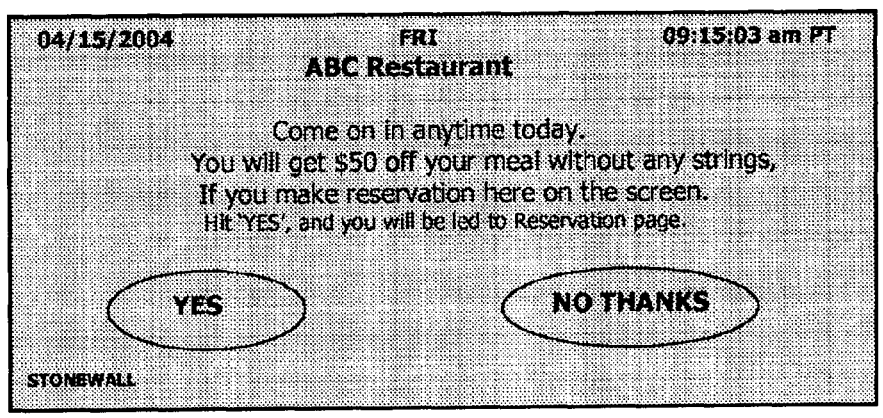

Fig. 35
formerly Fig.30.8 Example of Concert Halls or Movie Theater
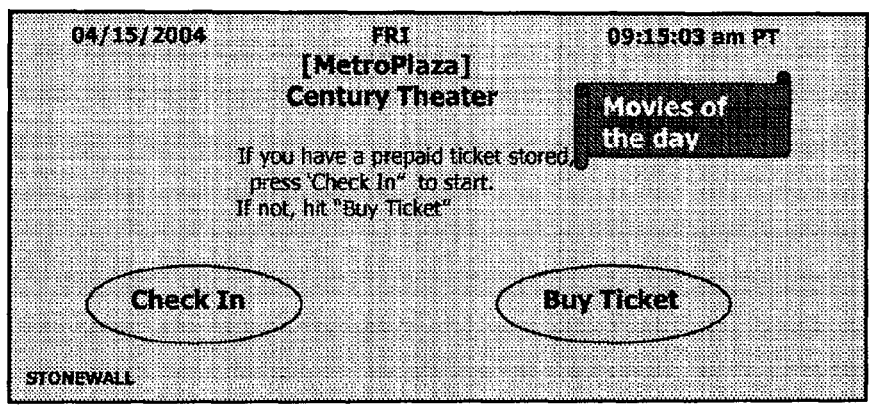
Hit 'Movies of the day" to see details.
Example of a concert hall.
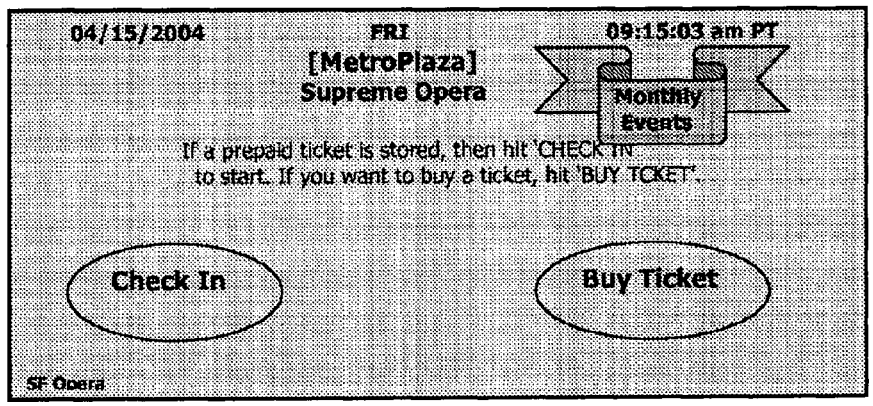

Fig. 36 formerly Fig.51.1 Welcome to XYZ Ball Park MP

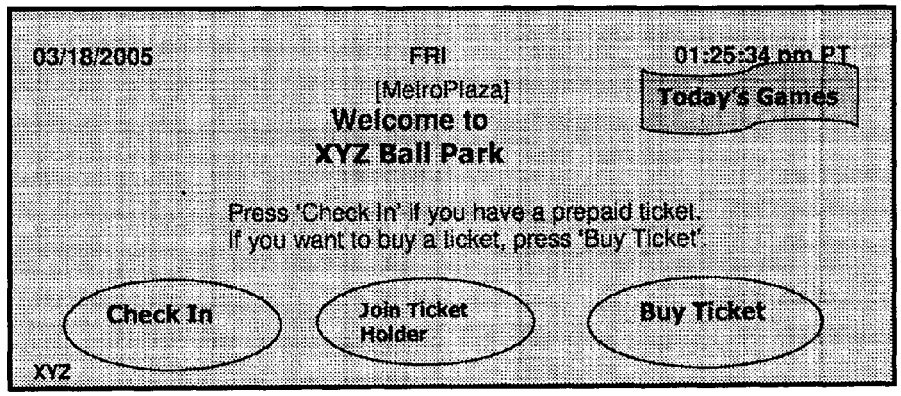

If you press "today's games" banner, then you will se a popup window illustrating the games of the day.

Fig. 37 formerly Fig.51.2 Remote Check-In for Prepaid Ticket <MP Ball Park>

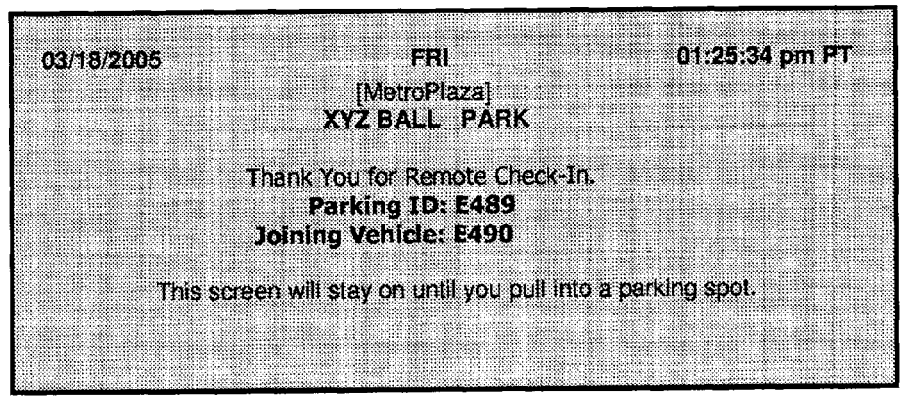

If multiple vehicles are listed on your ticket, then you will get as many parking IDs.
Parking ID is given to you prior to parking, and when you pull into the parking spot, you will have to pay. Other vehicles joining you on the same ticket will get Parking ID's or 'eligible for valet service" message on the screen, respectively.

Parking ID on the screen is for reserved parking. A guide map for reserved parking area needed
If either parking ID or 'valet service eligible" does not shows up on the screen, then you will get Payment Option Page for Parking Fee. TID and Entry Gate number will come up on the screen later, when payment has been processed after pulling into the correct parking spot.

Fig. 38 formerly Fig.51.2.1 Eligible for Valet Parking <MP Ball Park>

Example #1 Two-Way Valet Parking Service Eligible

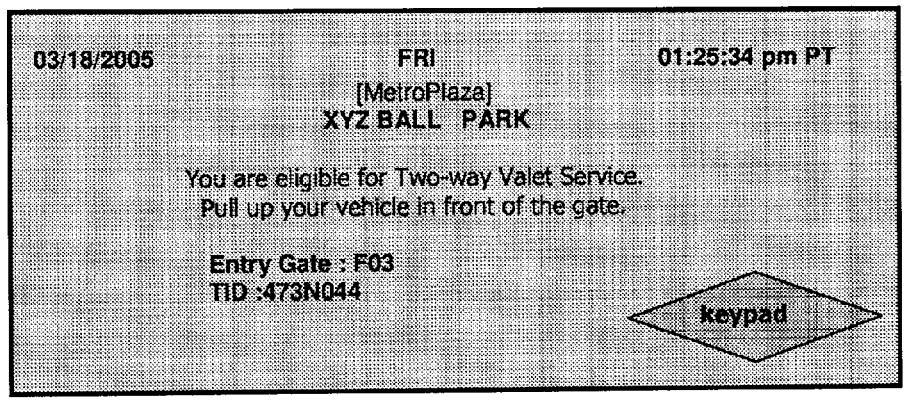

Parking fee plus Valet service fees are already included in the ticket price, and no need to pay, except for tips.

Example #2 One-Way Valet Parking Service Eligible

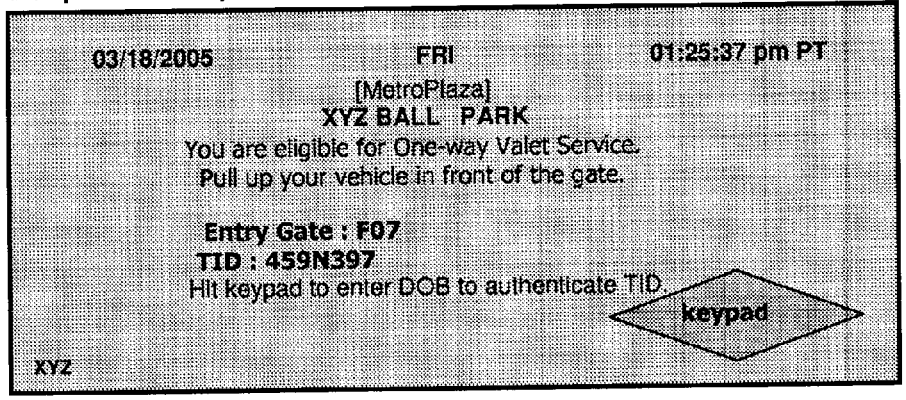

Valet service fees are already included in the ticket price, and no need to pay.
Other vehicles joining you on the same ticket, if pre-registered, will get 'valet service eligible" or 'PID" on the screen.

Fig. 39 formerly Fig.51.2.1.1 PID Entry by Valet Service

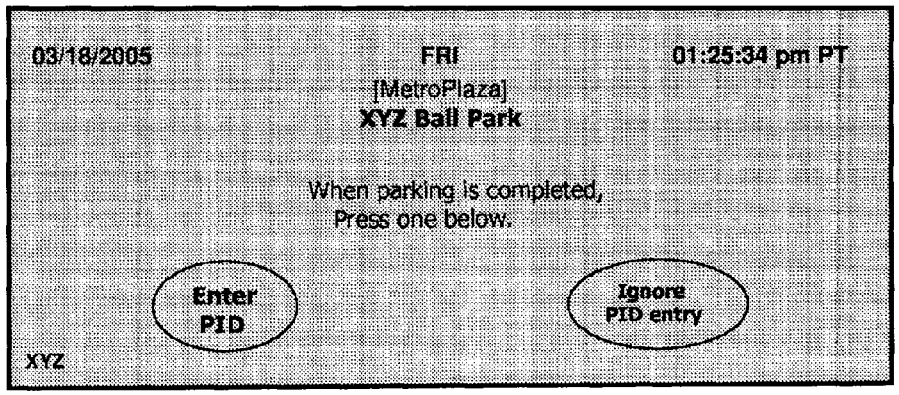

Fig. 40 formerly Fig.51.2.2. Join Ticket Holder MP Ball Parks

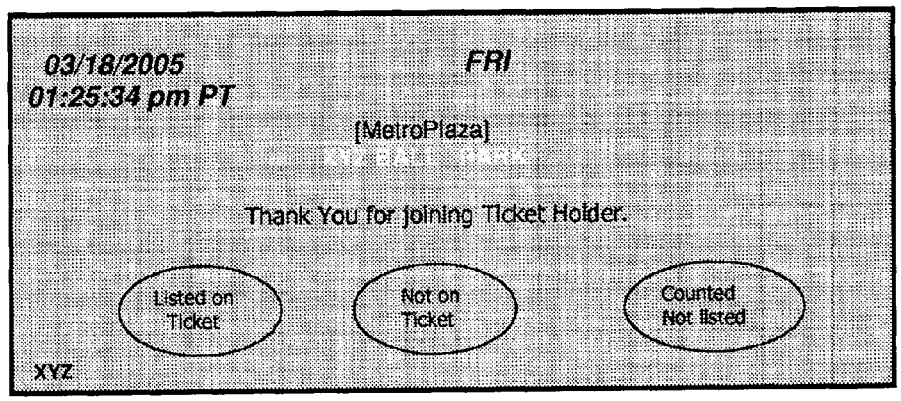

Listed on Ticket: your vehicle license number was listed when buying the prepaid ticket. Fees are paid by the ticket holder.

Not on Ticket: your vehicle license number was not listed at the time of buying the prepaid ticket. Fees are to be paid by you.

Counted Not Listed: your vehicle was counted, but could not be listed at the time of buying the prepaid tickets or spot tickets. Fees are paid by the ticket holder, but you have to get PID and TID from the ticket holder and enter them on the keypad for verification.

Fig. 41 formerly Fig.51.3 Spot Purchase of Tickets on VIMO <MP Ball Park>

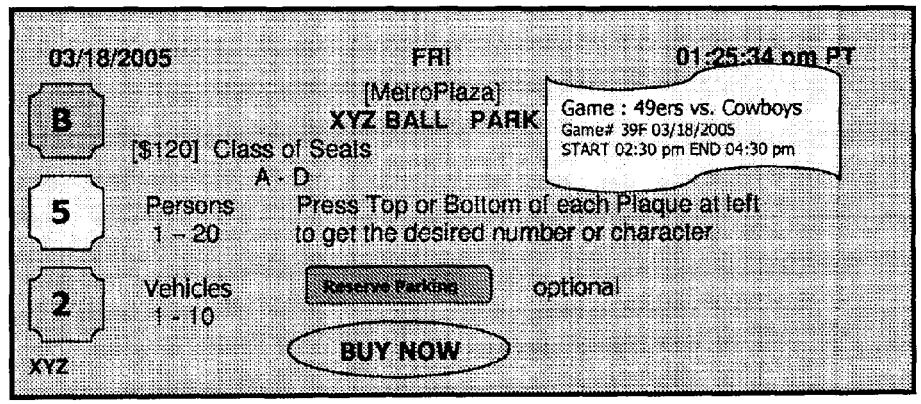

Keep pressing Top or Bottom of any of the three plaques, and the letter or number will change in an ascending or descending order. The plaque for Class of Seats displays the price of each class at right.

"Reserve Parking" is an optional key. If you want to get your Parking ID prior to parking, press "Reserve Parking" and you will get as many PID, as the number of vehicles chosen.

Fig. 42 formerly Fig.51.3.1 Payment Options for Spot Buy <MP Ball Park>

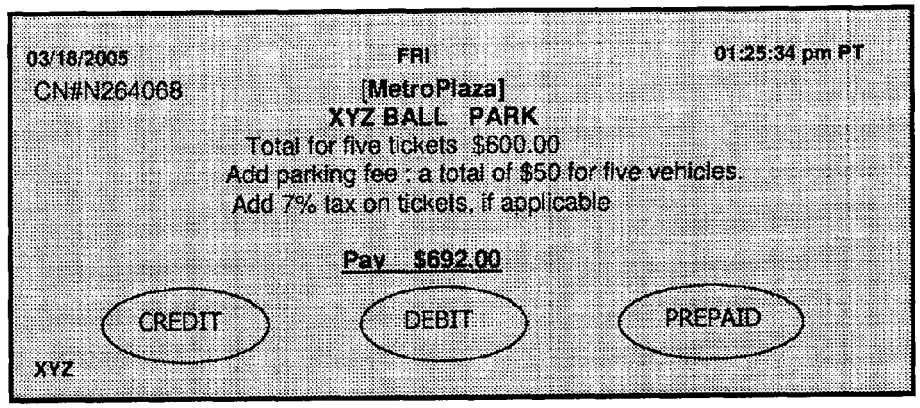

If you have hit 'Parking ID [YES] get it now', you will see a total of parking fee calculated based on the number of vehicles you've entered on the virtual ticket.

Fig. 43 formerly Fig.51.3.2 Thank You for Spot Buy. Transaction Approved.

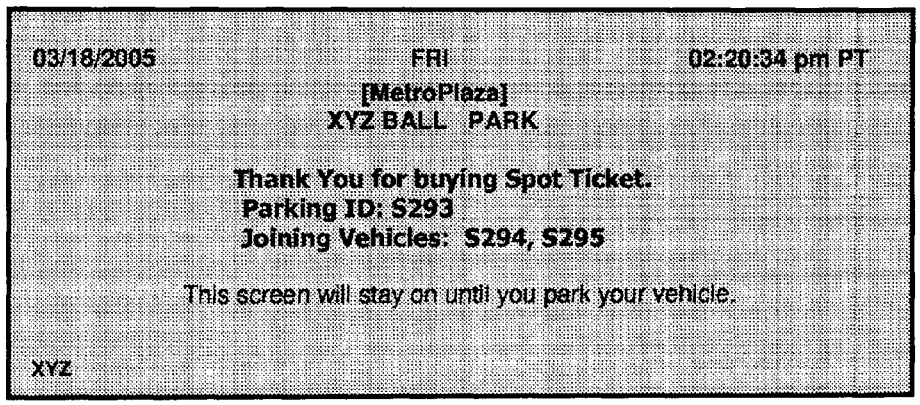

You have got three PIDs, one for you and two others for the vehicles joining your ticket.

Entry Gate Number and TID will be displayed later, when the vehicle pulls into a parking spot.
This screen will stay on until you pull into a parking spot.

Fig. 44 formerly Fig.51.3.2.1 Call Ticket Holder

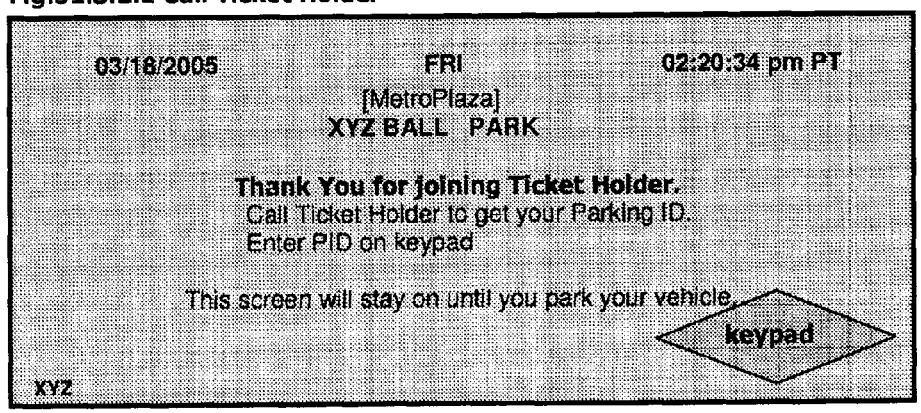

You will get this screen when you has pressed 'Counted Not Listed" key on Fig.51.2.2. Call your ticket holder to get your PID and enter PID on the keypad.

formerly Fig.51.5.1 GoFind Spot and Pay for SpotBuy

User might need to find a parking spot for himself because of vehicle size or other reasons.

Fig. 46 formerly Fig.51.5.2 Payment Options for parking fee <MP Ball Parks>

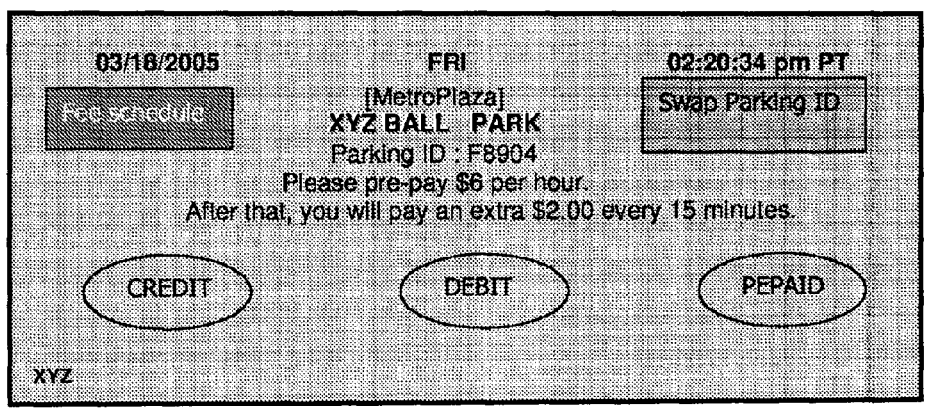

If PID is given ahead, it means reserved parking. When assigning PID's, BS is to analyze vehicle data to determine the right size spot for the vehicle.
However, if User wants to swap PID to go find a better spot, User can hit 'Swap Parking ID". Then, a new PID will come up in place of "Parking ID : F8904"
Swapping is allowed for once.

Hit' Fee Schedule, and you will find the parking fee schedule, based on the following:

1. oversized vehicles
2. compact vehicles
3. first class
4. economy class
5. valet parking service
6. reserved parking In MP Ball Parks, Clock-In starts when the vehicle pulls into a parking spot.

formerly Fig.51.5.2.1 Payment Options without PID formerly Fig.51.5.3 Thank You for payment formerly Fig.51.5.3.1. Are You Leaving?   MP Ball Park formerly Fig.51.5.4 GOODBYE & BRIEF COMMERCIAL <MP Ball Parks>

Hit 'change option', and you will be able to change the payment option.
Hit 'See Game Info", to see timetables for games plus some commercials.

Fig. 51 formerly Fig.61.1 Welcome to Block Directory < MP Public Parking>

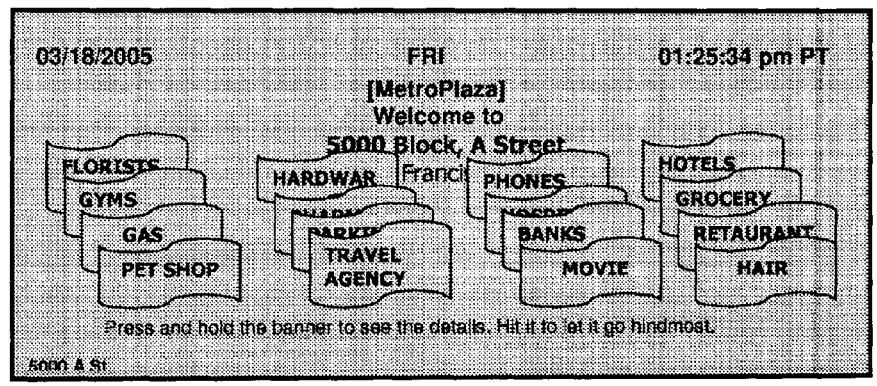

1. Reserved parking : before entering the parking garage, motorists can prepay to reserve a parking spot ahead. Counting starts at the time of booking.
2. Motorists who just drive in without reservations will be clocked in at the gate of the garage. A 5-minute waiver for motorists without reservations.

Fig. 52 formerly Fig.61.2 Vacancy Info on Parking Garages

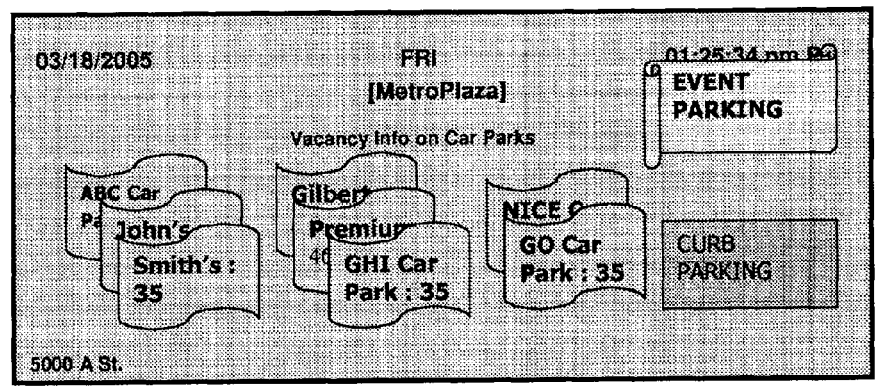

1. EVENT PARKING
2. REGULAR PARKING
3. Curbside parking information can be obtained, when the green banner is hit.

formerly Fig.61.2.1 Event Parking Availability

After hitting 'CHECK IN NOW', you've got the above screen so far as your prepaid ticket is valid.
You pick the highlighted banner to get your PID.

Suppose you hit 'John's Garage", which is highlighted. The next screen will be
Fig.61.2.2 Remote Check-In for Event Parking.

formerly Fig. 61.2.2 Event Parking Remote Check-In <MP Public> formerly Fig.61.2.3 Clock-In for Event Parking

Normally, parking time counts from the moment the vehicle starts Remote Check-In unless there is an abnormal condition that has affected the timely clock-in of the vehicle. In case of an abnormal condition on the way, parking time count will be reset to zero.

formerly Fig.61.2.3.1 Clock-In for Regular Remote Check-In Vehicles formerly Fig.61.3 Remote Check-in for Regular Parking formerly Fig.61.3.1 Thank You. Here's Parking ID <MP Public>

Fig. 59 formerly Fig.61.3.2 Match PID

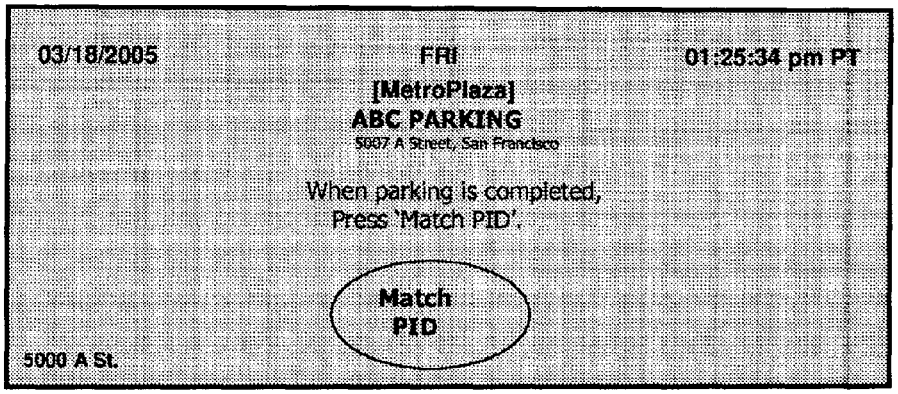

When a vehicle pulls into a parking spot, the above screen shows up on the VIMO screen. In case of Event Parking and Regular Remote Check-In, PID has already been stored in VIMO, and hitting 'Match PID' key will send the stored PID to BS. On the other hand, spot Check-In vehicles do not have any PID stored in their VIMO, and hitting 'Match PID' key will shift the screen to Fig.61.3.2.1., prompting User to enter PID.

In case of Event Parking, refer to the following diagrams.

Fig.80.2.4. Match ID to get TID <MP Expos>
    Fig.80.2.5. Your TID <MP Expos>

Fig. 60 formerly Fig.61.3.2.1 Pull-In to enter PID for spotCheck-In

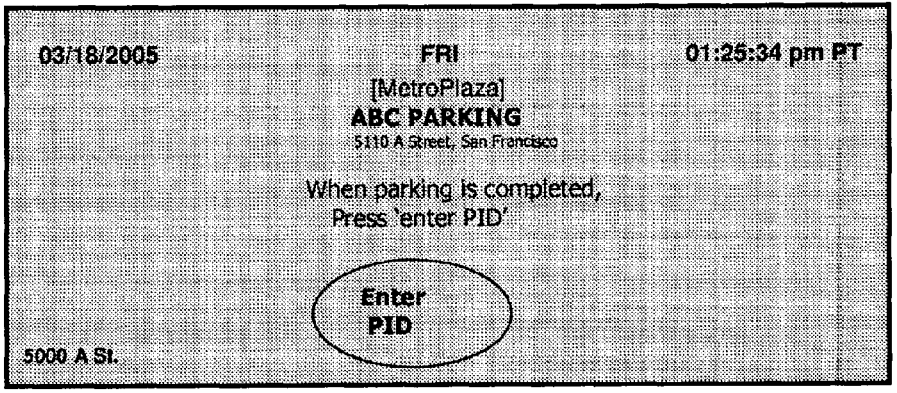

Assuming that each parking spot in the parking lot is identified by both a number plate and a RFID tag, User is supposed to hit 'Enter PID' key to read the RFID tag and send PID to BS. In case RFID tags are not available, User is supposed to manually enter PID.To help with manual entry, a popup keypad may be added at top right of the screen, as an alternative.

Fig. 61
formerly Fig.61.4 Spot Check-In

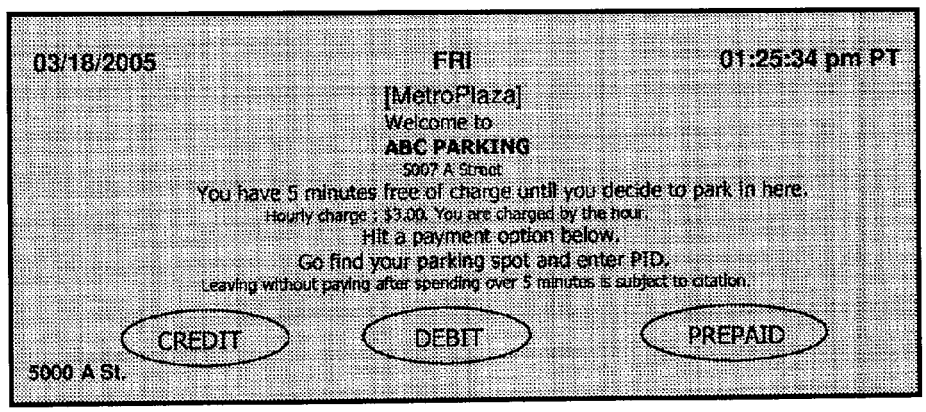

To be fair, vehicles clocking in without reservation are given 5 minutes free of charge, during which drivers will find a right spot to park vehicles. After spending 10 minutes on trying to find a spot without success, a driver leaves without paying anything, then he/she will be given a parking ticket automatically at the moment he/she exits the parking garage.

This AutoCite will be alerted to the driver by email.

Fig. 62
formerly Fig.61.5 Clock-Out

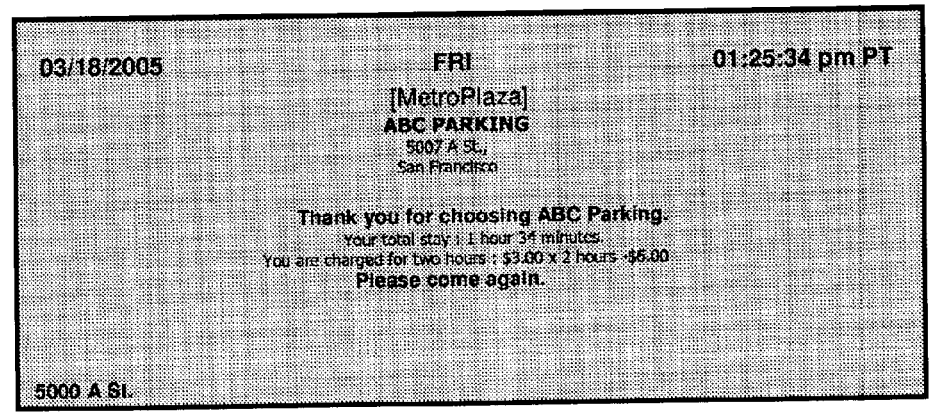

Fig. 63 formerly Fig. 61.5.1 Are You Leaving?

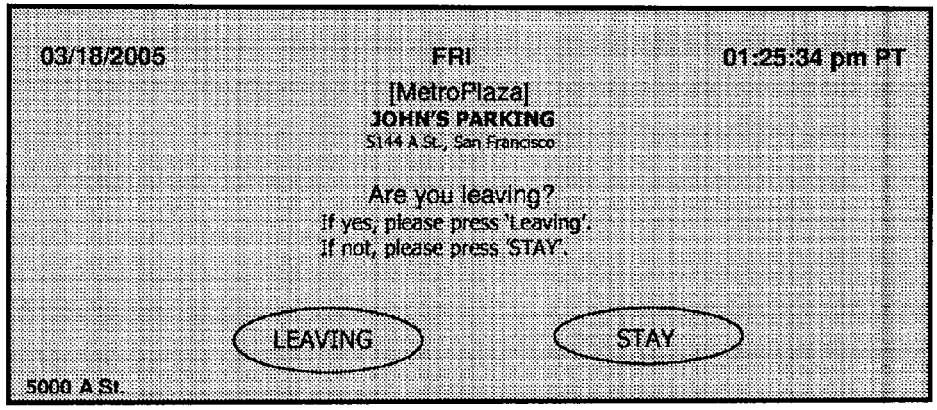

If you happen to turn on the engine while it is parked, the above screen shows up to check if you are leaving. If you mean to leave, then hit 'leaving' key so as to advise the parking garage of your intention to leave.

If you are not leaving, just ignore it or hit 'STAY'. The screen will shrink to a lurking mode so you can do some other on-screen sessions.

formerly Fig.62.1 Welcome to Curbside Parking MP formerly Fig.62.2 Payment Options for MP Curbside Parking

1) Progressive rate for $2^{nd}$ and $3^{rd}$ ½-hour : pick hourOptions {1/2-hour, 1-hour,1½-hour}
   Examples : First ½-hour :$3.00, $2^{nd}$ : $4.00,
   $3^{rd}$ : $5.00
2) AutoCite after 1½ -hour(Parking time limit ), Example : $35 for parking citation to be billed

Fig. 66 formerly Fig.62.3 Thank you for payment

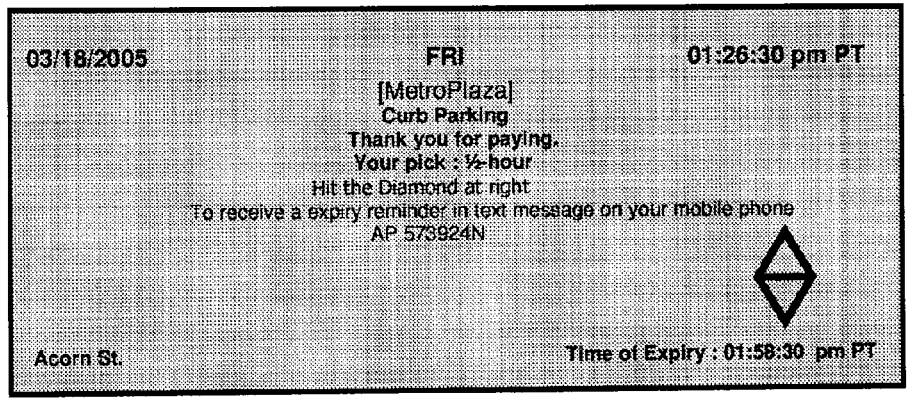

1. You picked a ½-hour parking, and 30 minutes plus the two-minute fee-waiver time is added to Timer.
2. Hit the DIAMOND so as to let you receive an expiry reminder in a text message on your phone 10 minutes ahead.
3. If you had picked a ½-hour parking and had exceeded 35 minutes, you would be charged for the first half an hour plus (35 minus 2) minute extension charges.
   Example : $3.00 for first ½ hour, 3 x $2.00 extension charge for 33 minutes.
   A total of $9.00 will be collected on the spot.
4. If you exceeded the 1.5-hour limit, then you would be billed for a fine
5. If your mobile number has not been stored, then the keypad will pop up, when the Diamond is so that you may enter a third party mobile number.

Fig. 67 formerly Fig.62.4 Goodbye

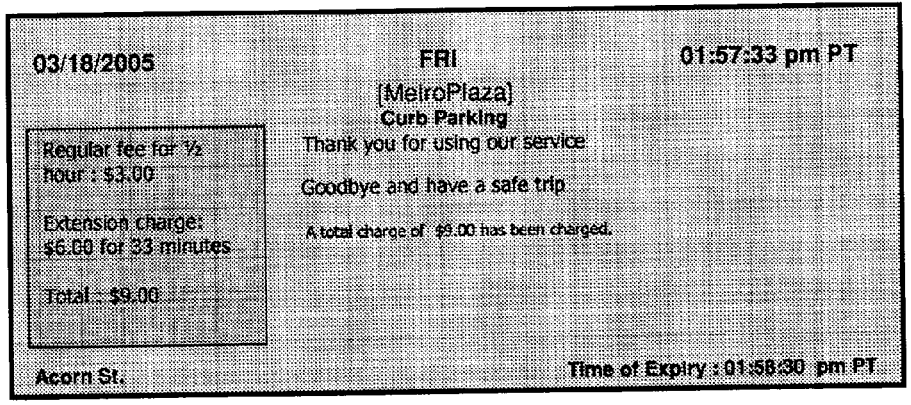

Fig. 68
formerly Fig.63.1 Welcome to Airport <MP Airport>

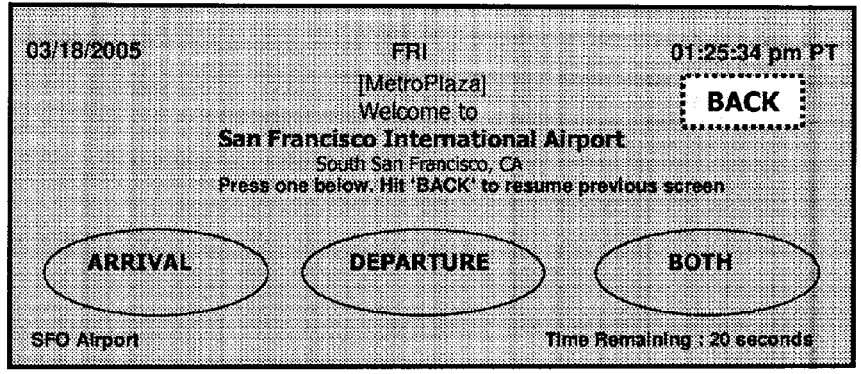

When approaching an airport within 5 miles, the above Welcome screen pops up on VIMO, prompting User to pick a destination: Arrival, Departure or both Arrival & Departure. The Welcome screen will disappear in 20 seconds, but if User is just passing by an airport, but wants to go back to the previous "GPS navigation screen", for example, then User has to hit "BACK" key.

Hitting any of the three 'destination' keys will send VIN PLUS(vehicle data saved in VIMO), changing to a service menu screen offering short-term parking.

Fig. 69
formerly Fig.63.1.1 Prepay & Payment Options

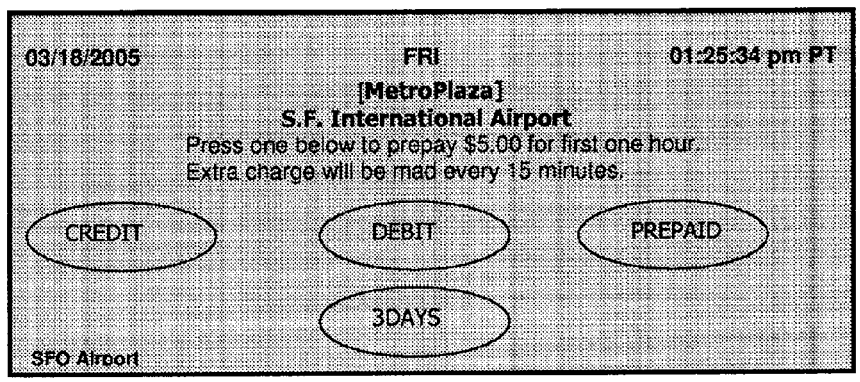

1. Prepay for the first one hour : $5.00 for example
2. User will pay extra every 15 minutes after the first hour..
3. Extra charge per 15 minutes.
4. This screen shows up only after either 'SHORT-TERM PARKING' or 'LONG-TERM RKING' screen formerly Fig.63.1.2.1 Thank you for payment for Arrival <MP Airport> formerly Fig.63.1.2.2 Thank you for payment for Departure <MP Airport> formerly Fig.63.1.2.3 Thank you for payment for Both <MP Airport> formerly Fig.63.1.3 ETA Entry Reminder for Arrival <MP Airport>

Fill-In Box:

1) Arrival Flight Number: e.g. SQ238
2) ETA: Estimated Time of Arrival: hhmm a.m. or p.m.

formerly Fig.63.1.3.1 VALET PARKING for DEPARTURE <MP AIRPORT> formerly Fig.63.1.3.2 Valet Parking for Arrival and Both < MP Airport >

Fig. 76 formerly Fig.63.2 Short-Term Parking for Arrival <MP Airport>

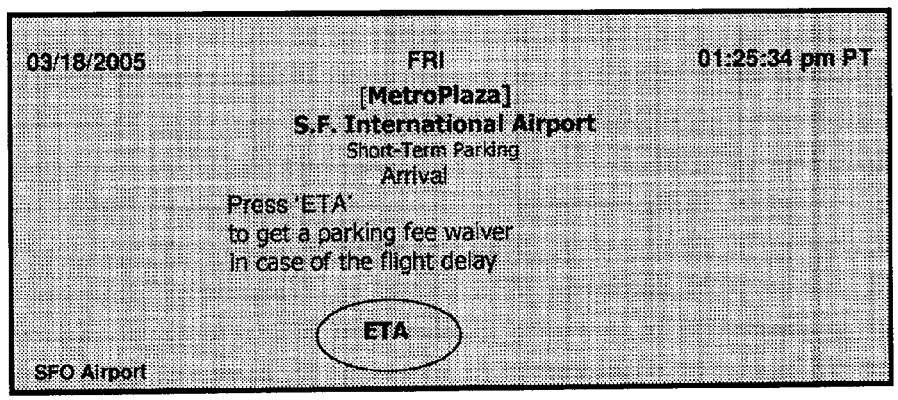

If 'ETA' is pressed, then the Estimated Time of Arrival plus the flight number will be reported to BS to make User eligible for any parking fee waiver in case of the flight delay.

The ETA data must be stored before the key is hit. If the data has not been stored, then an 'ETA" entry reminder will displayed later on.

Fig. 77 formerly Fig.63.2.1 Short-Term Parking For Departure MP Airport

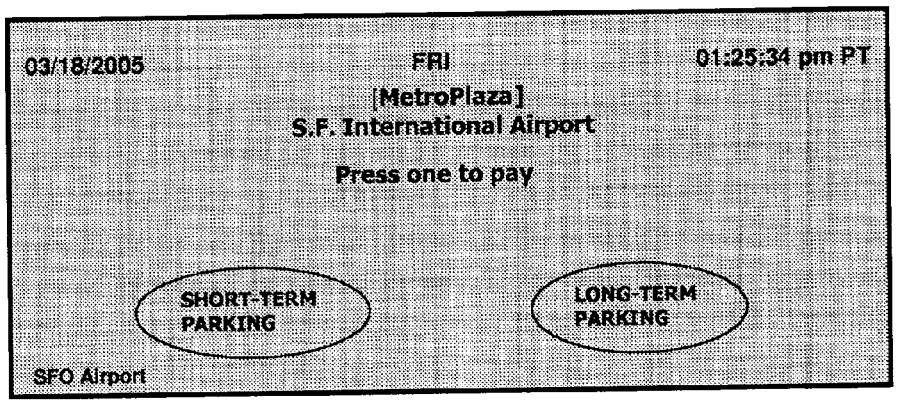

formerly Fig.63.2.2 Short-Term Parking for Both Arrival and Departure formerly Fig.63.3 Long-Term Parking

Fig. 80 formerly
Remote Check-In FOR BOARDING < MP Airport >
Fig.63.4 Remote Check-In FOR DEPARTURE and BOTH

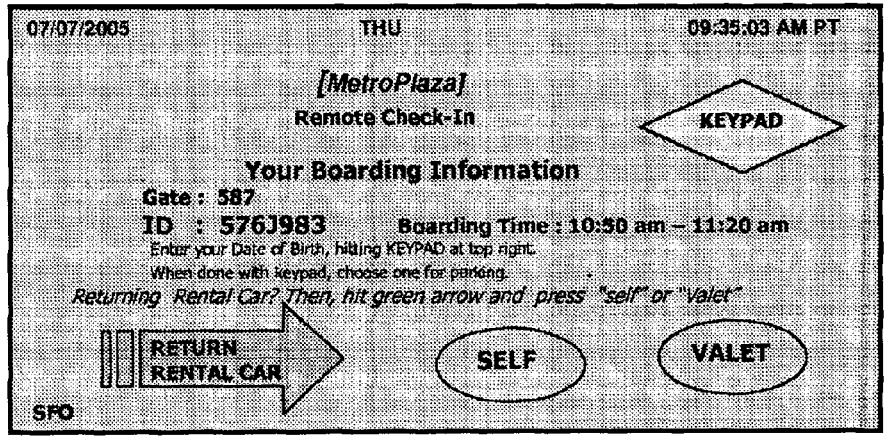

Fig. 81 formerly Fig.63.5.1 Return Rental Car by Self

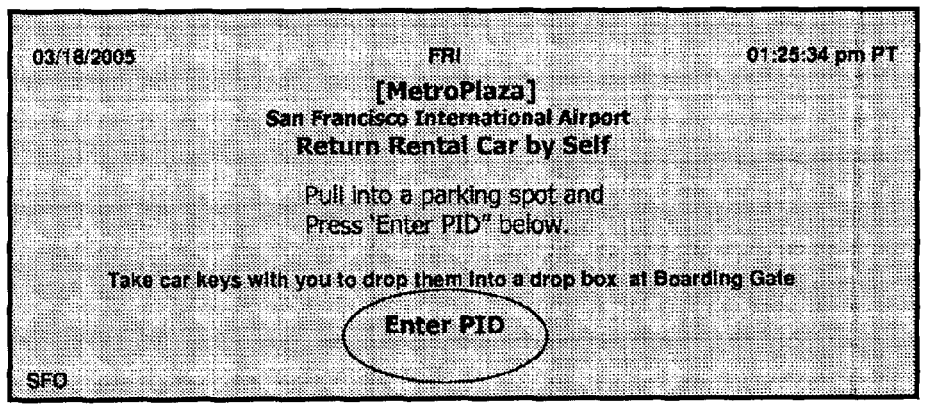

Assuming that each parking spot in the parking lot is identified by both
a number plate and a RFID tag, User is supposed to hit 'Enter PID' key to read
the RFID tag and send PID to BS.

In case RFID tags are not available, User is supposed to manually enter PID.
To help with manual entry, a popup keypad may be added at top right of the screen, as an
alternative.

formerly Fig.63.5.1.1 Return Rental Car by Self< Manual Entry of PID> formerly Fig.63.5.2 Return Rental Car by Valet

If you hit 'YES', the next screen will be Fig.63.5.2.1.

Fig. 84 formerly Fig.63.5.2.1 Rental Contract Closed

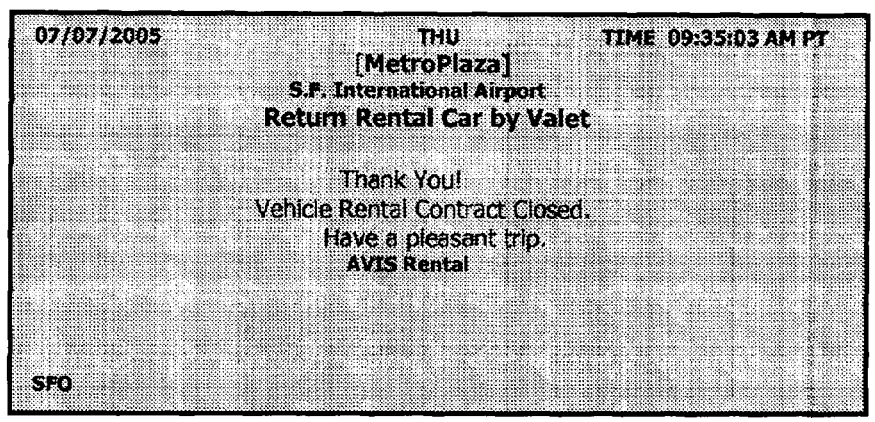

Fig. 85 formerly Fig.63.6 Lurking Mode

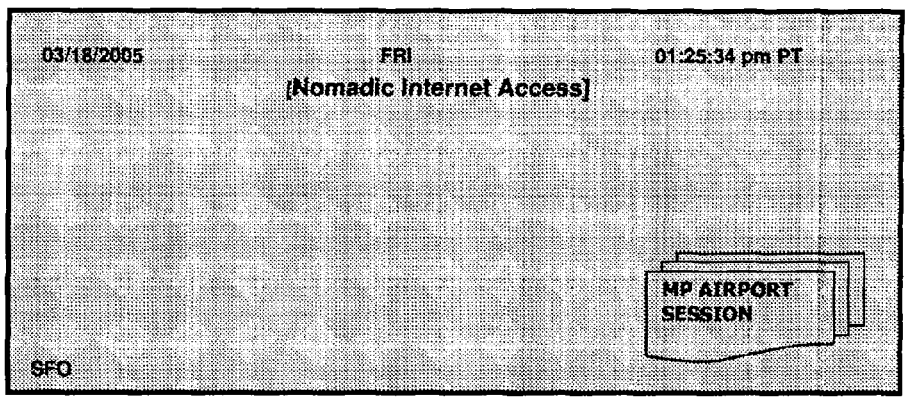

MP Airport shrinks to a banner tucked in the corner awaiting activation.
This lurking mode is a kind of dormant state, during which User can brose other sessions on the screen. When the motorist decides to park the vehicle in a parking spot, then the motorist has to touch this banner to resume MP Airport session.

Fig. 86 formerly Fig.63.6.1 Enter PID

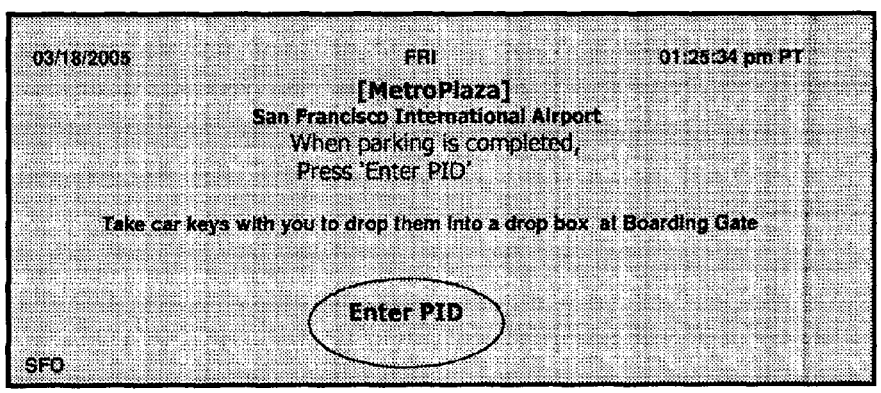

Assuming that each parking spot in the parking lot is identified by both
a number plate and a RFID tag, User is supposed to hit 'Enter PID' key to read
the RFID tag and send PID to BS.

In case RFID tags are not available, User is supposed to manually enter PID.
To help with manual entry, a popup keypad may be added at top right of the screen, as an alternative

Fig. 87 formerly Fig.63.6.1.1 Manual Entry of PID

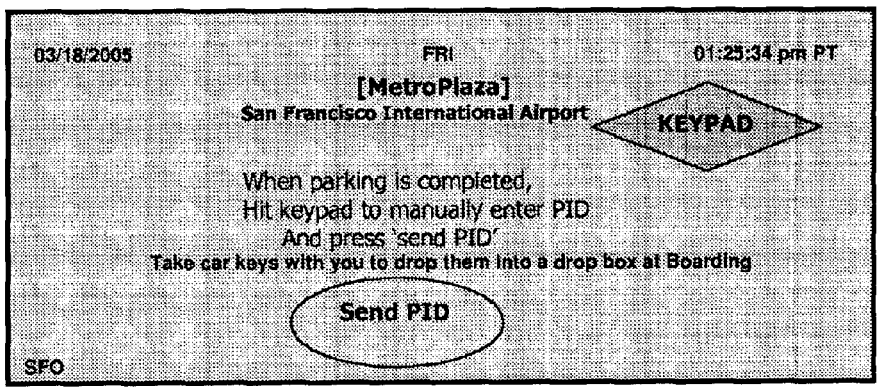

formerly Fig. 63.7 CLOCK-OUT <MP AIRPORT> formerly Fig.70.1 Welcome to Subway <MP Subway Parking> formerly Fig.70.2 Visitors

Visitors : Motorists who come into Subway car park to give a ride to or pick up commuters Fig. 91
formerly Fig.70.2.1 Hourly Parking

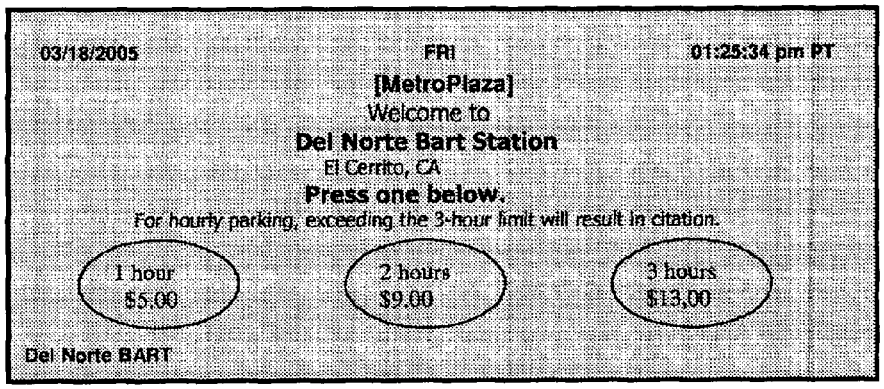

Hour parking: motorists who want to park their vehicles in the subway car parks without using subway at all.

Fig. 92
formerly Fig.70.2.2 VISITOR if exceeding 10-minute

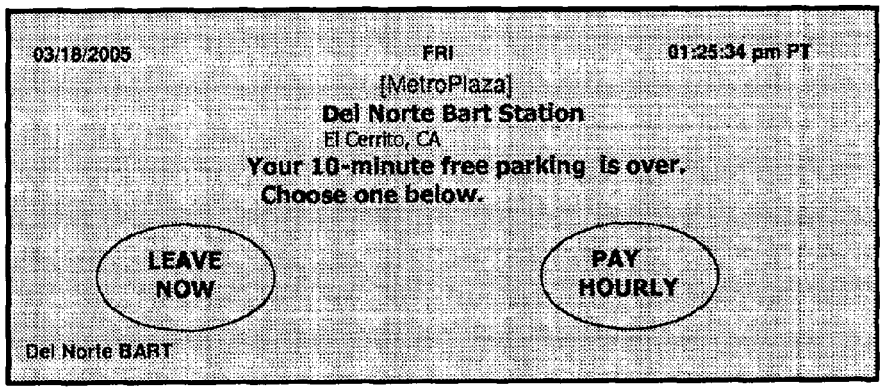

Visitors are supposed to choose 10-minute free parking or Pay for over 10 minutes in the beginning. Suppose a visitor chose 10-minute in the beginning and happened to exceed the 10-minute. Then the above screen shows up.

The visitor may leave and come back later to get another 10-minute free parking.
Alternatively, the visitor can continue to stay by choosing PAY HOURLY (See Fig.70.2.1)

formerly Fig.70.3 Commuters   <MP Subway> formerly Fig.70.3.1 Monthly Pass Holder                    MP Subway formerly Fig.70.3.2 Sporadic User <MP Subway> formerly Fig.70.4 Payment Options <MP Subway>

Service option selected may vary.

formerly Fig.70.5 Thank You for Payment  <MP Subway>

PID entry :

1) If PID comes as a RFID chip, then "Enter PID" key can be implemented.
2) If PID is to be manually entered into keypad, then the keypad should be hit prior to entry.

formerly Fig.70.6 Goodbye/Clock-Out

If there is any extra charge, it will show on the screen. Any violation will be displayed on the VIMO screen as well.

Fig. 99
formerly Fig.80.1 Welcome to Expos <MP Expos Parking>

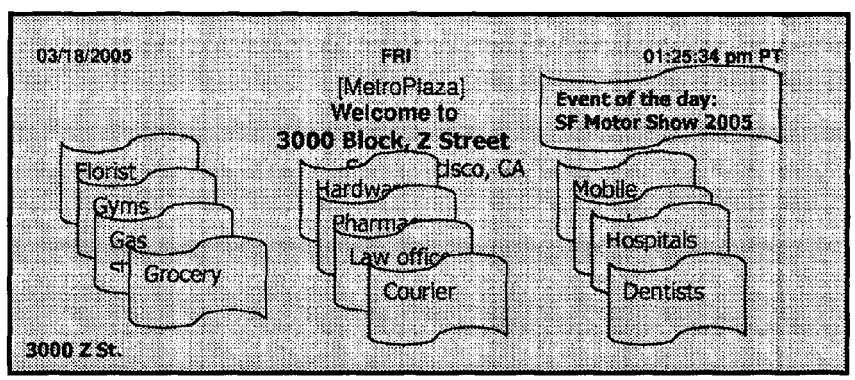

1) 'Event of the day' banner, if hit, will unfold the details of the Event.
2) 'ad hoc' nature of BS or aggregating of BS
3) Remote Check-In to get Event Parking ID for Prepaid tickets
4) Purchase of spot tickets for admission Fig. 100
formerly Fig.80.1.1 Remote Check-In to Expos <MP Expos Parking>

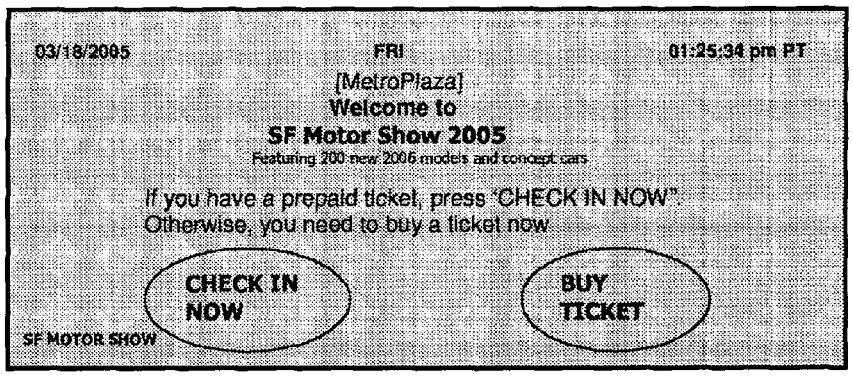

If you hit 'CHECK IN NOW', you will be led to Fig.80.2.1. Event Parking Availability. To save redundancy, Ticket ID won't be shown to you, but will be stored so it can be sent back to BS through a parking garage you are going to pick.

Fig. 101 formerly Fig.80.1.1 Remote Check-In to Expos <MP Expos Parking>

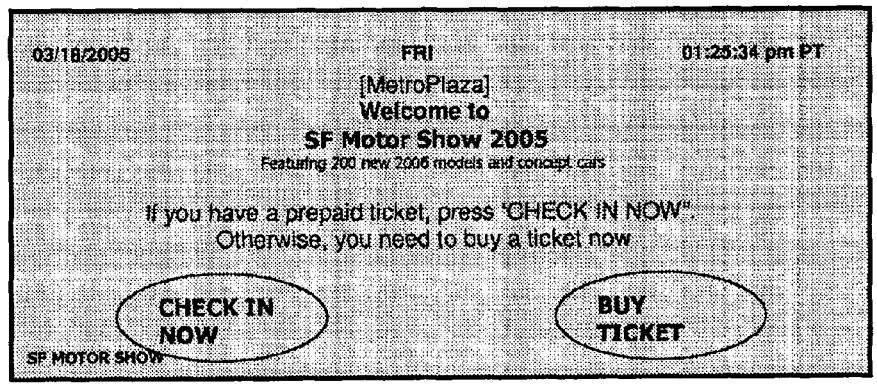

If you hit 'CHECK IN NOW', you will be led to Fig.80.2.1. Event Parking Availability.

To save redundancy, Ticket ID won't be shown to you, but will be stored so it can be sent back to BS through a parking garage you are going to pick.

Fig. 102 formerly Fig.80.2 Vacancy Availability from the Block

| 03/18/2005 | FRI | | 01:25:34 pm PT |
|---|---|---|---|
| | [MetroPlaza] | | |
| | ABC Parking | | |
| | 3006 Z Street, | | |
| | Vacancy | | |
| NOW | IN 5 MINUTES | IN | 10 MINUTES |
| Compact Cars : 27 | 30 | | 35 |
| Medium Sized : 35 | 37 | | 36 |
| Large Size : 20 | 20 | | 17 |
| 3000 Z St. | | | |

This is an example of 'ABC Parking" showing its parking space vacancy.

Fig. 103 formerly Fig.80.2.1 Event Parking Availability

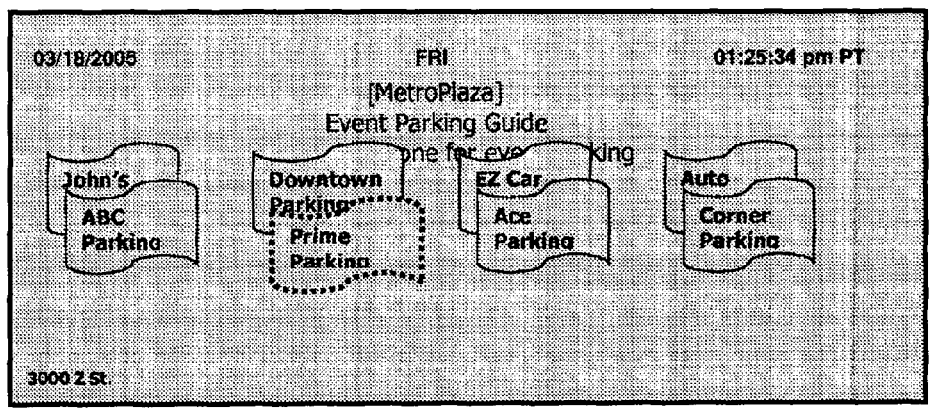

After hitting 'CHECK IN NOW', you've got the above screen so far as your prepaid ticket is valid.
You pick the highlighted banner to get your PID.
Suppose you hit 'Prime Parking", which is highlighted. The next screen will be
Fig.80.2.2 Remote Check-In for Event Parking.

Fig. 104 formerly Fig.80.2.2 Remote Check-In for Event Parking

If you hit "Remote Check-In", your Ticket ID already stored will be sent to 'Prime Parking' and you will be assigned a PID on the next screen, Fig.80.4 Parking ID.

If you want to park in a parking garage other than 'Prime Parking' , press 'Swap Parking'. And you will be led to Fig.80.2.1 Event Parking Availability.
Hit a banner there and the 'swapping' process will be automatically done to bring you back to the above screen.

Let's say you've just pressed 'Remote Check-In' for event parking. Then the next screen will be Fig.80.4 Parking ID.

Fig. 105 formerly Fig.80.2.3 Clock-In for Event Parkers   <MP Expos>

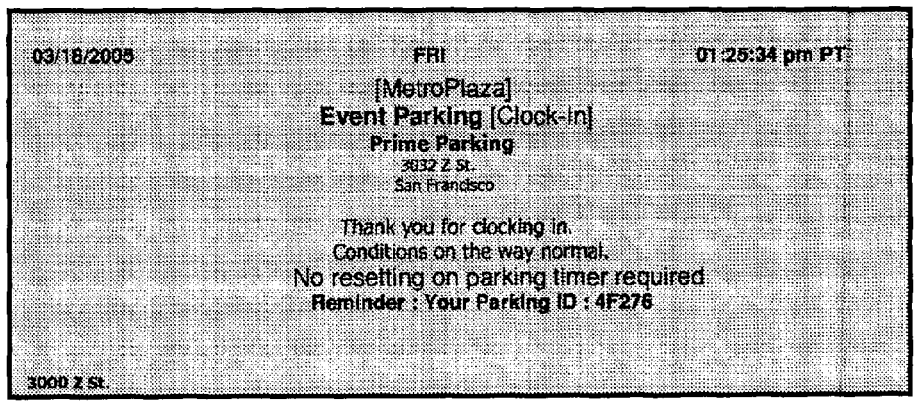

The vehicle, after completion of "Remote Check-In" for Event Parking, finally arrives at the garage of 'Prime Parking'. When it clocks into the garage, the above screen is displayed. PID comes on the screen as a reminder.

Fig. 106 formerly Fig.80.2.4 Match PID to get TID

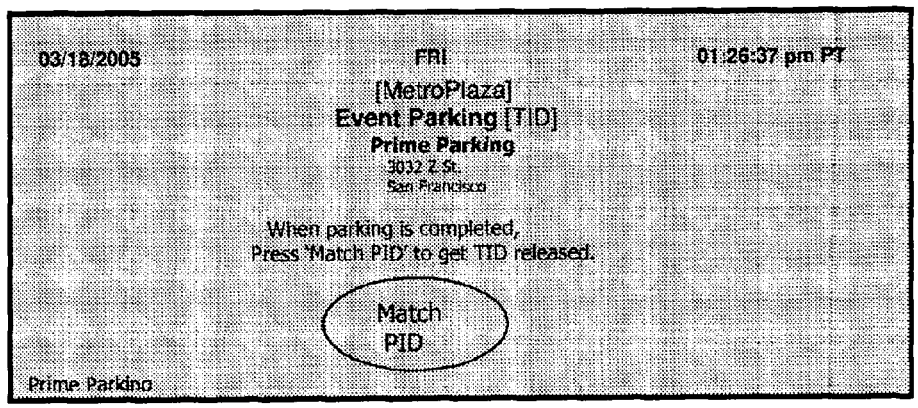

When you have pulled into a parking spot , the above screen will show up.
Your PID has been stored in the 'Match PID' key. If you have pulled into the right spot(e.g. PID 4F276), then you will see your TID (Ticket ID) on the next screen as below.

formerly Fig.80.2.5 Your TID formerly Fig.80.3 Two-Way Valet Parking   <MP Expos>

Meantime, there are special people who will deserve two-way valet parking service. When these people hit 'CHECK IN NOW' on Fig.80.1.1, they will be getting the above screen, based on their ticket information

Fig. 109 formerly Fig.80.3.1 One-way Valet Parking <MP Expos>

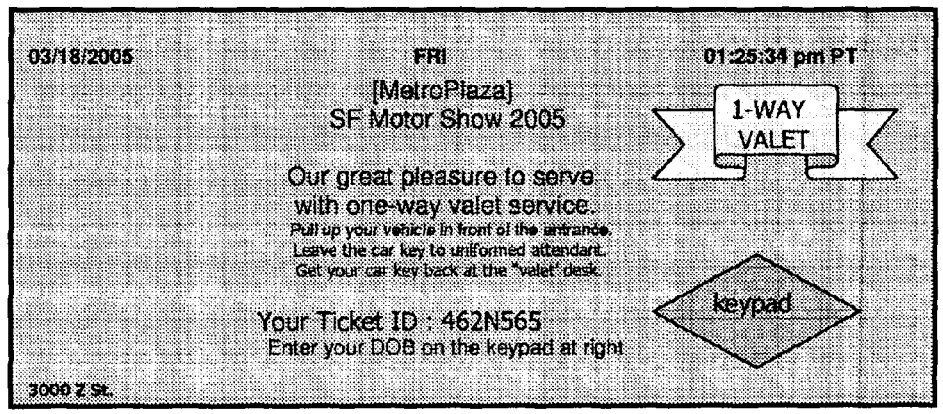

Fig. 110 formerly Fig.80.3.2 Valet Service Enters Your PID

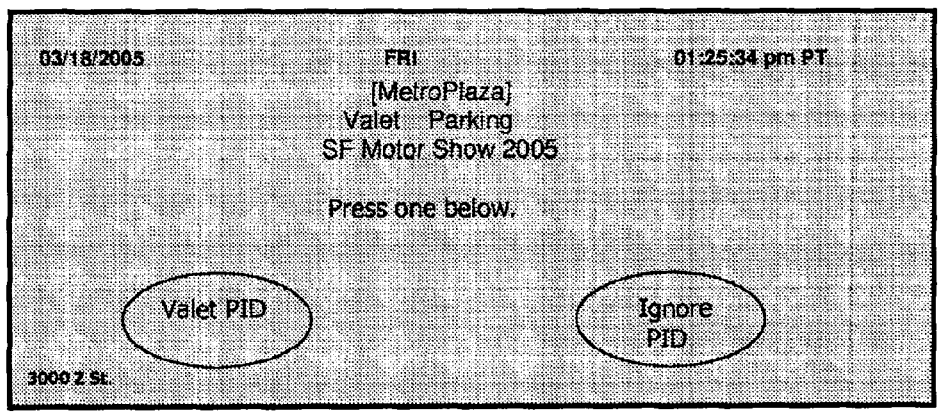

Whether it is one-way or two way valet service, the above screen displays.
The service attendant then will have to choose one out of the 'Valet PID' and 'Ignore PID'.

'Valet PID' is picked when the valet parking area has been reserved at a specific commercial parking garage.

'Ignore PID' is picked when the vehicle should be parked in a non-commercial spot near the entrance for easier access to the vehicle after the event.

Fig. 111 formerly Fig.80.4. Parking ID <MP EXPOS>

Hit "Map Guide" to get directions.

Fig. 112 formerly Fig.80.5 Purchase of Spot Tickets MP Expos

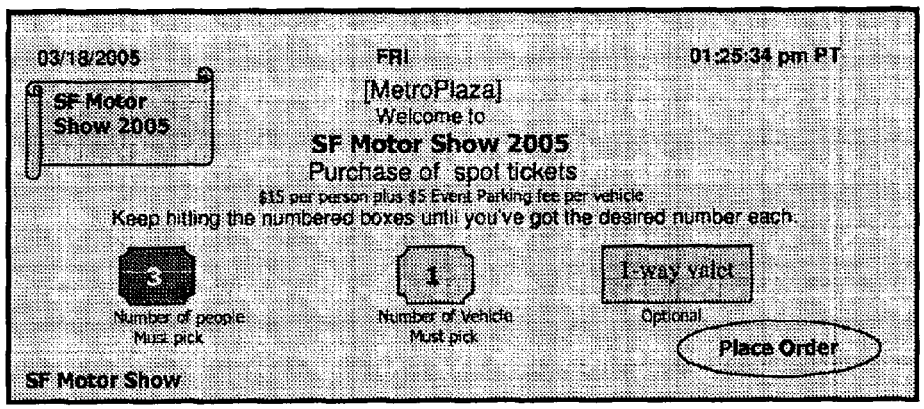

If you hit 'BUY TICKET' on Fig.80.1.1, you will get this screen. In this case, two-way valet is not available, but one-way valet is available. In the event that there are more than one vehicle on one virtual ticket, PID will be given as many as vehicles.

Keep hitting the number key until you've got the desired number {1,...,9}
You must pick the number of people and the number of vehicle, but [1-way valet] is optional.
And then you will press 'Place Order'.

formerly Fig.80.5.1 PAYMENT OPTIONS FOR SPOT PURCHASE MP EXPOS formerly Fig.80.5.2 Thank You for Payment <MP EXPOS> formerly Fig.80.5.3 Remote Check-In Spot Tickets MP EXPOS formerly Fig.80.6 Goodbye          <MP Expos>

VIMO DEFAULT SCREEN

Whenever VIMO is plugged into any power outlet, then the LCD panel will show the following default screen. When a vehicle enters am effective range of any BS, then the default screen will change to the 'WELCOME' screen so that User can start On-Gate or Off-Gate sessions or other MP sessions. This default screen shows up when there is no Welcome screen loading up.

Personal Organizer:

1) User programming – data entry, aftermarket support
2) Entertainment – A/V streaming, podcasting, mobile TV
3) Vehicle Upkeep & Maintenance Records Fig. 117
(formerly Fig. 1000.1 VIMO Default Screen

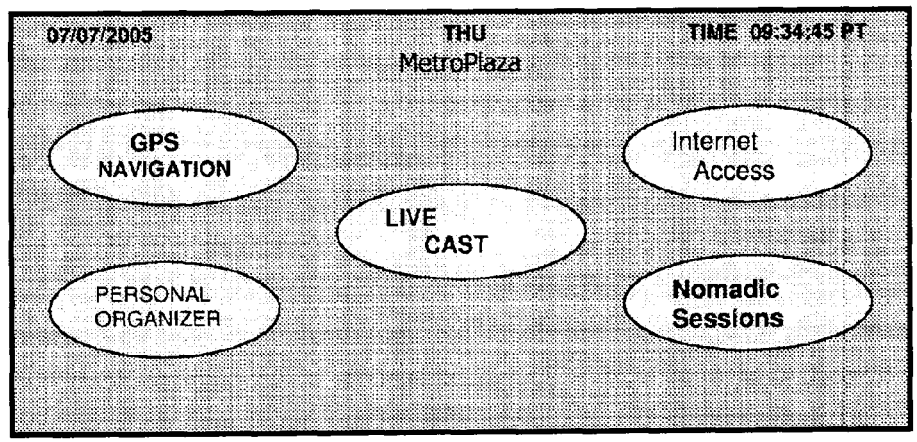

1) Live Cast : Real-time Traffic News and Data Feeds
2) Internet Access : nomadic Internet access
3) Nomadic sessions : For all MetroPlaza sessions whose Welcome screens will automatically load up on screen, when passing by a BS, this " Nomadic Sessions" key does not need to be pressed.
However, other MetroPlaza sessions like podcasting, A/V streaming, radios, and video games, etc. will need to press this key for access.

KEYPAD for DOB entry
Fig. 118 formerly Fig.63.0000

1) Keypad

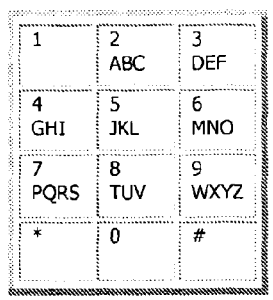

Depending on the requirements, a different type of the Fill-In Box will show up.

2) Diamond Key for releasing my mobile number

If you want to receive Ticket ID information on your mobile phone, then hit the above Diamond symbol to allow your already stored mobile phone number to be released to BS. Hit it only after DOB entry is done.

3)Fill-In Box a) DOB

| m | m | d | d | y | y | y | y |
|---|---|---|---|---|---|---|---|
| 0 | 5 | 0 | 1 | 1 | 9 | 4 | 8 |

As you enter your date of birth< May 1, 1948 > on the above keypad, mmddyyyy columns are filled in the order each character is entered as shown at left When done with DOB entry, press * once
To correct error, press # once b) 3ʳᵈ Party Mobile Phone Entry
If you want to enter a third party mobile phone number that is to receive any virtual ticket information from a BS, press # twice to get the following Fill-In Box For Third Party Phone Number Entry.

| Country code | | Area Code | | Prefix | | | Number | | | | |
|---|---|---|---|---|---|---|---|---|---|---|---|
| 8 | 2 | 2 | 0 | 6 | 2 | 4 | 8 | 9 | 3 | 9 | 3 | 7 |

When done with phone number entry, press * once.

c) Currency entry
Currency: US$ or others
e.g. $125.75

| US Dollars | | | Cents | |
|---|---|---|---|---|
| 1 | 2 | 5 | 7 | 5 |

Fig. 119 formerly

Vehicle Length Scanner(VLS) Fig.1000.3

Vertical light curtains of infrared beams are to be installed at MGX so as to scan the vehicles passing under MGX and measure up their actual lengths, including loads, etc. to compare with their registered lengths. The width of the light curtain is to be as almost large as the width of each lane to cover the whole width of any vehicle.

VLS is designed to measure the vehicle speed and duration of the block of light curtain caused by the vehicle passing under in order to calculate the measured length of the vehicle.

If vehicle speed is V (in miles per hour), and if scanning time of a vehicle is T( in milliseconds), then the measured length in meters of the vehicle $L = 0.044694 \, V*T/100.$ $0.044694 V*T/100 = L$  ( if V in miles )
$0.027778 V*T/100 = L$  ( if V in kilometers )
Fig. 119 formerly Fig.1000.3 VLS

Vertical light curtain of Infrared Beam

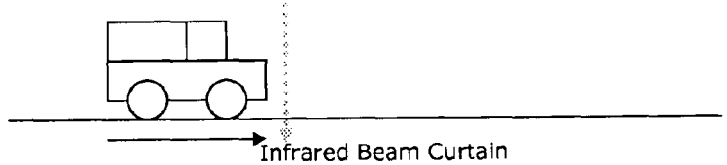

Infrared Beam Curtain

Travel Direction of Vehicle

T = Scan Time in milliseconds
Vm = Vehicle Speed in miles
Lm = measured Vehicle Length in meters Lr = registered length of a vehicle itself in meter, without any load or attached item.

$\alpha$ = allowable extra length in meter to be set by local toll authority

[ End of VLS ]

formerly OnGate and OffGate
Fig.1000.0 Two-Way 6-Lane Toll Plaza

On the right, there are 6 toll lanes bound for MGX, but there should not necessarily be six lanes on the left.

formerly **Fig. 1000.2 VIMO™ WITH VOICE TAGS for selection of Payment Options.
Diagram : START & SHOOT buttons implemented on Steering Wheel**

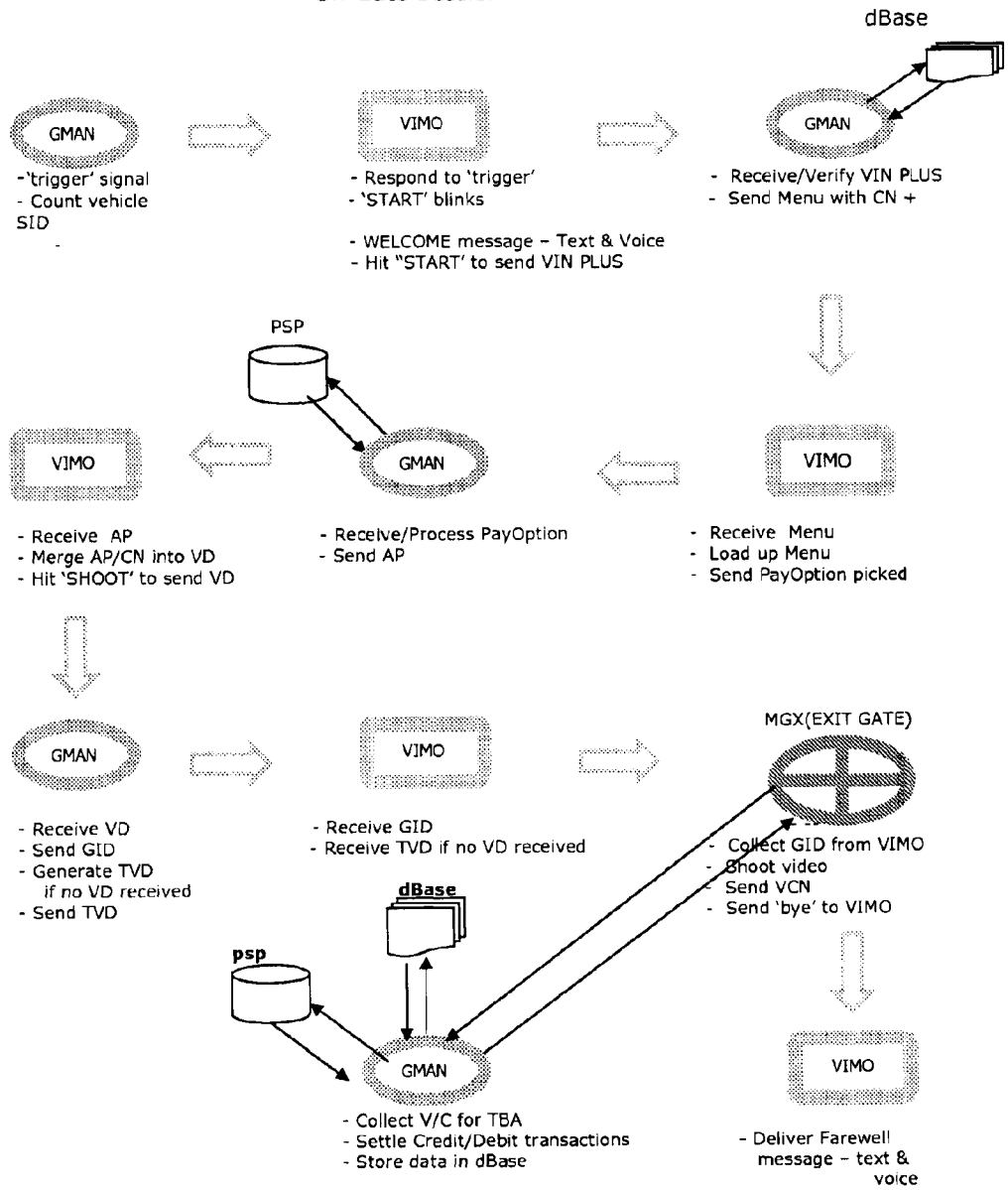
Fig. 122 formerly FIG. 1001
Flow Chart of MetroGate™
On-Gate Session Fig. 123
formerly FIG. 1092

Flow Chart of MetroGate™
Off-Gate Session

'START' – either automatically or manually on

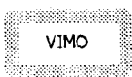
VIMO
- Respond to 'trigger'
- WELCOME – Text & Voice
- Hit NEXT MOVE
- Hit Off-Gate dBase
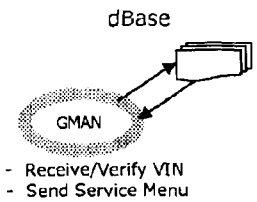
GMAN
- Receive/Verify VIN
- Send Service Menu PSP
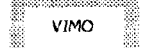

VIMO

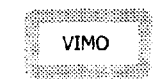
GMAN
- Receive/Process PayOptions
- Send AP

VIMO
- Start 300-sec. timer
- Load up Service Menu
- Send PayOptions picked plus serviceOption

- Receive AP
- Load up 'Thanks'
- Advise Stop chosen
- Advise Continue
- Timer shows 50-sec. notice
- Timer closes session

GMAN dBase

- Comply with Stop
- Send/store data to DB
- Comply with Continue
- Prompt VIMO to load up Menu MGX(EXIT GATE)
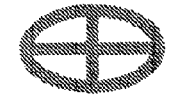
- Rollover from On-Gate
- Prompt VIMO to load up Menu formerly FIG. 1003

Flow Chart of MetroPlaza™
Drive Around Shopping

Fig. 125
formerly FIG. 1004

Flow Chart of MetroPlaza™
Ball Parks

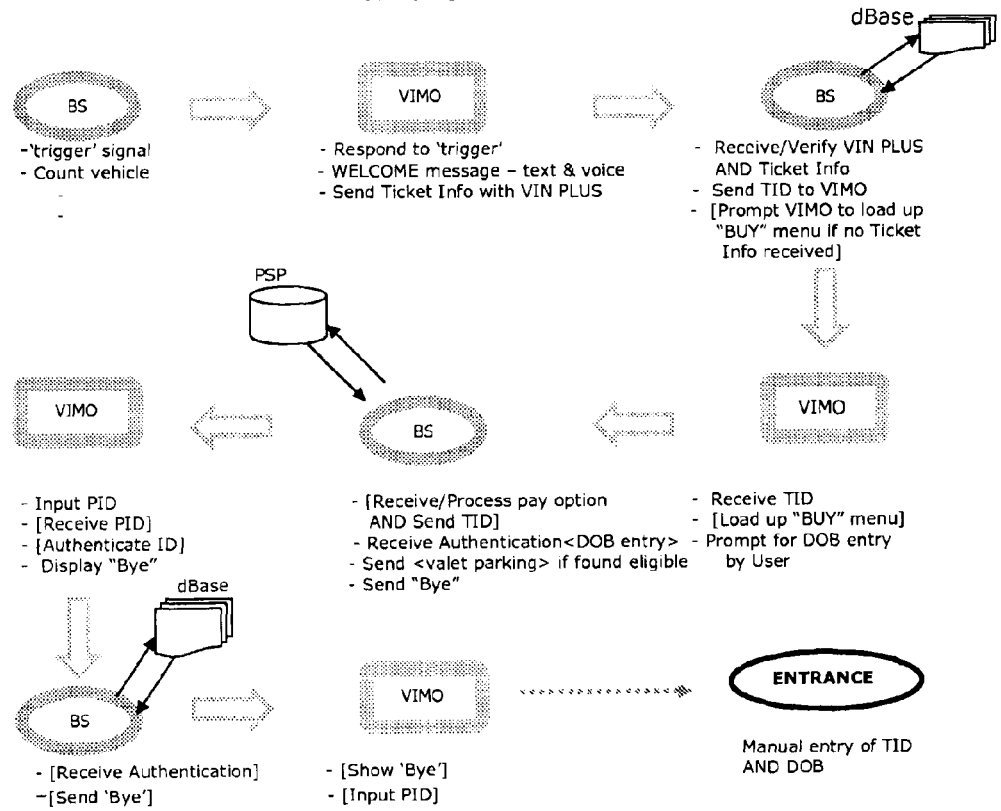

- 'trigger' signal
- Count vehicle

- Respond to 'trigger'
- WELCOME message – text & voice
- Send Ticket Info with VIN PLUS

- Receive/Verify VIN PLUS AND Ticket Info
- Send TID to VIMO
- [Prompt VIMO to load up "BUY" menu if no Ticket Info received]

- Input PID
- [Receive PID]
- [Authenticate ID]
- Display "Bye"

- [Receive/Process pay option AND Send TID]
- Receive Authentication<DOB entry>
- Send <valet parking> if found eligible
- Send "Bye"

- Receive TID
- [Load up "BUY" menu]
- Prompt for DOB entry by User

- [Receive Authentication]
- [Send 'Bye']

- [Show 'Bye']
- [Input PID]

Manual entry of TID AND DOB

TID = Ticket ID
PID = Parking ID
Input PID: There can be two different ways of executing 'Input PID'.
        If each parking spot is not equipped with a RFID chip, then User has to make a manual entry of PID into VIMO and transmit it to BS.
        If each parking spot is equipped with a RFID PID, then User has to press 'Match PID' key to scan/read the RFID PID to transmit it to BS.

To avoid the complexity of ramifications, including type of parking, this flowchart shows the simplest process comprising only the prepaid ticket holders and the spot ticket buyers.

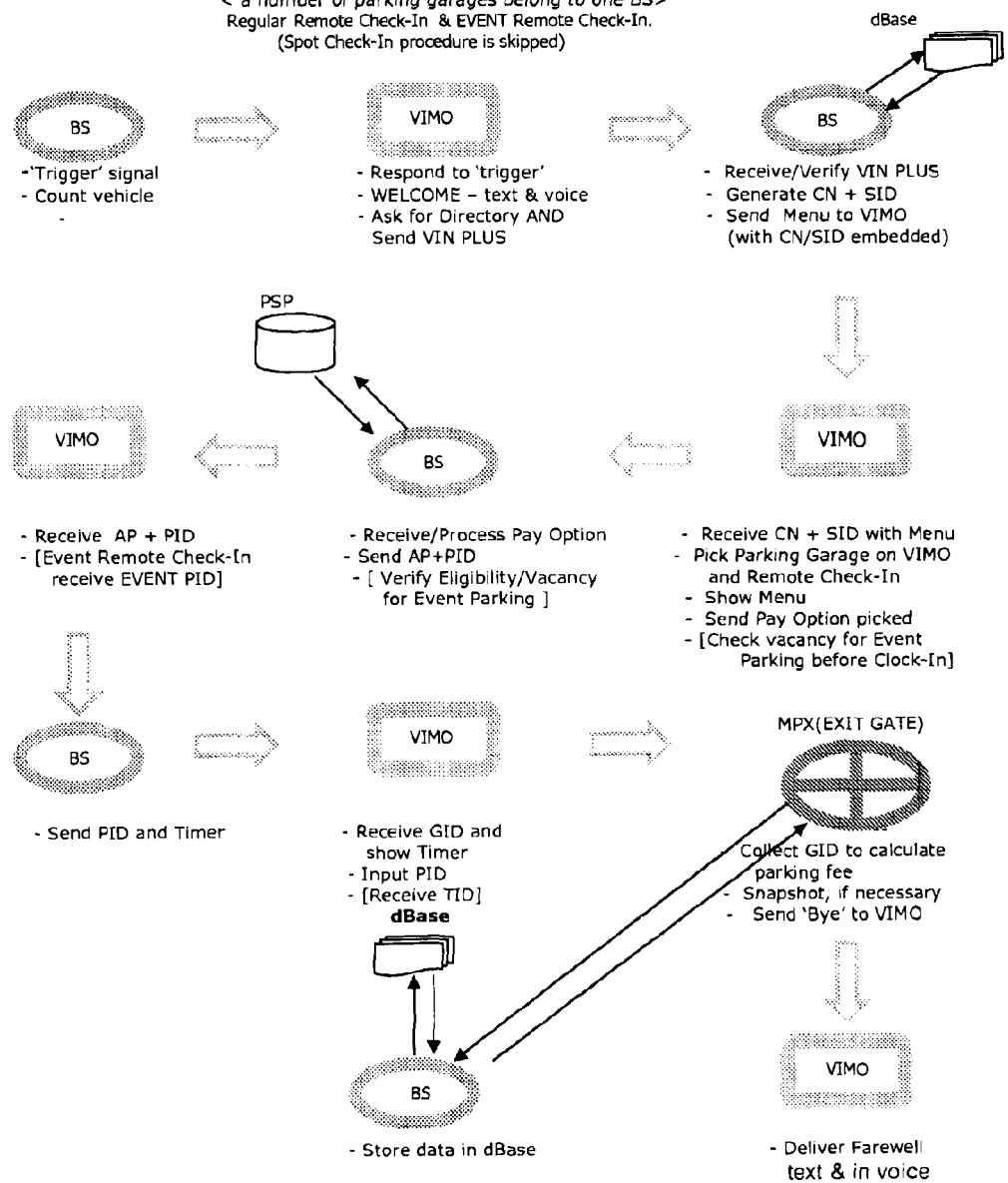

formerly FIG. 1006

Flow Chart of MetroPlaza™
Street Parking [Curbside]

(formerly FIG. 1007)

Flow Chart of MetroPlaza™
Airport Parking & Remote Check-In for Boarding
Long Term Parking This flowchart illustrates that a driver takes a long-term parking to take a flight either by self-park or by valet parking service formerly FIG. 1008

Flow Chart of MetroPlaza™
Airport Parking & Remote Check-In for Boarding
Return of Rental Car This flowchart illustrates that a driver returns a rental car to take a flight either by self-park or by valet parking service.

formerly FIG. 1009 formerly FIG. 1012

Select Screen Displays of VIMO™

DriveOnPay™ VIMO™  Payment Option Menu Screen

US PATENT PENDING 60804061        WIPO PCT/IB2006/053654

FYI, "START" and 'SHOOT' buttons are placed outside the LCD touchscreen, and are for exclusive use for MG OnGate mode and rarely for OffGate mode.
The menu screen lasts for 12 seconds.

Fig. 134
formerly FIG. 1013

DriveOnPay™ VIMO™  Remote Check-In FOR DEPARTURE
and BOTH DEPARTURE & ARRIVAL

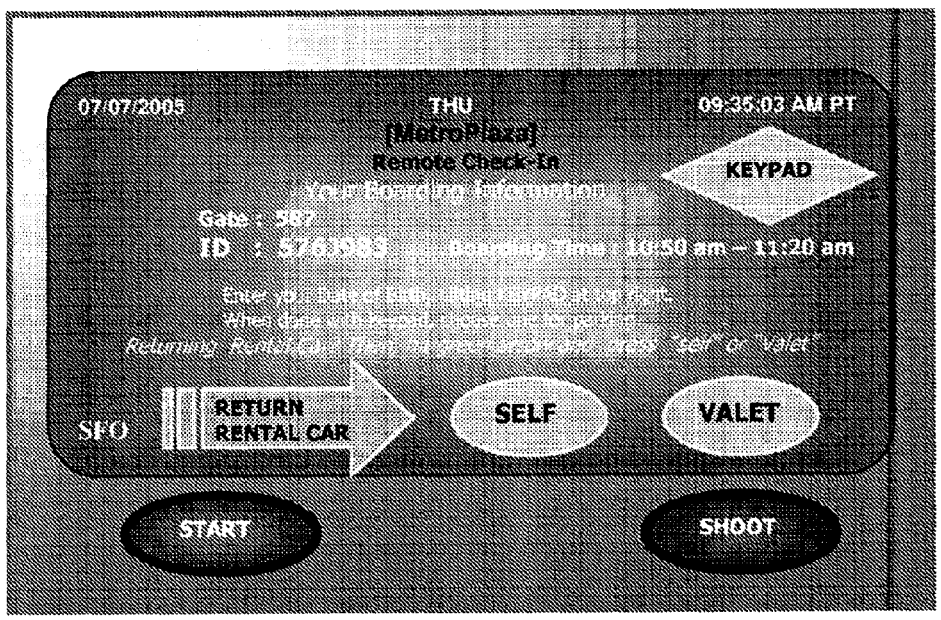

US PATENT PENDING 60804061          WIPO PCT/IB2006/053654

The 'Return Rental Car" icons will be set for up for rental vehicles only.
The 7-digit ID shown on the screen as boarding ID indicates it was issued at 09:53 am, though at top right, the time shows 09:35 am. This ID is usable within two hours maximum and will be invalid after that.

Fig. 135
formerly FIG. 1014

DriveOnPay™ VIMO™         Top Events of the day  < MP DAS >

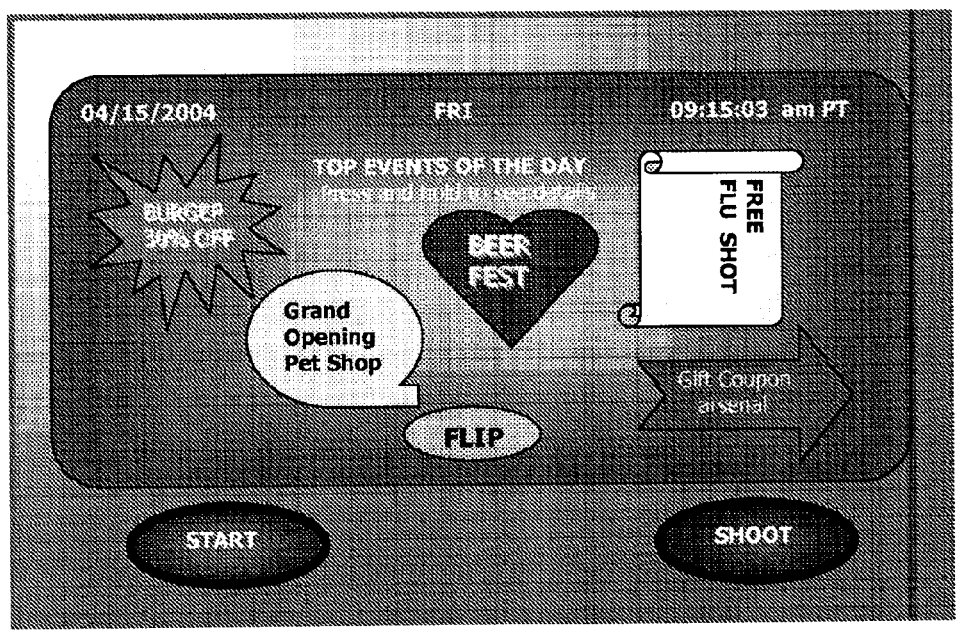

US PATENT PENDING 60804061         WIPO PCT/IB2006/053654

To human eyes, 5 to 7 icons at maximum are recognizable at a glance. More than 7 will confuse user's perception. The tiled array of numerous icons on mobile screen is less ergonomic.
This is why the icons representing each different store or business here have different shapes in a shift away from the tiled array of rectangular icons. The icons on the screen do not keep the same positions but rotates. When pressed, the icon will be replaced by another one hiding in wait. You will need to press and hold to get access to the menu of the business represented by the icon. To change the entire screen, you will press the FLIP" key.

This icon or banner rotation hierarchy is patented.

Fig. 136
formerly FIG. 1015

DriveOnPay™ VIMO™  Default Screen

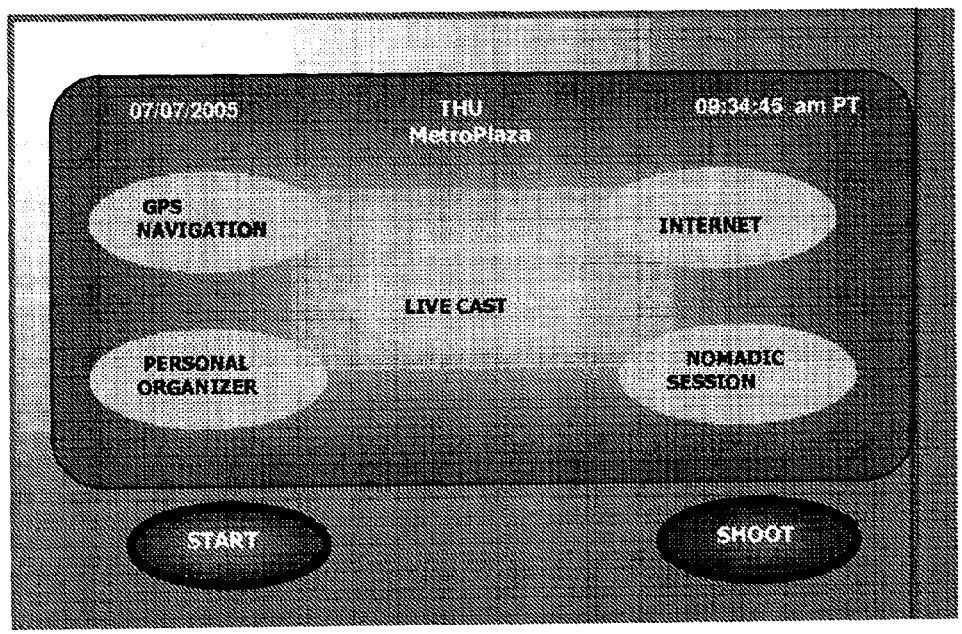

US PATENT PENDING 60804061        WIPO PCT/IB2006/053654

This is the default screen displayed when VIMO™ is outside the 5-mile range of any Base Station. "Personal organizer" will be used for entering payment information, changing or deleting it and can be used as an archive for logging vehicle upkeep and management records. "Nomadic Session" will incorporate mobile TV, smartphone, online or offline video games, satellite radio, MP3 and other gimmicks at the discretion of licensees.

Fig. 137
formerly FIG. 1016

DriveOnPay™ VIMO™ WELCOME Screen

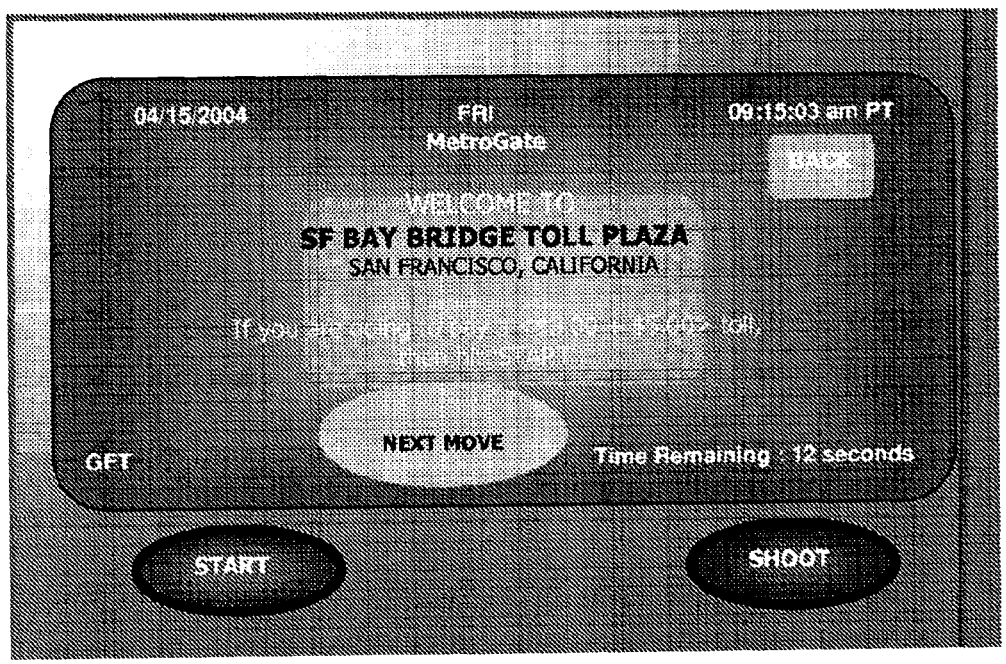

US PATENT PENDING 60804061        WIPO PCT/IB2006/053654

Staggered traffic system can be enabled. In other words, all the vehicles passing through a tollgate either during some hours of the day or at specific locations will pay a normal toll of $3 plus a $5 surcharge, and later, within two weeks, the surcharge thus collected will be refunded to commute vehicles only. Also, personal vehicles with trailers or RVs will be charged an extra $5 for example, when they use certain roads or during specific hours or days. The exit gates of a tollgate are equipped with a vehicle length scanner to measure the actual length and compare it with registered length. This will help streamline traffic, encouraging voluntary restraints of road usage by motorists and help local transport authorities solidify their fund pools.

formerly FIG. 1017

Diagram for D/O

Differential Toll for Oversized Private Vehicle

Right after passing MGX, this screen follows the Goodbye screen, if the vehicle has turned out to exceed the limit of allowed length for its registered length. D/O is not in force all day long, seven days a week, but can be applicable to rush hours and to specific routes during some period.

LONG-RANGE LOCATION-SPECIFIC MENU-DRIVEN MOBILE PAYMENT PLATFORM MOUNTED ON VEHICLE DASHTOP

CROSS-REFERENCES TO RELATED APPLICATIONS

The current amendment is in response to Office Action dated 13 Oct. 2010 with regard to the U.S. non-provisional utility patent application Ser. No. 11/758,004 filed on Jun. 5, 2007, which claims the benefit of the provisional U.S. patent application No. 60/804,061 filed on Jun. 6, 2006.

The foreign priority previously claimed by PCT/IB2006/053654, which was electronically filed with RO/IB, Geneva, on 6 Oct. 2006, is not sought for herein, subject to restoration later.

STATEMENT REGARDING FEDERALLY SPONSORED RESEARCH AND DEVELOPMENT

Not available

THE NAMES OF THE PARTIES TO A JOINT RESEARCH AGREEMENT

Not available

INCORPORATION-BY-REFERENCE OF MATERIAL SUBMITTED ON A COMPACT DISC

Sequence Listing
(1) Glossary
(2) Pseudocodes
  1) MG OnGate
  2) MG OffGate
  3) MP DAS
  4) MP Ball Parks
  5) MP Public Parking
  6) MP Curb Parking
  7) MP Airport
  8) MP Subway
  9) MP Expos
  10) MG VLS
  11) TriageCasting
(2) Message format
  a. Biweekly e-mail Statement
  b. Flight Information for MP Airport
  c. Message Format for MG OnGate

BACKGROUND OF THE INVENTION (1) Field of the Invention

The invention relates to automotive telematics that deals mainly with Information and Communication Technology (ICT) for automotive vehicles, with emphasis given on such fast-evolving technologies as encryption, identifications, authentications, vehicle electronics, telemetry, touchscreen display, GPS technology and location-specific digital transactions.

(2) Description of the Background Art

The ever-worsening traffic congestion around the globe has pervasively wrought havoc on modern urban and rural living, spreading its ripple effects on all walks of life. A traffic surge, among other things, is a prime mover behind the traffic congestion. Categorically, parameters of traffic surges can be largely grouped into Traffic Surge Boosters (TSBoo) and Traffic Surge Buffers (TSBuff). Some parameters may clearly represent either TSBoo or TSBuff, opposed to others that are overlapped in both categories and susceptible to surrounding conditions.

Parameters associated with car parks and local events, for example, may keep hanging in the balance of TSBoo and TSBuf, depending on the timing and sequencing thereof. On the other hand, desolate road conditions and bad weather, like rains, should work as TSBoo all the time. To help optimize and streamline the urban traffic flow by regulating anticipated and unanticipated traffic surges, the above-mentioned susceptibility should be under control to turn it into TSBuff to a maximum extent possible.

To do such a challenging task of minimizing TSBoo, data mining efficiency related to traffic data events without intruding on privacy, coupled with triaging funds and resources in an optimal sequencing, is imperative. Thus, a primal focus should be on car parks and tollgates to minimize TSBoo by harnessing both the vehicle traffic and traffic data events that would otherwise be left underutilized. At the same time, mobile payments at locations other than car parks and tollgates, so far as drivers and vehicles are involved, are given as much focus in order to generate an all-encompassing solution to the traffic congestion as a whole.

Some current gap-filler technology adopted for toll collection, for example, is only spurring the devastating entropies of traffic safety and conveniences worldwide. It is because such parameters as TSBoo and TSBuff are intertwined, intermingled, hybridized and mutated so much so that the current ETC (Electronic Toll Collection) technology combining cash and electronic collection does no longer stay fit to solve the anomalies arising out of them but only ends up the opposite of what was intended. In other words, behavioral changes of both consumers and motorists are hardly kept up with by any new technological breakthroughs due to the persistent aftermarket prowess of obsolescent technology.

Ironically enough, convenience of today is rapidly becoming the root cause for entropies of tomorrow. Some realistic technological compromises and tradeoffs may appear to be good up to a certain level, but may stop working after reaching that specific level. After that level, a technological breakthrough requiring a paradigm shift is a must-come solution, since further growing ramifications from those compromises and tradeoffs may eventually lead up to a catch-22 situation. There is a British adage: "You can't jump over a ditch with two leaps." This adage implies why at a certain point of time, a disruptive solution is imperative and why this invention seeks for a disruptive solution to the conventional technology. DriveOn Pay™ has reversed the idée fixe that merchants should carry paying terminals, but has sought for a paradigm shift requiring Users to carry paying terminals, aimed at a random and mass-production method of payment processing, instead of the current serial processing that calls for a long queue in front of cashiers. It enables motorists to pay behind the wheels at any vehicle speed by improving toll collection speeds by a factor of 32.5 over the current ETC combined with cash collect.

The invention is designed to wirelessly pay not only tolls but also parking fees and do shopping on the go. The wireless paying process can be made behind the wheel while you are driving at a full speed of 80 mph, or are in a car park, or cruising down a shopping arcade in search of a parking lot. You can make the said mobile payments around the clock regardless of a cashier being handy or being attentive or watchful. You are free from such hassles like showing your ID as well, like when presenting a credit card to a cashier at a storefront.

This is a whole lot different than such wireless paying devices on mobile phones as Pay by Touch, Touch and Pay, and TouchPay or whatever they are named. Wireless paying by mobile phones is based on an infrared beam technology, is not menu-driven, and is effective only within an arm's reach. On the other hand, the present invention can pay within a 5-mile range wirelessly at practically any vehicle speeds, with the User-centric features like menu-driven payment options.

The Invention aims to provide a more ergonomic and overarching solution, based on the following needs:

1) To address the worsening traffic congestion, primarily focused on car parks and tollgates, in a bid to strive for a freedom from this man-made affliction.
2) To meet the potential demand for non-Internet, hassle-free, phishing-free, and wireless payment system on the go, mostly behind the wheel and to create a fourth dimension to e-commerce, e-marketing, and e-advertising, adding a spontaneity and JIT feature. Mobile payment solutions like this will certainly make up the next wave of JIT e-Commerce within the next decade.
3) To create a new cost-conscious culture of ticket-free, biometrics-free "Remote Check-In or Admissions" for airports, ball parks, and other public gatherings. This is aimed at primarily eliminating long waiting queues in front of theaters, ball parks, rock concerts, trade shows, and for security checks at airports, for the purpose of enhancing consumer convenience and saving administrative costs. And secondarily at reducing the waste of resources, like materials and labor, the costs of biometric data updates, and the growing overheads.
4) To facilitate counterterrorism screening and alleviate security threats and security costs by providing easier access to identifying the security-related problem spots beforehand or afterwards in a super-fast way. The ECHEOLON may globally monitor all the electronic communications but can hardly track vehicles used for crimes and terrors unless those vehicles use any electronic communication devices or whatsoever. DriveOn Pay™ enables vehicle data to be disclosed and collected at certain locations like tollgates, car parks, shopping centers, airports, tourist places and expos, with the consent of motorists, which means heading off any privacy concerns.

In other words, DriveOn Pay™ can pinpoint the more localized attention to any security problem spots and detect any security vulnerability. The soaring security costs due to the 9/11 of 2001 have lately sent major airliners teetering on the brink of bankruptcy, while low-cost airliners start mushrooming. But these kinds of debacle or shakeout seemingly have some latent risks that will soon come to hit flight passengers harder. It is pointed out that security costs and related expenses have pushed the overheads for airline industry globally by 20%.

Electronic gadgetry and gizmos have added a new dimension to modern comforts, particularly in vehicles. However, they have in part created a realm of risks, dangers and discomforts in terms of Driver Distraction, due to the lack of multidisciplinary design optimization resulting from the centrifugal tendency of automotive gadgetry. Nevertheless, the present invention can help explore the possibility of integrating mutually exclusive automotive gadgetry by giving a mobile payment solution to the said gadgetry.

The present invention will soon prove it has explored the core value of emerging needs of automotive gadgetry in consideration of the growing interdisciplinary "blind spots" and the emerging multidisciplinary coordination needs. The May 29, 2006 article of New York Times elaborates on a recent poll by Harris Interactive, a research firm, the gap between the number of bills paid by check and the number paid online has closed significantly in 2005. More than 37 percent of bills are paid by check and 35 percent are paid online. The remaining 28 percent are paid with cash, debit cards or other payment methods. Given that trend, according to the newspaper, web payments could surpass checks over 2007. In 2005, 46 percent of bills were paid by check, and 25 percent online.

If this trend were any indication, online payments behind the wheel at a full speed would soon be a top issue in the auto-mobile design, surpassing the mutually exclusive gadgets like GPS navigators, satellite radios and MP3 players. For the same reason, the online payment platform envisioned by the present invention will find a rationale for accommodating and integrating all the mutually exclusive features of the above gadgets into an all-in-one device.

The ostensible mutual exclusivity lying between said automotive gadgets may turn into another hidden face of a common thread linking all of them when an inherent threshold is crossed over. In other words, they may appear to be mutually exclusive initially when they are lacking some common grounds, but later on they tend to shift to a unity if some compelling circumstances that might have hoodwinked them are eliminated. The super-speed wireless payment platform behind the wheel is expected to turn the mutual exclusivity into a unity. This is what this invention aims at.

Ultimately, car parks and tollgates are the main arena where each motorist struggles and competes fiercely for the best in terms of time and money at every moment. Harnessing motorists' behaviors in relation to car parks and tollgates can only find an optimal cure for the best part of traffic congestion, if the concept of "triage" is to work here.

To reduce road anxiety causing speeding, road rages and fatal accidents, tollgate passage should be smooth and fast without stopping, slowdowns or traffic snarls. Rush-hour queues at tollgates stretch over 5 to 10 miles or longer under a scorching sun, with vehicles creeping at 5 mph. Traffic congestion at tollgates alone will remain to be a top agenda item for the following reasons:

1) More gridlocks and tollgate slowdowns are likely to increase in the next decades. Worldwide car density is growing at an annual rate of 50 million, based on the year 2000, and will grow faster in the years to come, foreboding an exponential growth of the traffic congestion. Motorists are faced with more sacrifices at tollgates in terms of gasoline and time henceforward.
2) Growing waste of energy: In the worst case scenario, an on-going doomsaying about a possible depletion of crude oil reserves might come true in 2025-2030.
3) Environmental problems, like global warming, will be a life-and-death issue in another decade, unless greenhouse gas emissions from vehicles are under control. It is a hard fact that running vehicles account for 63% of the $CO_2$ gas emissions over the world, and that the tollgates are responsible for most of the emissions.

At most tollgates, cash collect plus RFID technology is currently used as means of collecting tolls. Long story short, these two methods are not supposed to mix at all for the following reasons:

1) The current mix of cash collect and RFID technology is self-contradictory and can cause a set of never-ending weakest links and a dilemma. Under the current system, motorists are required to choose from cash lanes, RFID lanes and carpool lanes, thereby causing abrupt lane-changing needs to end up in escalating traffic snarls, slowdowns and stops. If both toll booths and the need for lane configurations were eliminated, then there would be no traffic snarls, no slowdown and no stops at tollgates. Overtweaking the current system would lead to more User-unfriendly solutions, ending up an escalation of the scope of entropy.

2) It is absolutely impossible to have 100% of local motorists sign up for prepaid accounts in support of RFID technology including FasTrak and EZ-Pass. Even if it were legislatively mandated, then it would be impossible to enforce all the prepaid accounts to stay in good shape and free of any NSF (non-sufficient fund) situations. Besides, there are non-local motorists, including border-crossing aliens and tourists.

3) Toll booths are a major drag for traffic, and they must be eliminated. Meantime, the booth-free toll-collecting system on toll roads appears to be unmanned on the surface, but it needs a lot of back-office manpower for billing. Even worse, it comes with a fail ratio of 15% plus a considerable misreading ratio. The unmanned toll collection system on toll roads is not very efficient, conditional only to a low traffic volume, and will not justify when the traffic volume grows over a certain level, like a metropolitan volume. The toll roads are currently using ANPR (automatic number plate recognition) cameras and RFID transponder chips and readers. Nevertheless, toll roads are expected to come to 30 in number sooner or later in the United States.

4) In some states like Florida and California, vehicles with RFID transponders are randomly monitored unbeknownst to the motorists, raising privacy issues. Traffic data are critical to forecasting and optimizing the traffic flows, and real-time traffic data events should be watched, monitored and fed into databases without causing any privacy concerns. The current system is outdated for this type of data mining scenarios.

5) To help even out lopsided traffic loads on certain roads, voluntary acts by motorists of bypassing certain routes during specific hours of the day, days of the week or the seasons, should be encouraged by implementing a differential toll system. The current system of toll collection does not fit for this type of traffic optimization schemes.

6) To help cover runaway cost overruns, such extra funding sources as promotional toll sales and special-purpose fundraising that can be done on the road, are a newly sought-for strategy. But the current system is hopelessly lacking any means of introducing such extra funding schemes.

Motorists are entitled to freedom of choice, when paying tolls or whatsoever. The current toll collection system mandates a limited choice of the following:
1) cash
2) automatic debit from a prepaid account linked to RFID transponders.

Even toll roads come with a narrow choice of the following:
1) automatic debit from a prepaid account linked to RFID transponder chips
2) a bill in the mail.

Each motorist's divergent financial situation requires a wider selection of choice. The divergent nature of each motorist's financial situation can only cause a yawning gap between a forced selection of a limited choice and their divergent payment means.

Generally, giving a wider selection of choice will give more chances of looking into consumer behaviors and the shifting tendency thereof, thereby enabling more efficiency and consumer-friendly solutions to be gained in more constructive ways in the future by catching up with the changing trends over time.

The basic approach is to seek non sequitur in getting a solution to a hybridizing and mutating aspects of behavioral shifts in human communications via wireless technology, focusing on User-centric options, insomuch as payment transactions are ultimately a form of formal human communications. In support of this view, the following news excerpt (May 2006) needs to be appreciated:

Quote

There are two principal reasons that TV stations are seeking to broaden their horizons. One is "consumers will increasingly choose what they want to see, when they want to see it, on whatever device they want to see it," said Alan Frank, president and chief executive at the Post-Newsweek Stations division of the Washington Post Company.

Unquote

The present invention should be embodied in the form of a fixture on vehicle dashboard instead of being embedded into mobile phones. DriveOn Pay™ should be a fail-safe operation around the clock, not allowing any single failure. On the other hand, mobile phones are handy, but are not suitable for fail-safe DriveOn Pay™ operations for the following reasons:

1) Mobile phones are elusive from time to time, when a User is in a desperate need. That's because even occasionally, they might happen to be left behind somewhere else. Besides, the chances are that coincidentally the phone battery is dead, when you need the phone desperately.

2) Mobile phones are primarily for voice communications, and may put Users on a collision course more often than not when used as all-in-one devices for mobile TV, streaming video, nomadic Internet connections, digital cameras and live traffic newscast. In other words, an incoming voice call can easily interrupt other all-in-one features mentioned above.

3) Mobile phones are insecure from hackers and malware threats, and are used for more informal occasions. Especially, motorcyclists wouldn't welcome mobile phones as a wireless toll-paying device that can be used while running at a full speed.

Nonetheless, mobile phones may be useful as a supporting device for some situations like: one-time emergency use to cope with thefts or failures of VIMO; and when used as a carrying device of Ticket ID for Remote Check-In.

Major benefits of this invention can be enumerated on both the national and global perspectives as follows:
1) Resource saving effects, including petroleum and trees
2) Labor saving from unmanned operations
3) Environmental protection, which will remain a top global issue in the next decades.
4) Travel safety, including transport security, and comforts in felicific calculus
5) Phishing-free JIT (Just In Time) e-commerce on the go—JITeCGO
6) Synergistic effect on local industry and economy through optimal reallocation of resources
7) Improved quality of life and new cost-conscious and bandwidth-intensive culture.

In conclusion, the prior art made of record and not relied upon is pertinent to the present invention as follows:
a. Breed, U.S. Patent Application Publication No. US2005/0060069 A1 (detailed vehicle system includes toll management).

b. Belani, U.S. Patent Application Publication No. US2007/0050240 A1 (wireless network provides parking guidance for driver).

c. Ji, U.S. Patent Application Publication No. US 2007/0061155 A1 (WiMAX-network-compatible system includes toll and parking billing).

BRIEF SUMMARY OF THE INVENTION (1) Brief Description of the Invention

The present invention aims to be an overarching mobile payment solution to a variety of traffic issues resulting from motorists and vehicles combined together. Simply put, the present invention is intended to solve a concrete problem by solving a more general problem.

As touchscreen display methods and techniques are integral to this invention, it is necessary to illustrate each frame of contents displayed on the touchscreen to show how it works step by step. Being a mobile payment platform behind the wheel, this invention is not only for collection of tolls and parking fees but also deals with an optimal solution to address the traffic congestion issues in general. Therefore, it should be noted that the 9 representative modes of DriveOn Pay™ operations are separately detailed in colored flowcharts, drawings and Sequence Listing, while in this specification, a detailed explanation on how it works is focused on the toll-collecting MG OnGate mode.

To begin with, the operational domains of DriveOn Pay™ are largely divided into MG (MetroGate) and MP (MetroPlaza) sessions. Again, MG sessions taking place within the range of a tollgate are further broken down into OnGate and OffGate sessions, while MP sessions are all other sessions that may take place in a cityscape after passing through the tollgate.

How it Works at a Tollgate

When a motorist approaches GMAN within 5 miles, VIMO, a device included in this invention, loads up a Welcome screen, based on welcome data received from GMAN, a BS for toll collection. When the Welcome screen comes on, a voice welcome is also delivered to alert the driver at the wheel. At this moment, the START button, positioned at bottom left of VIMO, begins to blink in red, indicating said device is ready to transmit to GMAN the encrypted vehicle data called VIN PLUS to GMAN.

When the motorist hits the blinking START, the said data, including license plate number, class, make, model, year, color, size, VIMO ID, ownership and address, etc. is sent to GMAN, which will verify the received data, looking up in database to see if the receive data match the registered data. If matched, then GMAN will generate a CN (control number) and SID (Session ID), and transmit them to each VIMO point to multipoint NLOS (Non Line Of Sight). Meantime, SID will be embedded with a new encryption key to replace the old one. It is noteworthy that not the entire vehicle data are encrypted, but only the critical ones, like payment information and personal profiles, in order to save bandwidths.

As GMAN operates point to multipoint, it can simultaneously communicate with thousands of VIMO units randomly, (not in a serial processing way over multiple lines). To save bandwidth, each MG OnGate session is to be completed within 300 seconds (5 minutes), during which a vehicle running at a speed of 80 mph can cover over 6 miles on the route. Barring any accidents, any motorist can complete a toll-paying transaction within that time frame. In case of any accidents or delays by drivers, an extension of 100 seconds can be repeated until the vehicle passes MGX, where digital video cameras shoot all the vehicles in order to identify for carpool violators and also vehicles without VIMO mounted.

When receiving CN, SID and menu data, VIMO shows CN and menu on the screen, while SID is hidden. For MG OnGate sessions, the payment option menu pops up immediately, and the payment options come in oval-shaped keys with letters like Credit, Debit, Prepaid, 3DAYS and Carpool. If one option is picked and hit, then it will be sent to GMAN in no time and payment is authorized. If the picked option does not get authorization, then the menu screen pops up again and again until a new payment option gets authorization. However, 3DAYS might be the best option to choose, especially when credit and debit cards fail to get authorization.

When payment is authorized, GMAN generates an AP (Approval Number) and sends it to VIMO. On the VIMO screen, a "Thank you for payment" message shows up with AP being displayed in the center. Upon receipt of the "Thank You" message on the screen, VIMO merges CN and AP and other transaction details into an electronic document called VD (Vehicle Dossier). When VD is ready for transmission, then the SHOOT, a green button at bottom right of VIMO, begins to blink in green. If it is hit while blinking, the SHOOT will send VD to GMAN to get GID (Gate ID).

If the driver fails to hit the blinking SHOOT within 15 seconds, then GMAN will take an initiative to generate TVD (Temporary VD), in a bid to save bandwidth. TVD will require an additional tracking charge in order to encourage drivers to hit SHOOT in time later on.

Vehicles without VIMO, vehicles with defunct VIMO, and slow motorists who have not completed a paying process before passing MGX will be classified as NVD requiring special handling. MGX will sound beep to an NVD vehicle and will take an extra close-up snapshot at the Driver. And at the same time, the AutoCite function of DriveOn Pay™ will issue a citation for NVD vehicles, but it is optional that an alert will be sent to a nearby patrol car.

Meantime, slow motorists who have failed to complete a paying process in time will be later reclassified as QVD (Quasi VD), if CN and SID are found later through tracking, and be given a waiver of a heavy penalty imposed by AutoCite. QVD vehicles will be required to pay an extra tracking charge, though, and will be spared a chance for forced selection of 3DAYS at a 50% surcharge.

MGX, a crossbar structure equipped with video cameras, is to shoot infrared beams at oncoming vehicles (after completing a payment process) on each lane constantly from the top of the crossbar, at least at an altitude of 4.5 meters or higher and at a 45° angle. This constant infrared beam helps collect GID or TVD and take a number of video snapshots, in order to embed GID or TVD into the Video Capture.

The 45° angle gives the distance equivalent to the height of the crossbar for collecting GID or TVD and taking snapshots in time. And vehicles running at an average speed of 80 mph are found to normally keep a bumper-to-bumper distance of roughly 6 meters.

It is not always necessary to transmit all the video data feeds to GMAN and database. Instead, video capture data of each vehicle will stay in the buffer memory of MGX until these video data will later be sorted out by GMAN so as to be either deleted or sent to dBase for archiving. Meantime, MGX will generate VCN (Video Capture Number) to help GMAN finalize each transaction first hand without having to bother to send all the heavy video files to GMAN.

(2) Description of the Possible Applications of the Invention

The invention, aimed at being a more scalable mobile payment platform for wider scope of operational applicability, provides further detailed steps, methods and operational instructions in the form of color-coded flowcharts and on-screen display diagrams in the following applicable locations:
1) Tollgates: paying tolls, buying prepaid tolls, paying traffic fines, on-the-road fundraising, etc.
2) Airports: paying parking fees, one-way or two-way valet parking service, ticket-free boarding, privacy-friendly security enforcer
3) Shopping centers: behind-the-wheel shopping, ordering carryout orders, booking for restaurants, grocery shopping, collecting parking fees and validating free parking
4) Subway stations: paying parking fee, and unmanned citation for parking violations
5) Curbside Parking: paying parking fee, and unmanned citation for parking violations
6) Commercial parking garages: paying parking fees, reserving for individual parking and arranging for Event Parking
7) Huge-scale public gatherings, including expos, trade shows, conventions: arranging for Event Parking for a huge event crowd featuring prior arrangement of valet parking services for VIPs and event crews
8) Ball parks: Ticket-free admission, valet service, and spot purchase of virtual tickets, and paying parking fees.

Besides, this invention can also be implemented and deployed in national parks, tourist places, theme parks, historic places, seasonal resorts, "members-only" beaches and hunting ranches, RV parks and camping villages, and others involving motorists.

More important, DriveOn Pay™ can collect hour-specific vehicle data in a privacy-friendly way and thus has a prowess of providing target-based real-time traffic data feeds to motorists. It will make it possible to enforce location-based security investigations at transportation hubs like airports more efficiently, without causing any inconvenience and without raising privacy issues.

It will also make it possible to do more efficient data mining achievements toward improving traffic safety and comforts. And above all, it will create a new JIT e-commerce domain on the go. The JITeCGO is fundamentally different than the e-commerce based on both stationary or nomadic Internet access in various ways, particularly in security, spontaneity and JIT access to merchandise or service.

One example: You can order carryout items on VIMO for JIT (Just-In-Time) pickup, while driving around in a shopping center. Likewise, you can buy virtual tickets for a ball game on the spot, while driving in your car within 5 miles of the ball park on the day of the game, and can do Remote Check-In for admission by working on a VIMO. Even some shopping centers will be able to propagate luring commercials to passing-by vehicles.

Of course, you can do Remote Check-In, based on your season ticket for ball games, of which information is stored in your VIMO. Being eligible for valet parking service, you will pull up to the entrance, and get out of your car, and walk toward the entrance keypad to enter your ticket ID and your 8-digit Date of Birth to authenticate it. Valet service will take care of the rest.

BRIEF DESCRIPTION OF THE DRAWINGS

NOTE: The drawings of this document have been renumbered to comply with United States Patent and Trademark Office requirements. Parts of this document refer to the drawings by their former numbers. Because of this, this BRIEF DESCRIPTION OF THE DRAWINGS and the drawings themselves indicate both former and final numbers for the drawings. Readers should consider both numbering systems when determining which drawings correspond to particular drawing numbers to which this document refers.

Table of Contents
Chapter 1 Diagrams
1) Diagrams MG OnGate FIG. 1-FIG. 9 (formerly FIG. 10.1-FIG. 10.9)
2) Diagrams MG OffGate FIG. 10-FIG. 23 (formerly FIG. 20.1-FIG. 20.6)
3) Diagrams MP DAS FIG. 24-FIG. 35 (formerly FIG. 30.1-FIG. 30.8)
4) Diagrams MP Ball Parks FIG. 36-FIG. 50 (formerly FIG. 51.1-FIG. 51.5.4)
5) Diagrams MP Public Parking FIG. 51-FIG. 63 (formerly FIG. 61.1-FIG. 61.5.1)
6) Diagrams MP Curb Parking FIG. 64-FIG. 67 (formerly FIG. 62.1-FIG. 62.4)
7) Diagrams MP Airport FIG. 68-FIG. 88 (formerly FIG. 63.1-FIG. 63.7)
8) Diagrams MP Subway FIG. 89-FIG. 98 (formerly FIG. 70.1-FIG. 70.6)
9) Diagrams MP Expos FIG. 99-FIG. 116 (formerly FIG. 80.1-FIG. 80.6)
10) Generic Diagrams
   a) VIMO default screen FIG. 117 (formerly FIG. 1000.1)
   b) Keypad for DOB entry FIG. 118 (formerly FIG. 63.0000)
   c) VLS FIG. 119 (formerly FIG. 1000.3)
   d) OnGate and OffGate FIG. 120 (formerly FIG. 1000.0)
   e) VIMO with Voice Tags FIG. 121 (formerly FIG. 1000.2)

Figure 3:
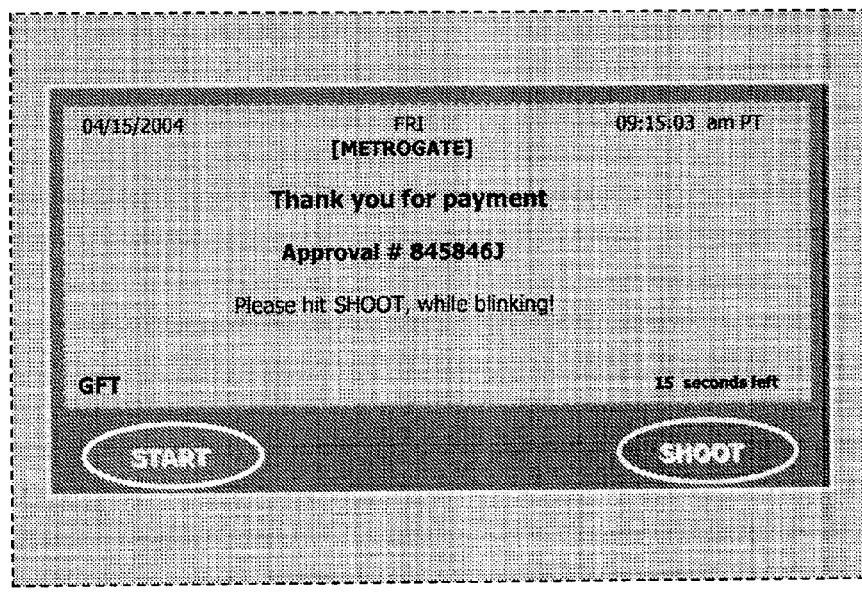
Figure 4:
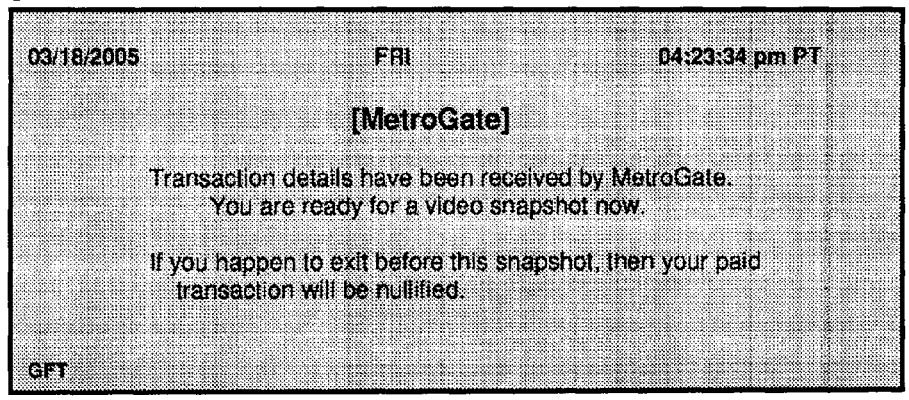
Figure 6:
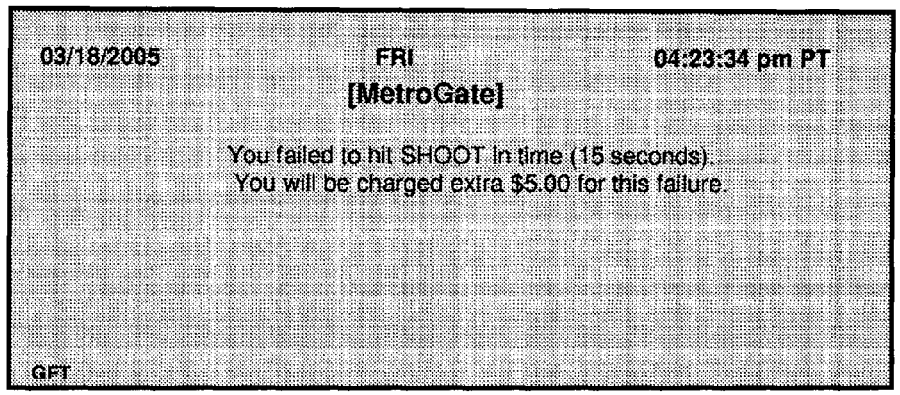
Figure 7:
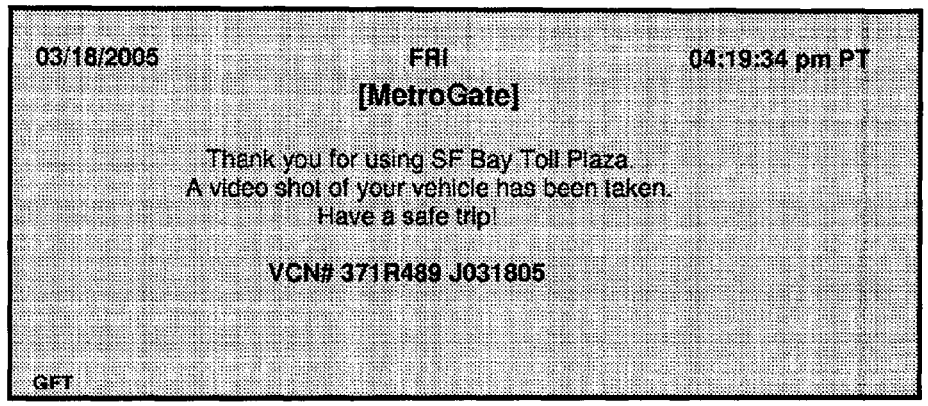
Figure 8:
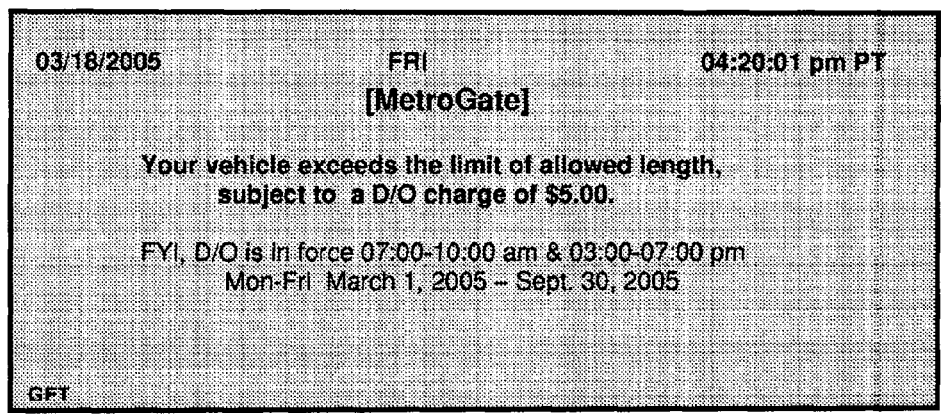
Figure 9:
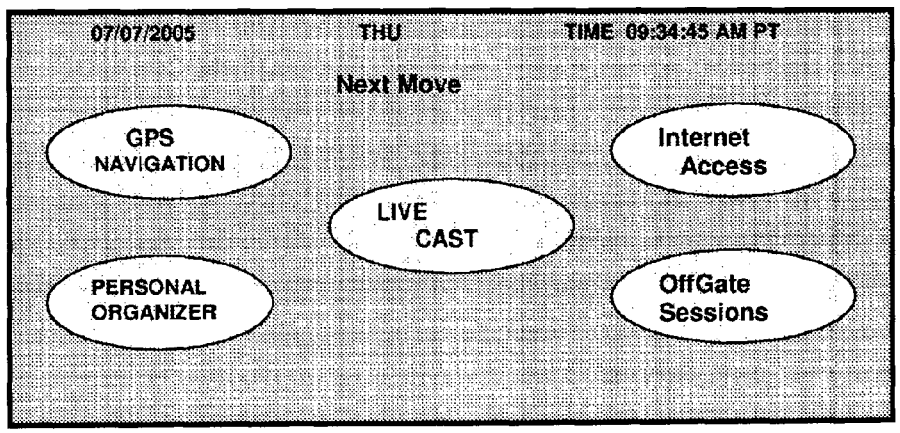
Figure 10:
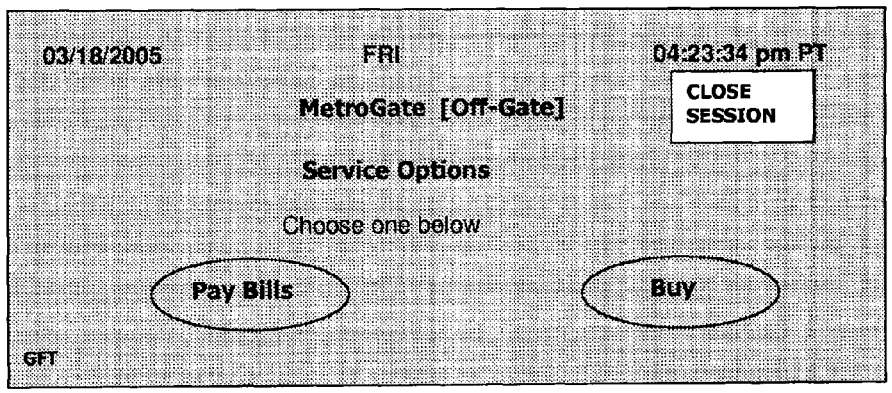
Figure 11:
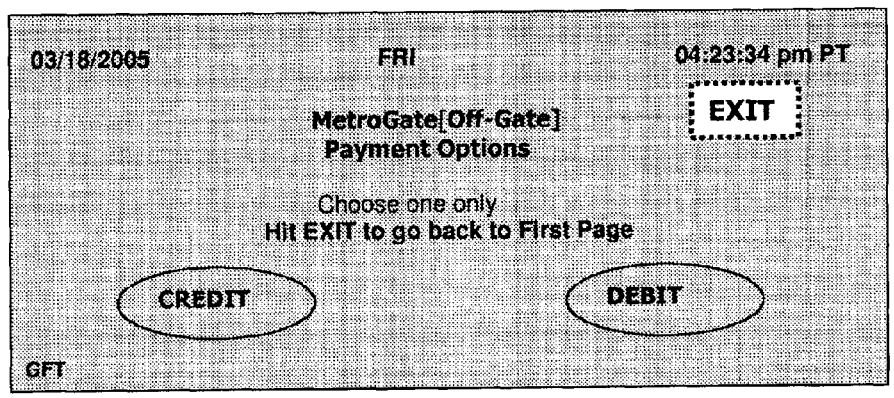
Figure 12:
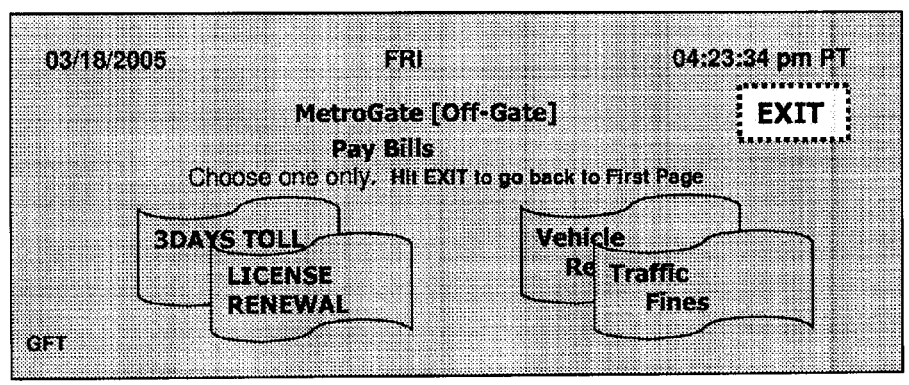
Figure 13:
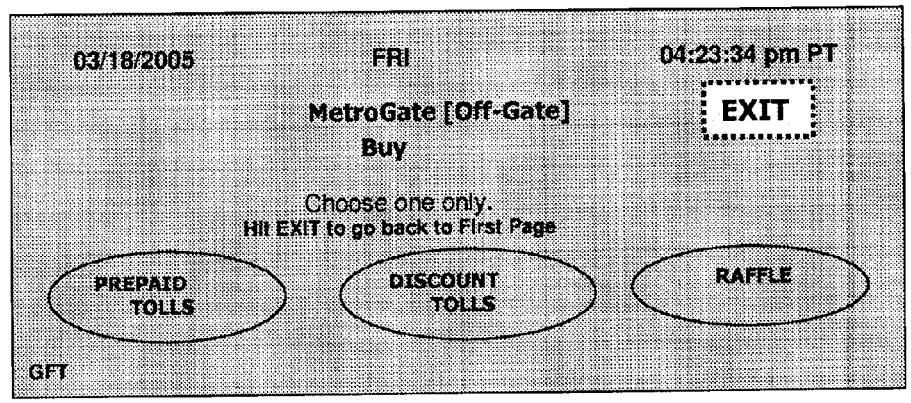
Figure 14:
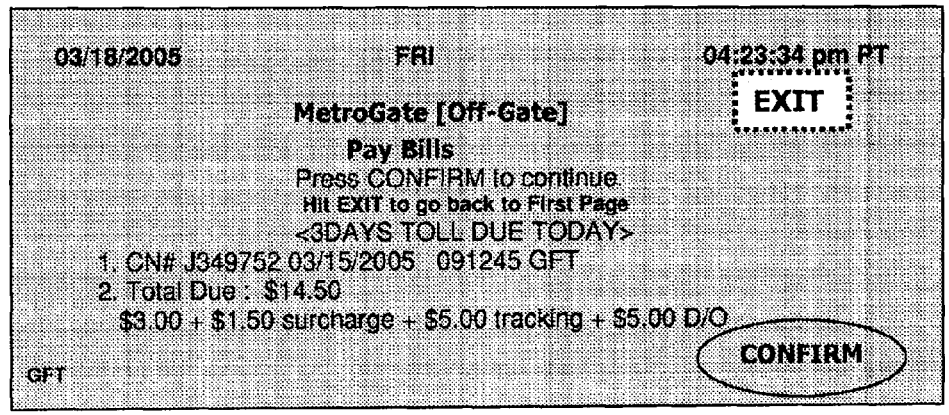
Figure 15:
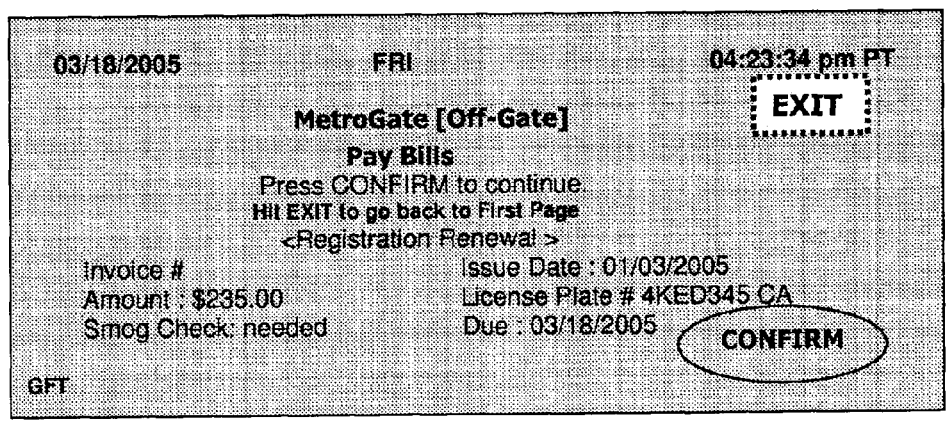
Figure 16:
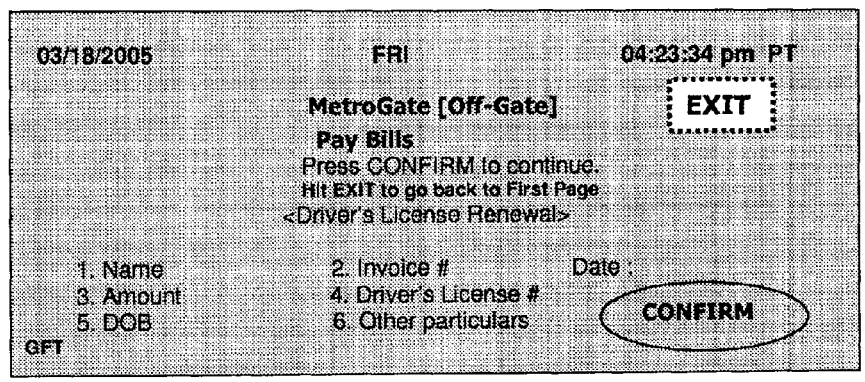
Figure 17:
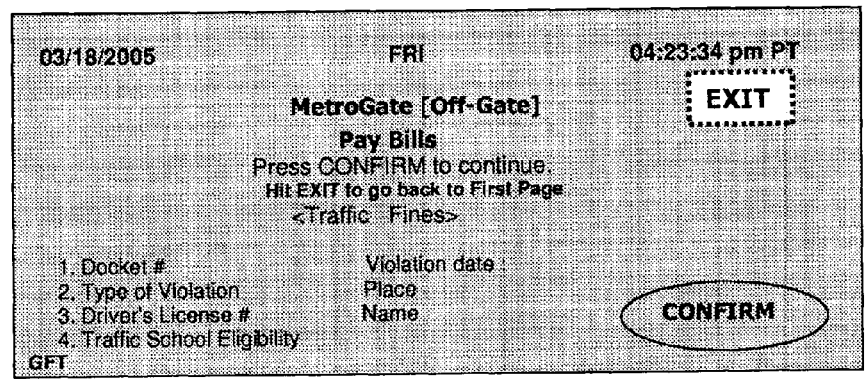
Figure 18:
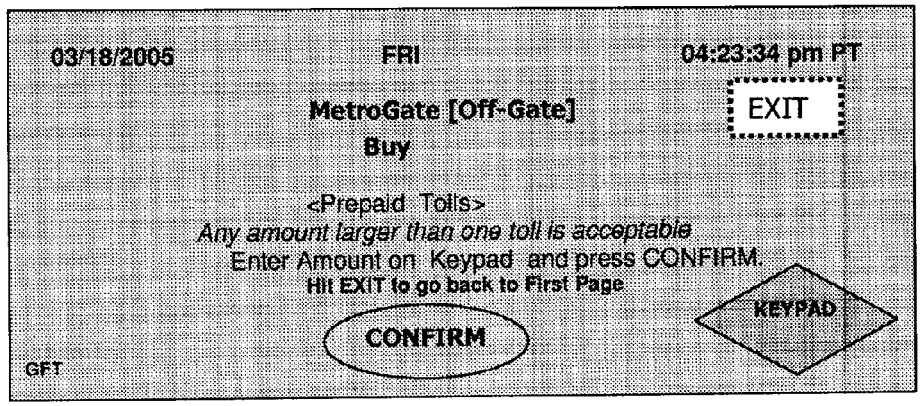
Figure 19:
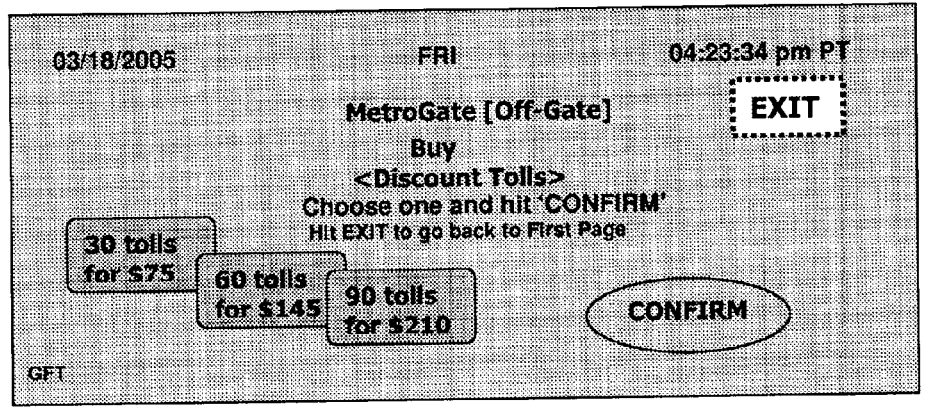
Figure 20:
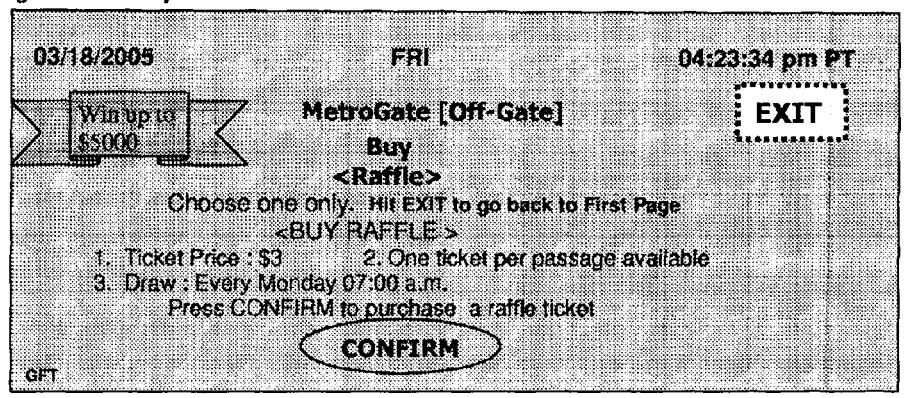
Figure 21:
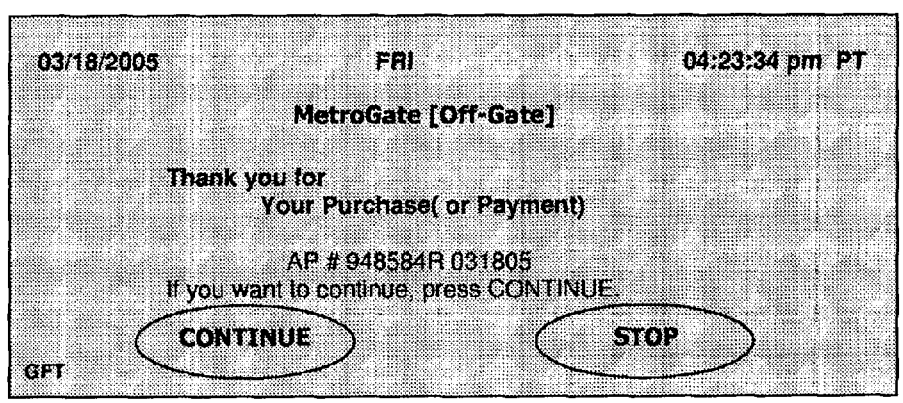
Figure 22:
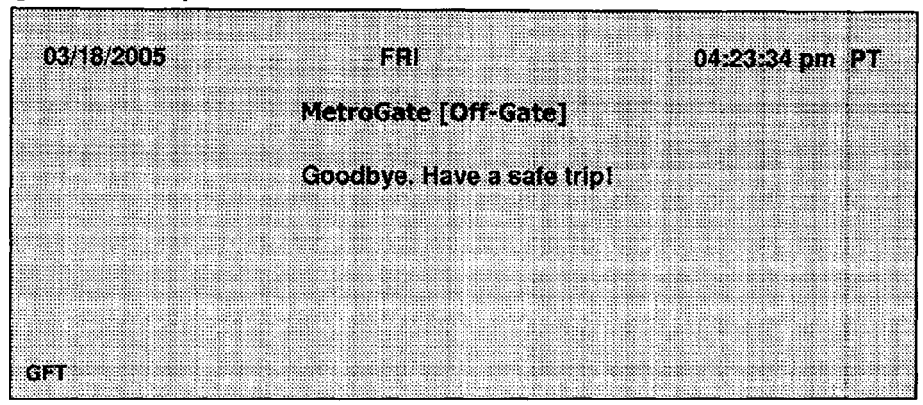
Figure 23:
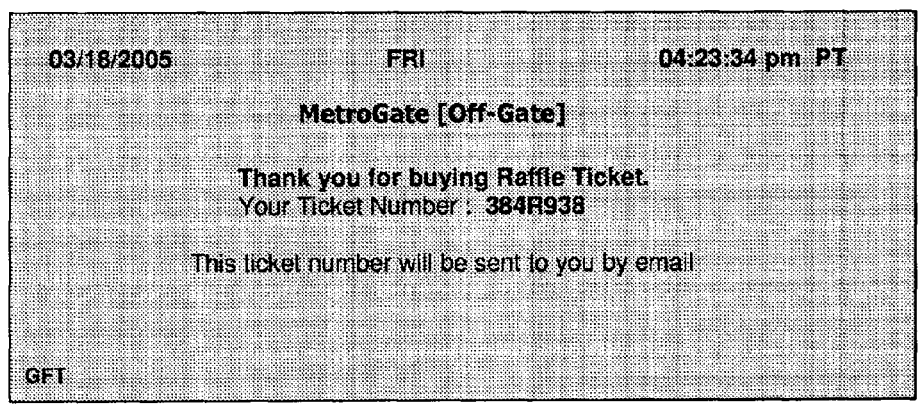

Chapter II Flowcharts
Flowcharts
1) MG OnGate
2) MG OffGate
3) MP DAS
4) MP Ball Parks
5) MP Public Parking
6) MP Curb Parking
7) MP Airport
8) MP Subway
9) MP Expos Chapter III Additional Disclosure
Diagram MG OnGate
FIG. 1 (formerly FIG. 10.1) Welcome Screen
FIG. 2 (formerly FIG. 10.2) Payment Option Menu
FIG. 3 (formerly FIG. 10.3) AP-Thank You Screen
FIG. 4 (formerly FIG. 10.4) VD sent
FIG. 5 (formerly FIG. 10.5) Time Extension Request
FIG. 6 (formerly FIG. 10.6) TVD received
FIG. 7 (formerly FIG. 10.7) Goodbye
FIG. 8 (formerly FIG. 10.8) D/O
FIG. 9 (formerly FIG. 10.9) Next Move Screen Diagram MG OffGate
FIG. 10 (formerly FIG. 20.1) OffGate Service Options
FIG. 11 (formerly FIG. 20.2) MG OffGate Payment Option
FIG. 12 (formerly FIG. 20.3) OffGate Pay Bills
FIG. 13 (formerly FIG. 20.4) OffGate Buy
FIG. 14 (formerly FIG. 20.3.1) Pay Bills/3DAYS Toll Due
FIG. 15 (formerly FIG. 20.3.2) Pay Bills/Registration Renewal
FIG. 16 (formerly FIG. 20.3.3) Pay Bills/License Renewal
FIG. 17 (formerly FIG. 20.3.4) Pay Bills/Traffic Fines
FIG. 18 (formerly FIG. 20.4.1) Buy/Prepaid Tolls
FIG. 19 (formerly FIG. 20.4.2) Buy/Discount Tolls
FIG. 20 (formerly FIG. 20.4.3) Buy/Raffle
FIG. 21 (formerly FIG. 20.5) AP-Thank You FIG. 22 (formerly FIG. 20.6) Goodbye FIG. 23 (formerly FIG. 20.4.3.1) Buy, Raffle, Ticket Number Diagram MP DAS (Drive Around Shopping)

FIG. 24 (formerly FIG. 30.1) Welcome to Shopping Center with Directory

FIG. 25 (formerly FIG. 30.2) DIRECTORY, alphabetical order

FIG. 26 (formerly FIG. 30.2) DIRECTORY, alphabetical order

FIG. 27 (formerly FIG. 30.3) EVENTS, Top Events of the day

Figure 28:

FIG. 28 (formerly FIG. 30.4) Example of a store listed in the Directory

FIG. 29 (formerly FIG. 30.4.1) Examples of Menu Offering

FIG. 30 (formerly FIG. 30.4.2) Payment Options

FIG. 31 (formerly FIG. 30.4.3) Thank You. Transaction Approved

FIG. 32 (formerly FIG. 30.5) Example of JIT service at a dinner house

FIG. 33 (formerly FIG. 30.6) Gift/Discount Vouchers sent to VIMO

FIG. 34 (formerly FIG. 30.7) Brief Commercials to passing-by vehicles

FIG. 35 (formerly FIG. 30.8) Example of Concert Hall or Movie Theater

Diagram MP Ball Parks

FIG. 36 (formerly FIG. 51.1) Welcome to Ball Park

FIG. 37 (formerly FIG. 51.2) Remote Check-In for Prepaid Ticket

FIG. 38 (formerly FIG. 51.2.1) Eligible for valet parking

FIG. 39 (formerly FIG. 51.2.1.1) PID Entry by Valet Service

FIG. 40 (formerly FIG. 51.2.2) Join Ticket Holder

FIG. 41 (formerly FIG. 51.3) Spot Ticket Purchase on VIMO

FIG. 42 (formerly FIG. 51.3.1) Payment Options for Spot Ticket Purchase

Figure 45:
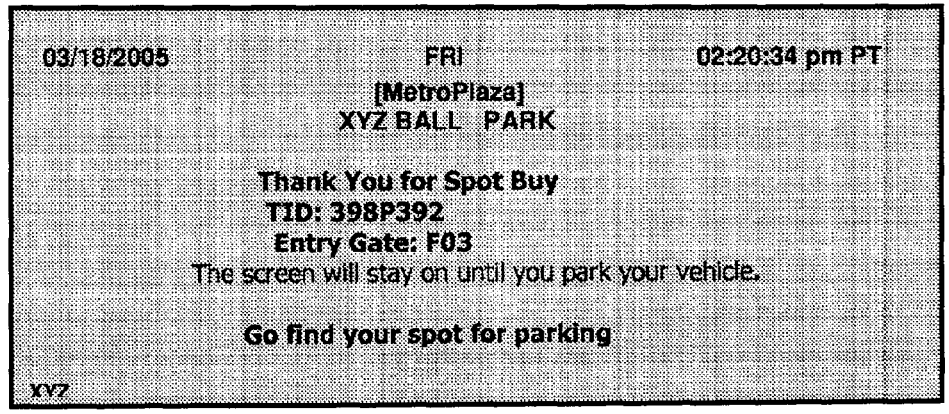
Figure 47:
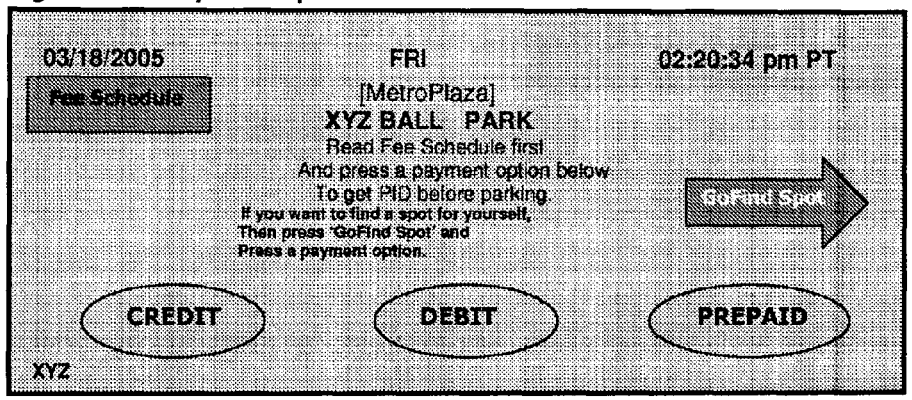

FIG. 43 (formerly FIG. 51.3.2) Thank You for Spot Buy. Transaction approved FIG. 44 (formerly FIG. 51.3.2.1) Call Ticket Holder FIG. 45 (formerly FIG. 51.5.1) GoFind Spot and Pay FIG. 46 (formerly FIG. 51.5.2) Payment Options for Parking fee FIG. 47 (formerly FIG. 51.5.2.1) Payment Option for Parking Fee (without PID)

Figure 48:
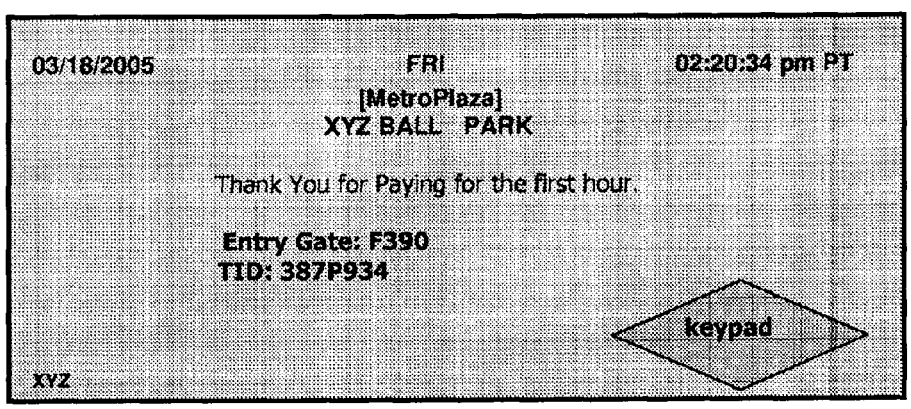

FIG. 48 (formerly FIG. 51.5.3) Thank You for Payment

Figure 49:
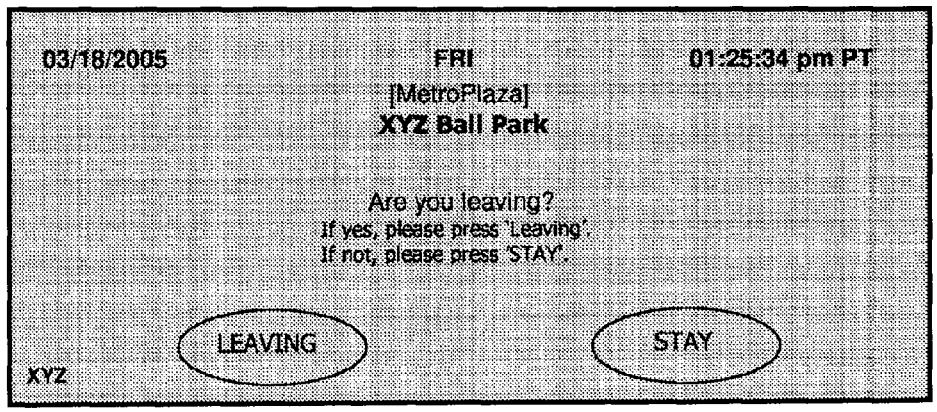

FIG. 49 (formerly FIG. 51.5.3.1) Are You Leaving

Figure 50:
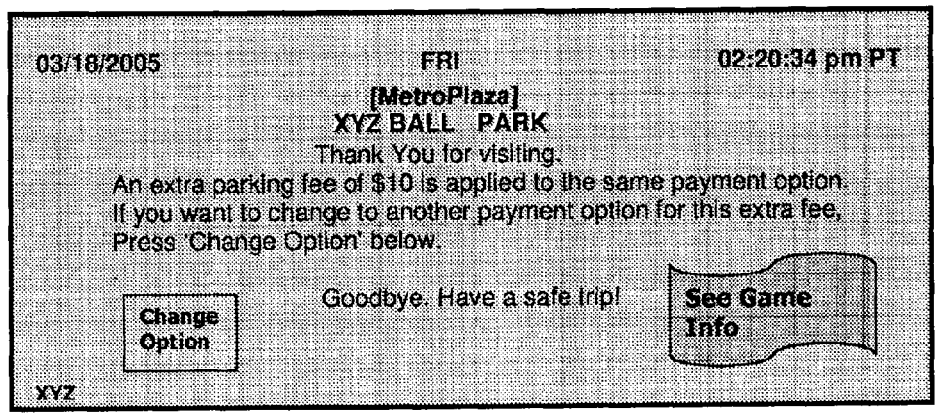

FIG. 50 (formerly FIG. 51.5.4) Goodbye & Brief Commercial

Diagram MP Public Parking

FIG. 51 (formerly FIG. 61.1) Welcome to Block Directory

FIG. 52 (formerly FIG. 61.2) Vacancy Info on Parking Garages

Figure 53:
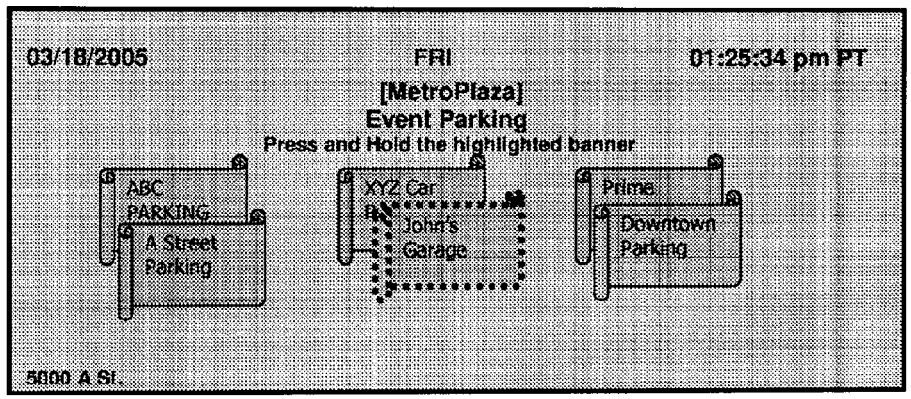

FIG. 53 (formerly FIG. 61.2.1) Event Parking Availability

Figure 54:
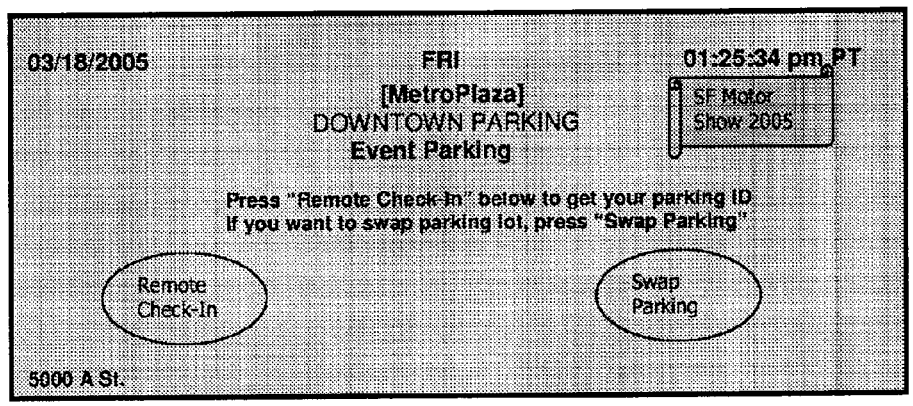

FIG. 54 (formerly FIG. 61.2.2) Event Parking Remote Check-in

Figure 55:
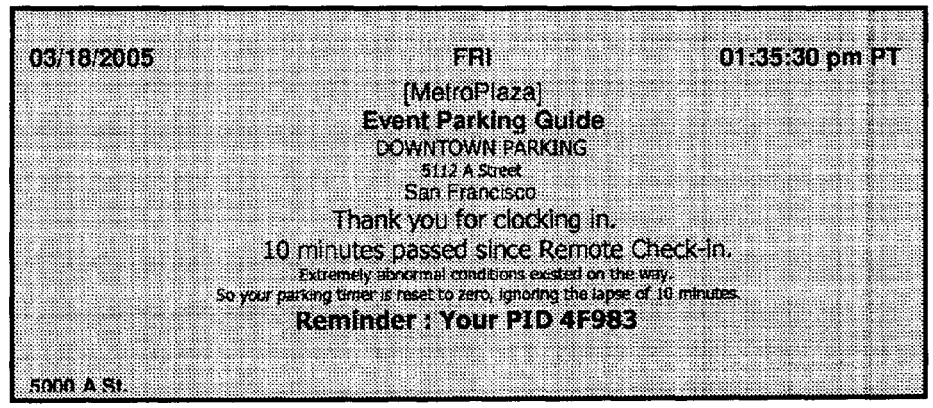

FIG. 55 (formerly FIG. 61.2.3) Clock-In for Event Parking

Figure 56:
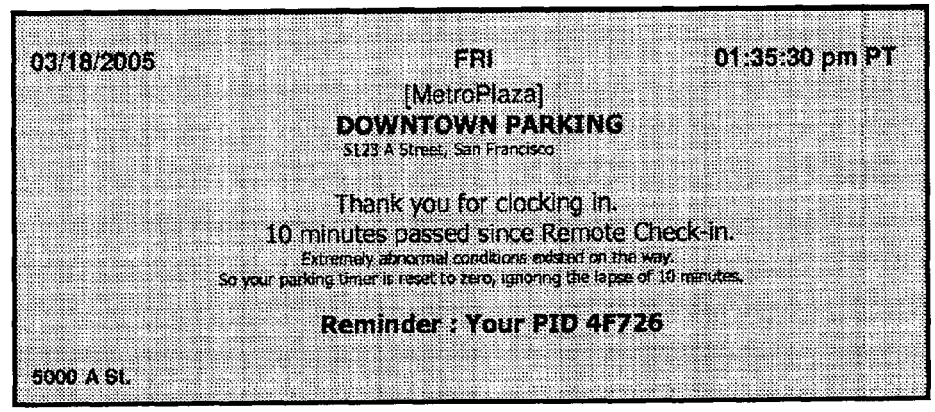

FIG. 56 (formerly FIG. 61.2.3.1) Remote Check-In for regular parking

Figure 57:
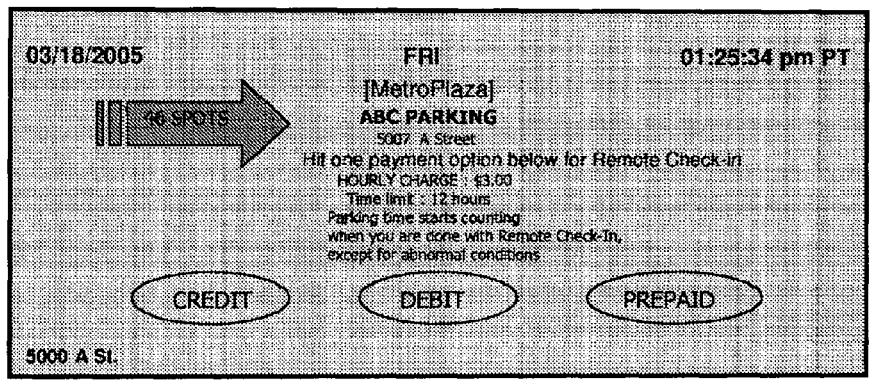

FIG. 57 (formerly FIG. 61.3) Remote Check-In for regular parking

Figure 58:
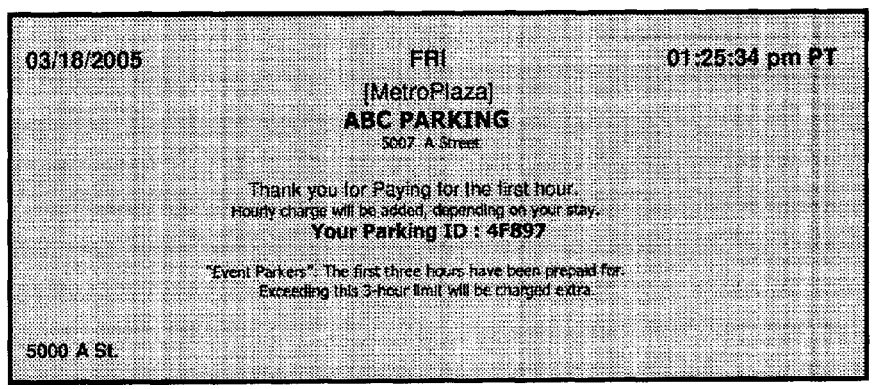

FIG. 58 (formerly FIG. 61.3.1) Thank You. Here's Parking ID

FIG. 59 (formerly FIG. 61.3.2) Match PID

FIG. 60 (formerly FIG. 61.3.2.1) Pull-In to enter PID for Spot Check-IN

FIG. 61 (formerly FIG. 61.4) Spot Check-In (Skipping Remote Check-In)

FIG. 62 (formerly FIG. 61.5) Clock-Out

FIG. 63 (formerly FIG. 61.5.1) Are You Leaving

Diagram MP Street Parking (Curbside Parking)

Figure 64:
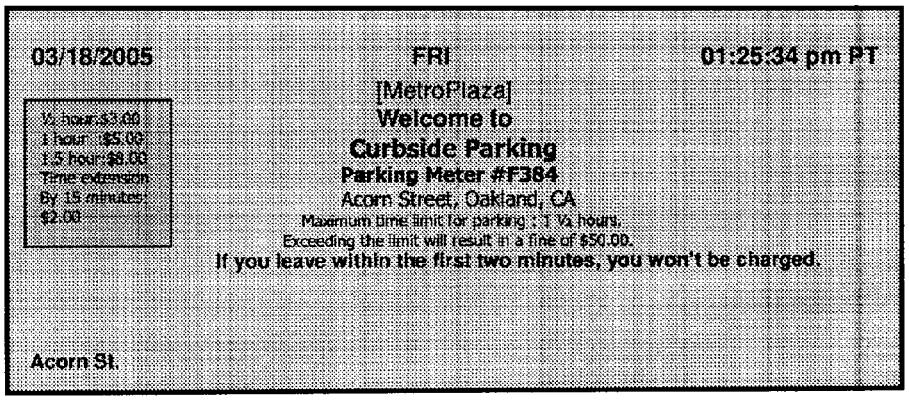

FIG. 64 (formerly FIG. 62.1) Welcome to street parking/Clock-In

Figure 65:
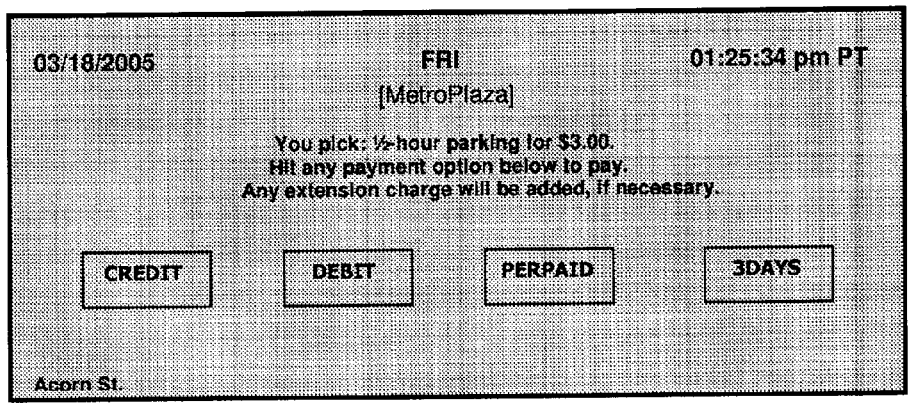

FIG. 65 (formerly FIG. 62.2) Payment Option Curb Parking

FIG. 66 (formerly FIG. 62.3) Thank you for payment

FIG. 67 (formerly FIG. 62.4) Goodbye MP Curb Parking

Diagram MP Airport Parking

FIG. 68 (formerly FIG. 63.1) Welcome to Airport

FIG. 69 (formerly FIG. 63.1.1) Prepay & Payment Options

Figure 70:
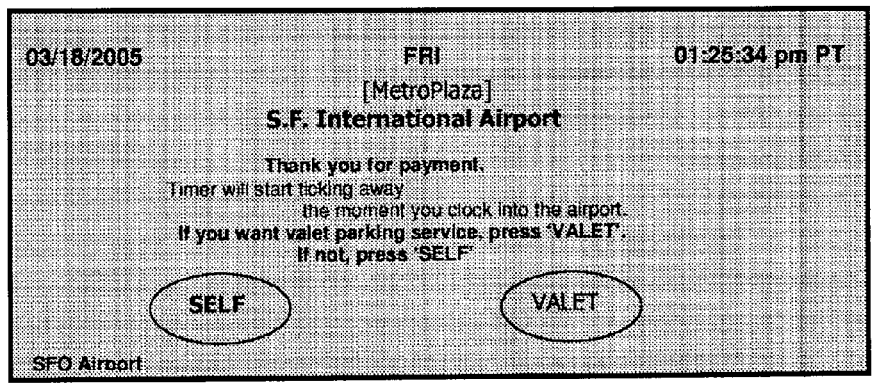

FIG. 70 (formerly FIG. 63.1.2.1) Thank you for payment Arrival

Figure 71:
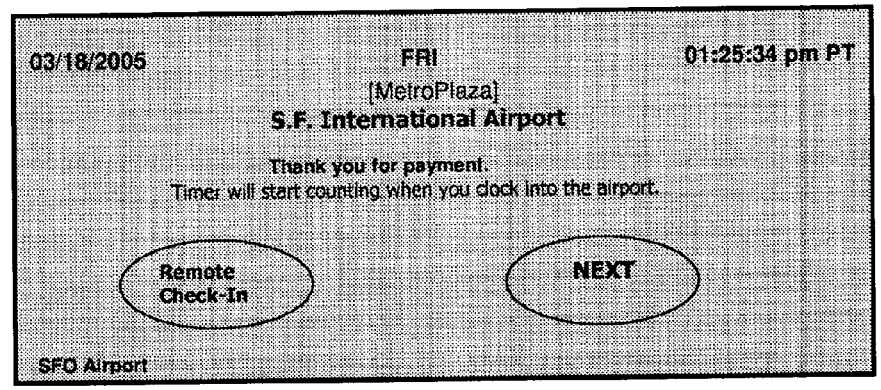

FIG. 71 (formerly FIG. 63.1.2.2) Thank you for payment Departure

Figure 72:
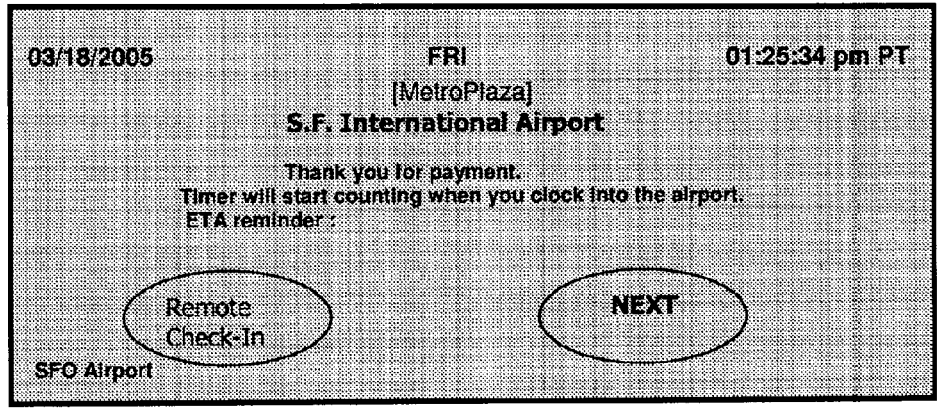

FIG. 72 (formerly FIG. 63.1.2.3) Thank you for payment Both

Figure 73:
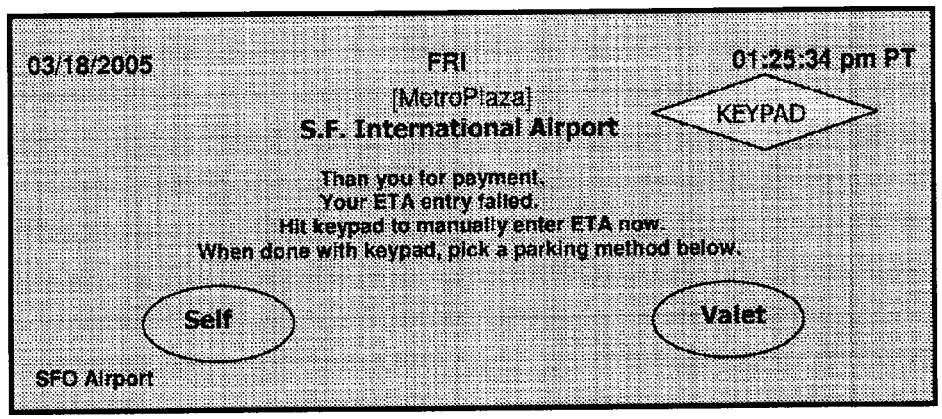

FIG. 73 (formerly FIG. 63.1.3) ETA Entry Reminder for Arrival

Figure 74:
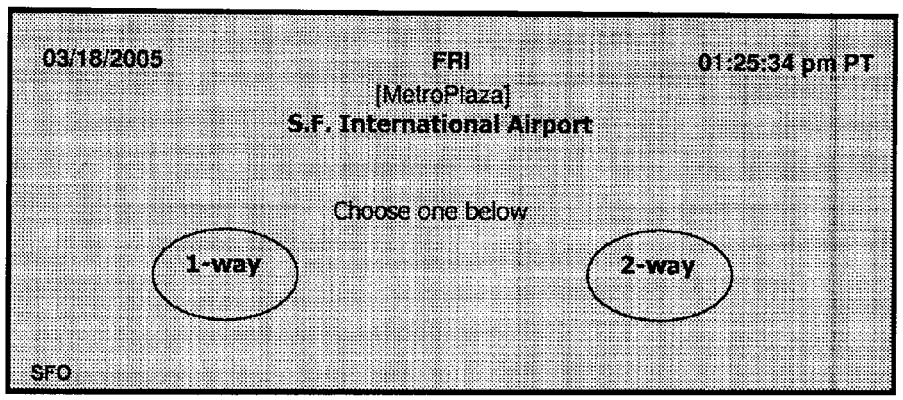

FIG. 74 (formerly FIG. 63.1.3.1) Valet Parking for Departure

Figure 75:
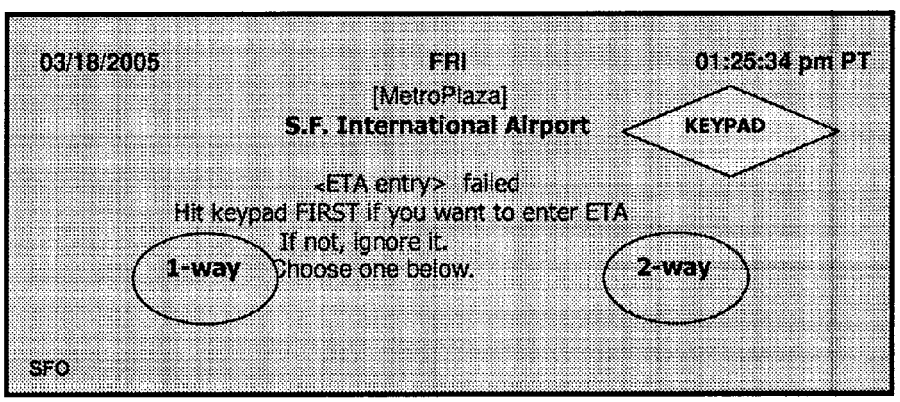

FIG. 75 (formerly FIG. 63.1.3.2) Valet Parking for BOTH

FIG. 76 (formerly FIG. 63.2) Short-Term Parking for Arrival

FIG. 77 (formerly FIG. 63.2.1) Short-Term Parking for Departure

Figure 78:
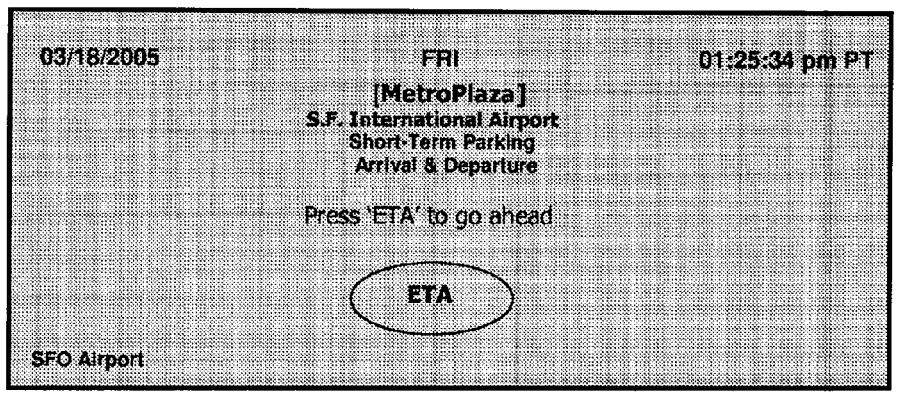

FIG. 78 (formerly FIG. 63.2.2) Short-Term Parking for BOTH

Figure 79:

FIG. 79 (formerly FIG. 63.3) Long-Term Parking

FIG. 80 (formerly FIG. 63.4) Remote Check-In

FIG. 81 (formerly FIG. 63.5.1) Return Rental Car by Self

Figure 82:
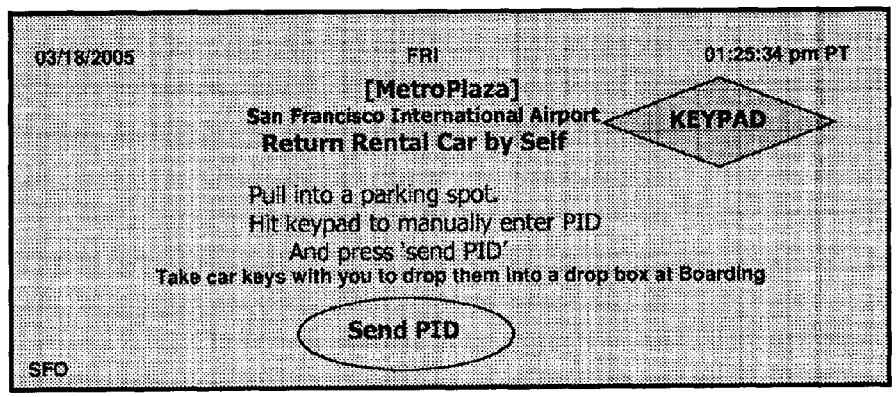

FIG. 82 (formerly FIG. 63.5.1.1) Return Rental Car by Self <Manual Entry of PID>

Figure 83:
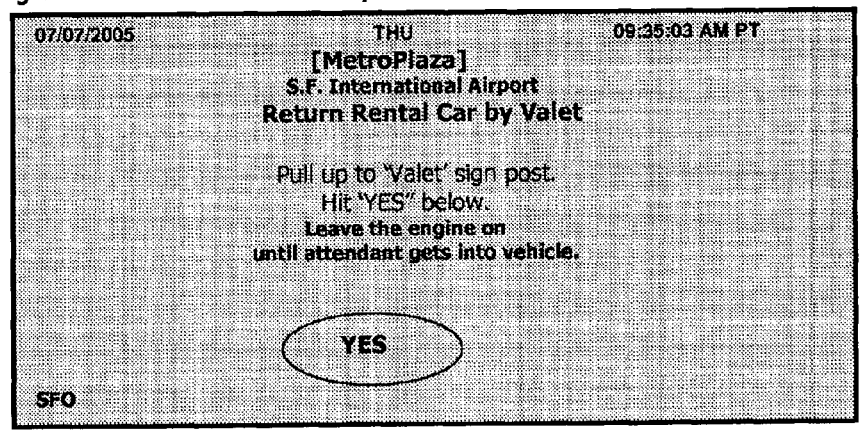

FIG. 83 (formerly FIG. 63.5.2) Return Rental Car by Valet

FIG. 84 (formerly FIG. 63.5.2.1) Rental Contract Closed

FIG. 85 (formerly FIG. 63.6) Lurking Mode

FIG. 86 (formerly FIG. 63.6.1) Enter PID

FIG. 87 (formerly FIG. 63.6.1.1) Manual Entry of PID

Figure 88:
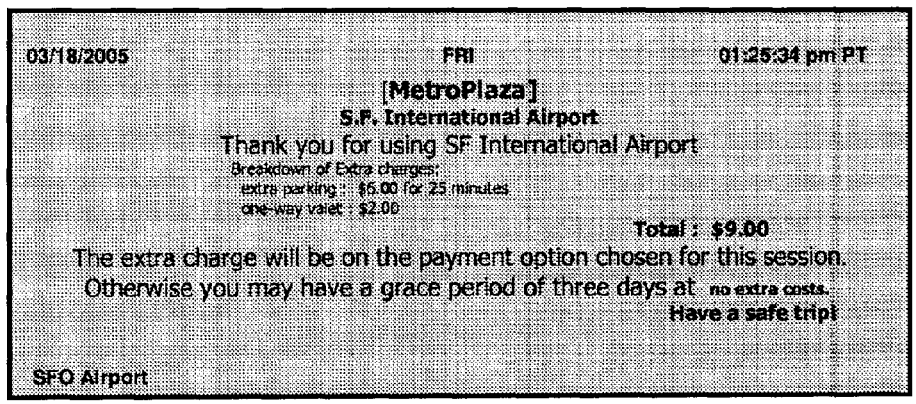

FIG. 88 (formerly FIG. 63.7) Clock-Out

Diagram MP Subway Parking

Figure 89:
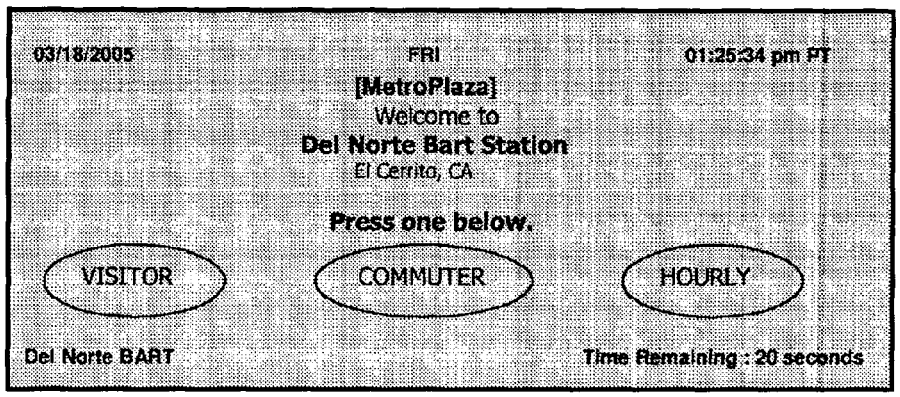

FIG. 89 (formerly FIG. 70.1) Welcome to Subway Parking

Figure 90:
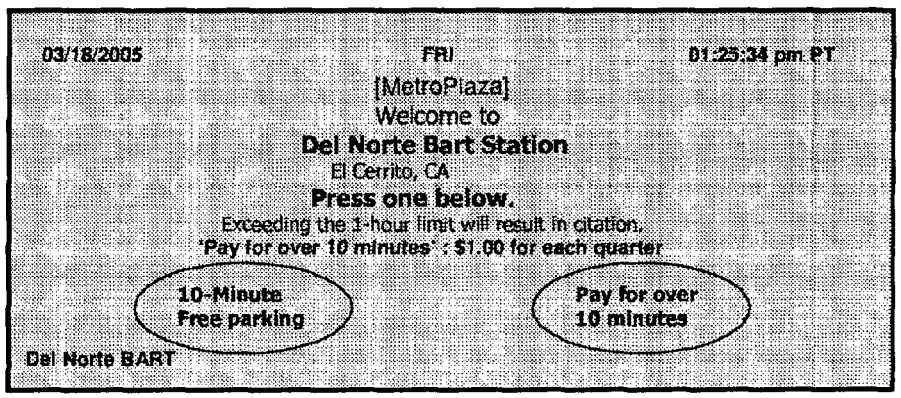

FIG. 90 (formerly FIG. 70.2) Visitors

FIG. 91 (formerly FIG. 70.2.1) Hourly Parking

FIG. 92 (formerly FIG. 70.2.2) VISITOR if exceeding 10-minute

Figure 93:
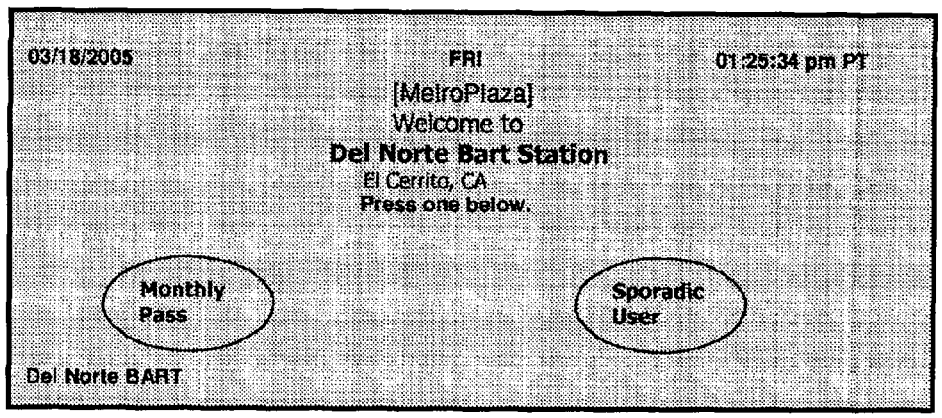

FIG. 93 (formerly FIG. 70.3) Commuters

Figure 94:
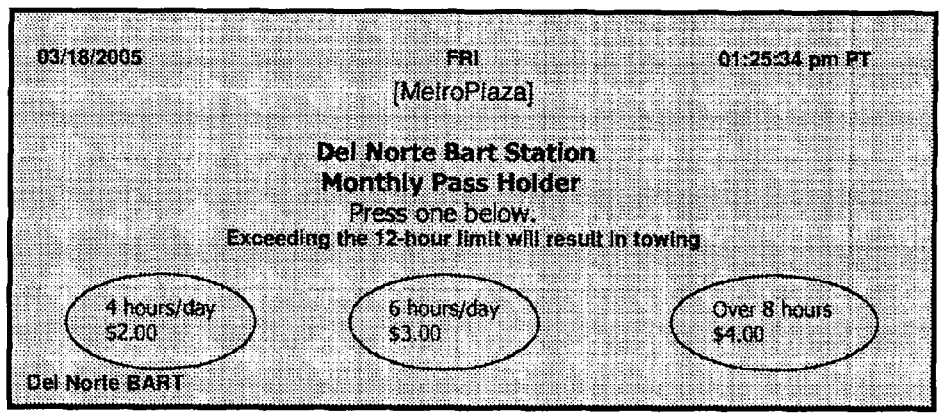

FIG. 94 (formerly FIG. 70.3.1) Monthly Pass

Figure 95:
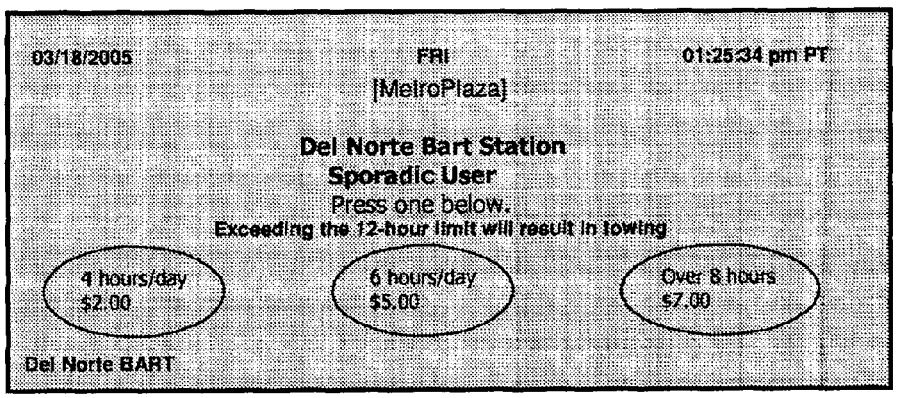

FIG. 95 (formerly FIG. 70.3.2) Sporadic User

Figure 96:
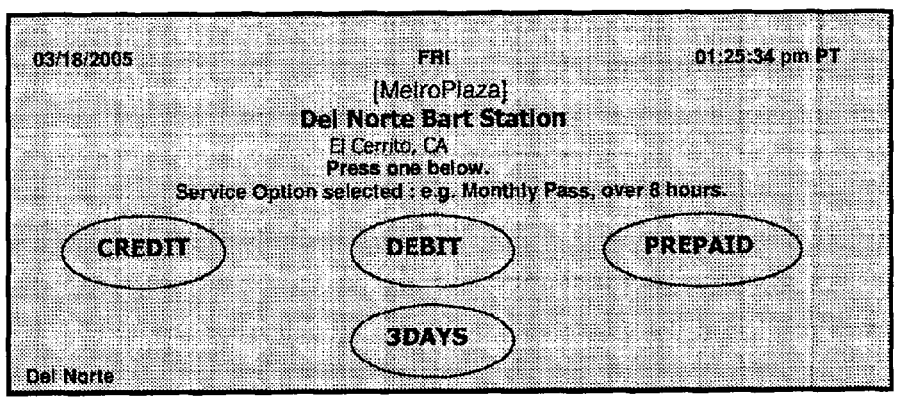

FIG. 96 (formerly FIG. 70.4) Payment Options

Figure 97:
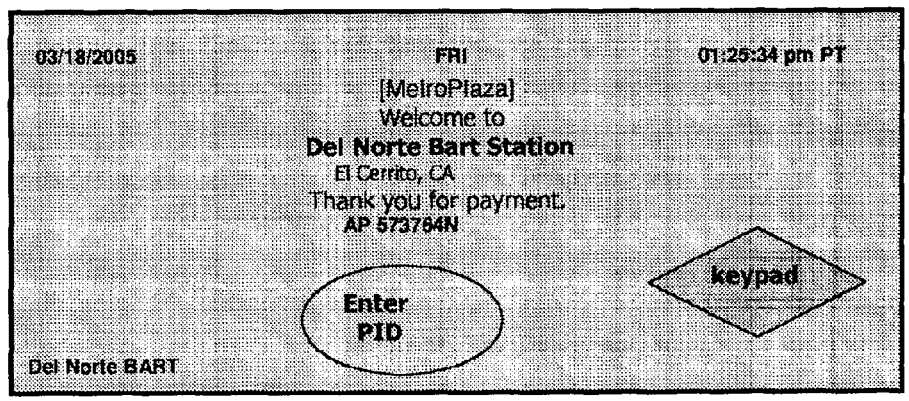

FIG. 97 (formerly FIG. 70.5) Thank You for Payment

Figure 98:

FIG. 98 (formerly FIG. 70.6) Goodbye

Diagram MP Expo Parking

FIG. 99 (formerly FIG. 80.1) Welcome to Block Directory

FIG. 100 (formerly FIG. 80.1.1) Remote Check-In to Expos <MP Expos Parking>

FIG. 101 (formerly FIG. 80.1.1) Remote Check-In to Expos <MP Expos Parking>

FIG. 102 (formerly FIG. 80.2) Vacancy Availability from the block

FIG. 103 (formerly FIG. 80.2.1) Event Parking Availability

FIG. 104 (formerly FIG. 80.2.2) Remote Check-In for Event Parking

FIG. 105 (formerly FIG. 80.2.3) Clock-In for Event Parkers MP EXPOS

FIG. 106 (formerly FIG. 80.2.4) Match PID to get TID

Figure 107:
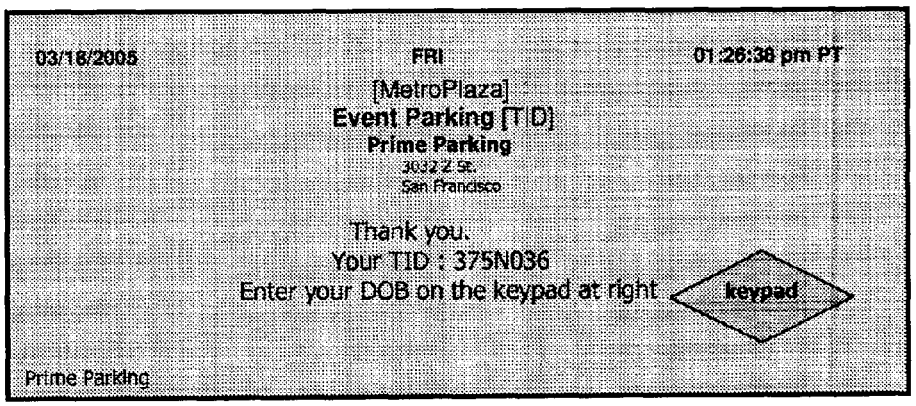

FIG. 107 (formerly FIG. 80.2.5) Your TID

Figure 108:
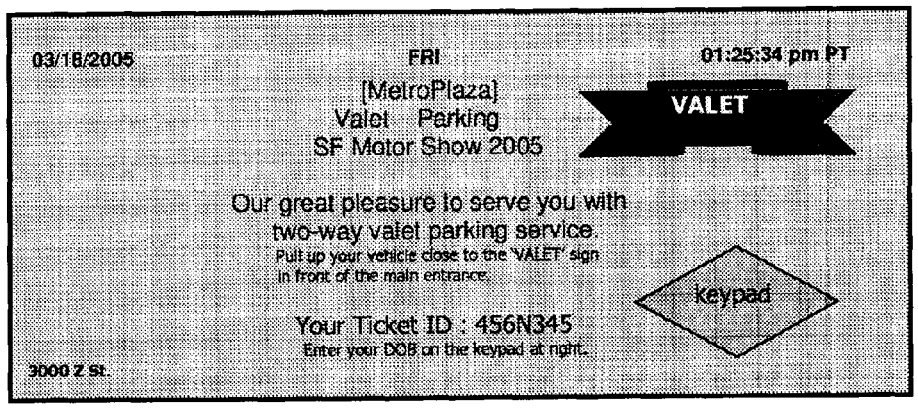

FIG. 108 (formerly FIG. 80.3) Two-Way Valet Parking

FIG. 109 (formerly FIG. 80.3.1) One-Way Valet Parking

FIG. 110 (formerly FIG. 80.3.2) Valet Service enters your PID

FIG. 111 (formerly FIG. 80.4) Parking ID

FIG. 112 (formerly FIG. 80.5) Purchase of Spot Tickets

Figure 113:
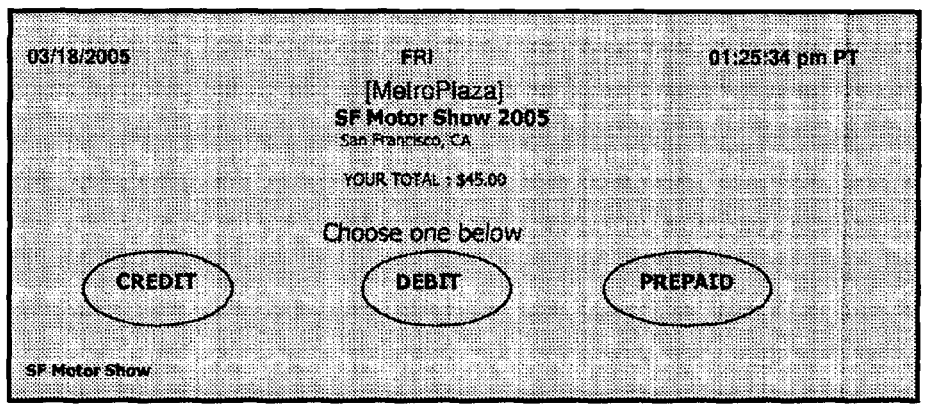

FIG. 113 (formerly FIG. 80.5.1) Payment Options for Spot Purchase

Figure 114:
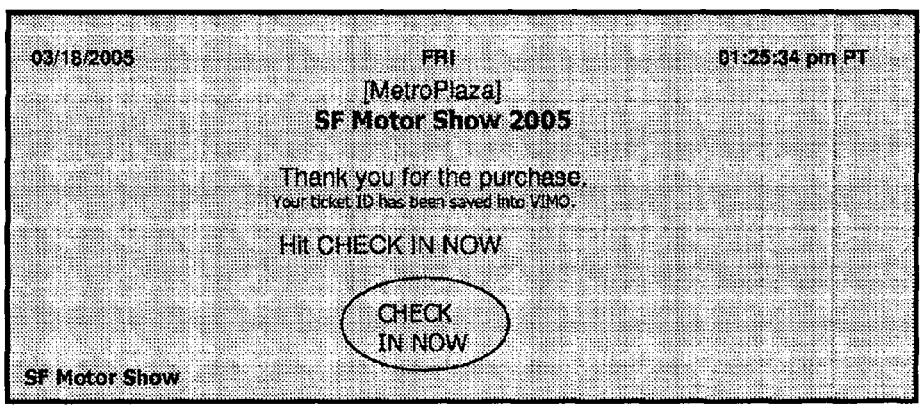

FIG. 114 (formerly FIG. 80.5.2) Thank you for Payment

Figure 115:
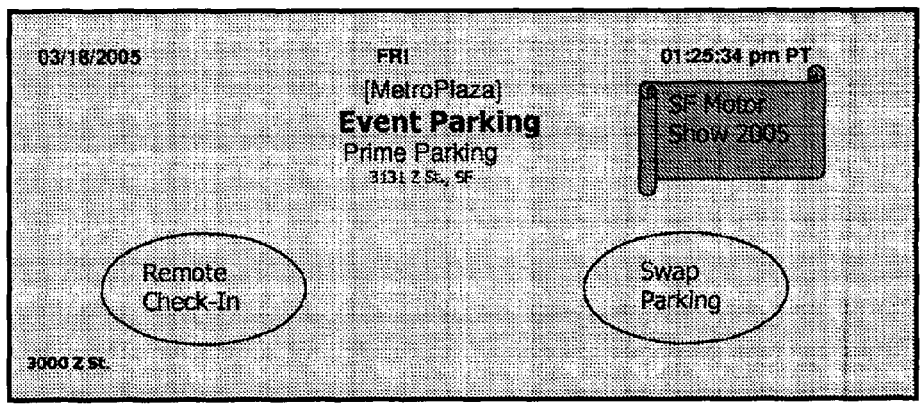

FIG. 115 (formerly FIG. 80.5.3) Remote Check-In for Spot Tickets

Figure 116:

FIG. 116 (formerly FIG. 80.6) Goodbye

Generic Diagrams

FIG. 117 (formerly FIG. 1000.1) VIMO default screen

FIG. 118 (formerly FIG. 63.0000) Keypad for DOB entry

FIG. 119 (formerly FIG. 1000.3) VLS

Figure 120:
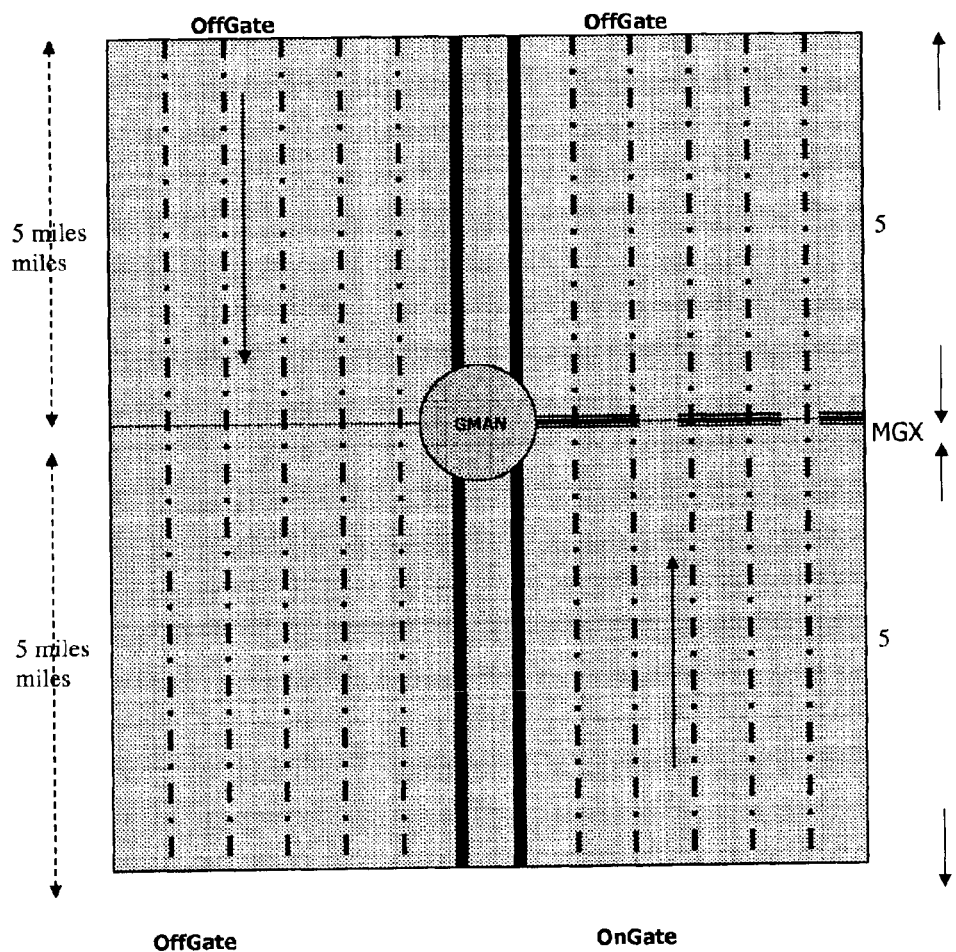

FIG. 120 (formerly FIG. 1000.0) OnGate and OffGate

Figure 121:
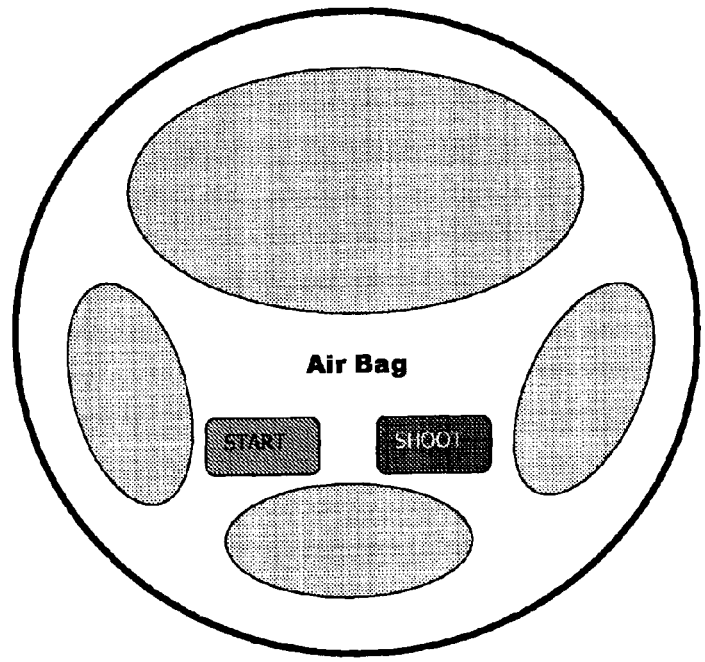

FIG. 121 (formerly FIG. 1000.2) VIMO with Voice Tags

Flowcharts

FIG. 122 (formerly FIG. 1001) MG OnGate

FIG. 123 (formerly FIG. 1002) MG OffGate

Figure 124:
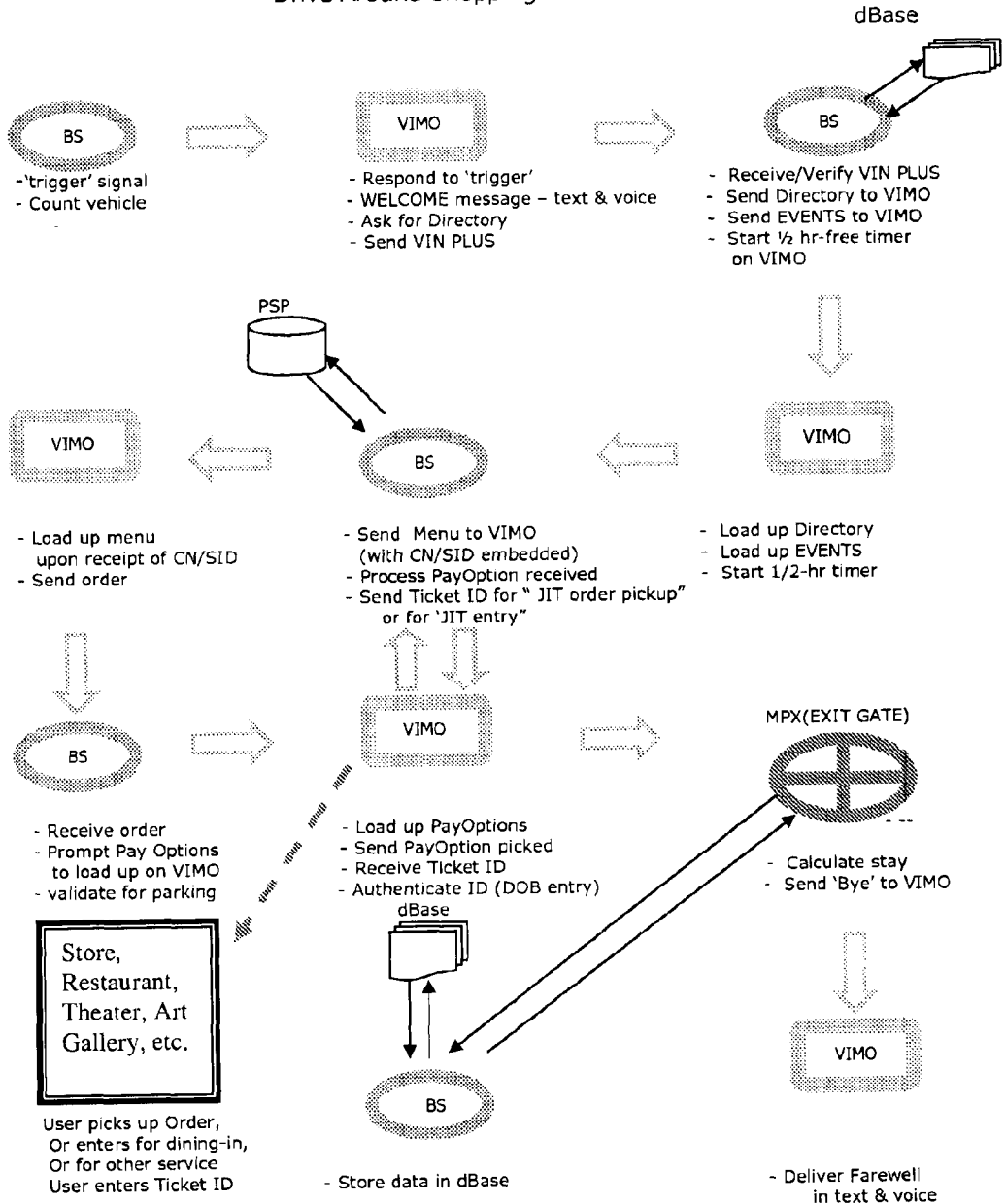

FIG. 124 (formerly FIG. 1003) MP DAS

FIG. 125 (formerly FIG. 1004) MP Ball Parks

FIG. 126 (formerly FIG. 1005) MP Public Parking

Figure 127:
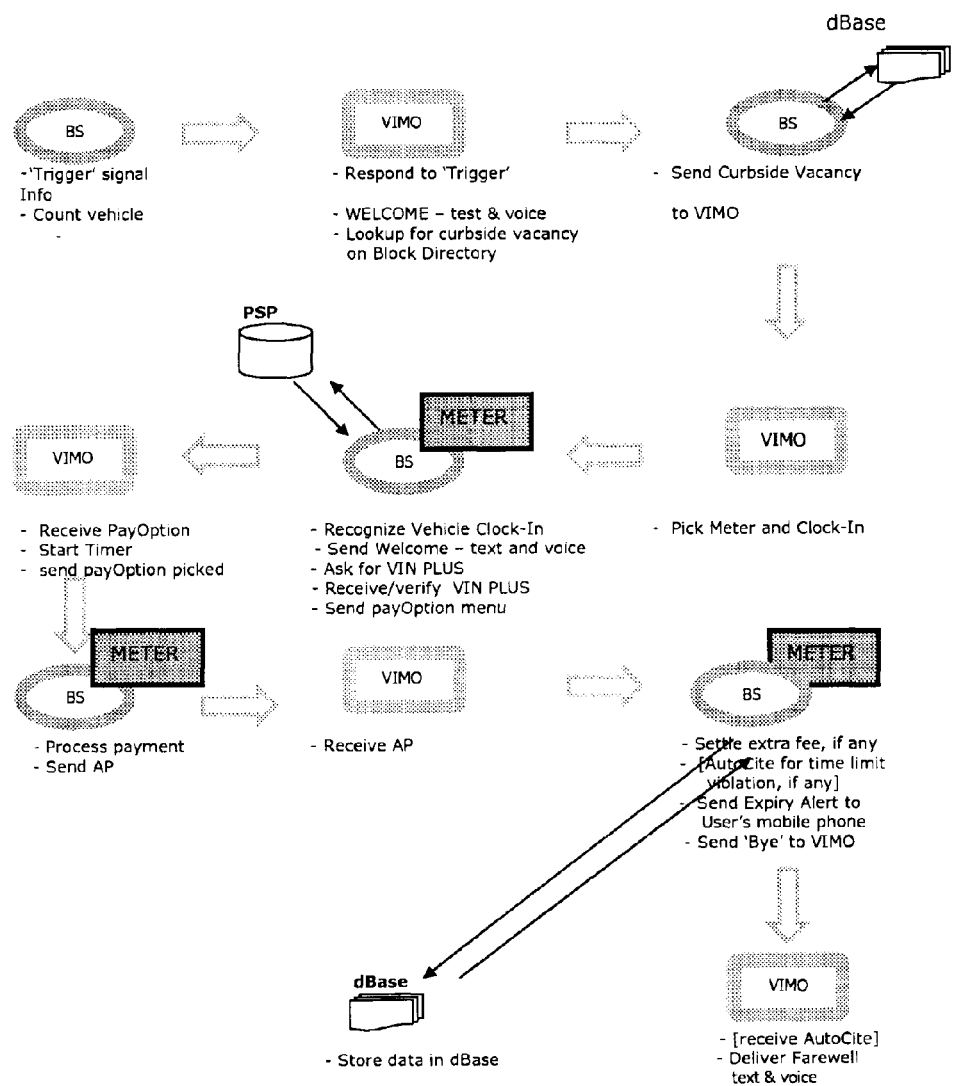

FIG. 127 (formerly FIG. 1006) MP Curb Parking

Figure 128:
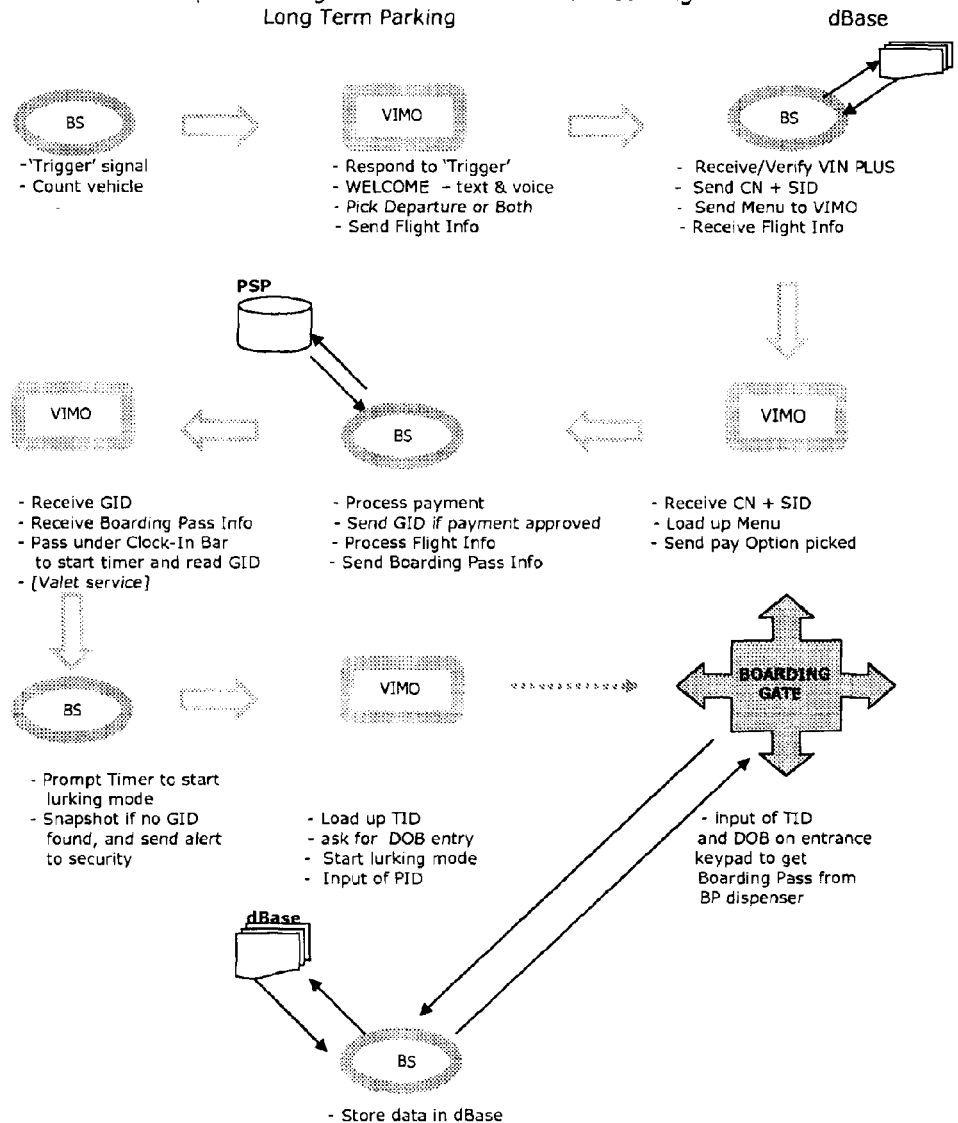

FIG. 128 (formerly FIG. 1007) MP Airport

Figure 129:
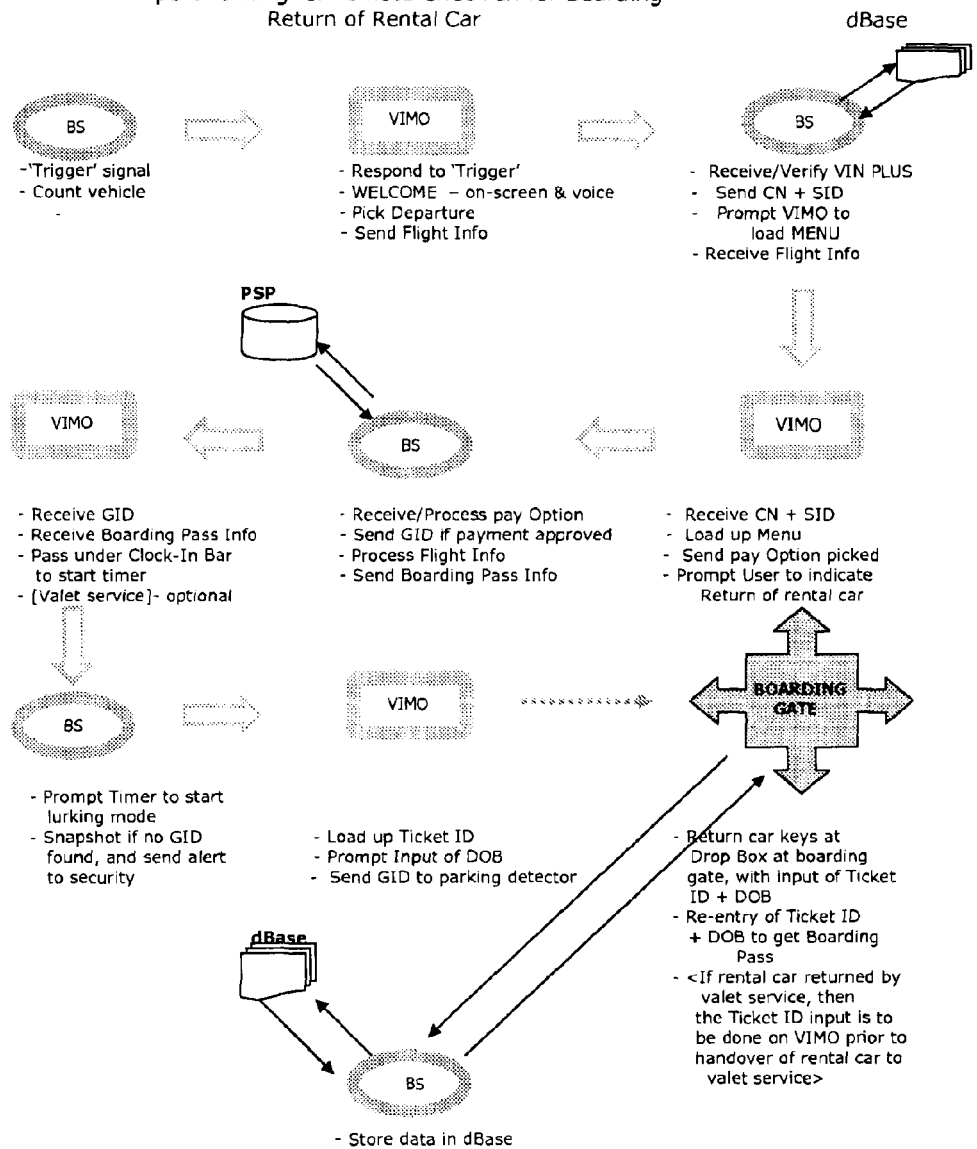

FIG. 129 (formerly FIG. 1008) MP Airport

Figure 130:
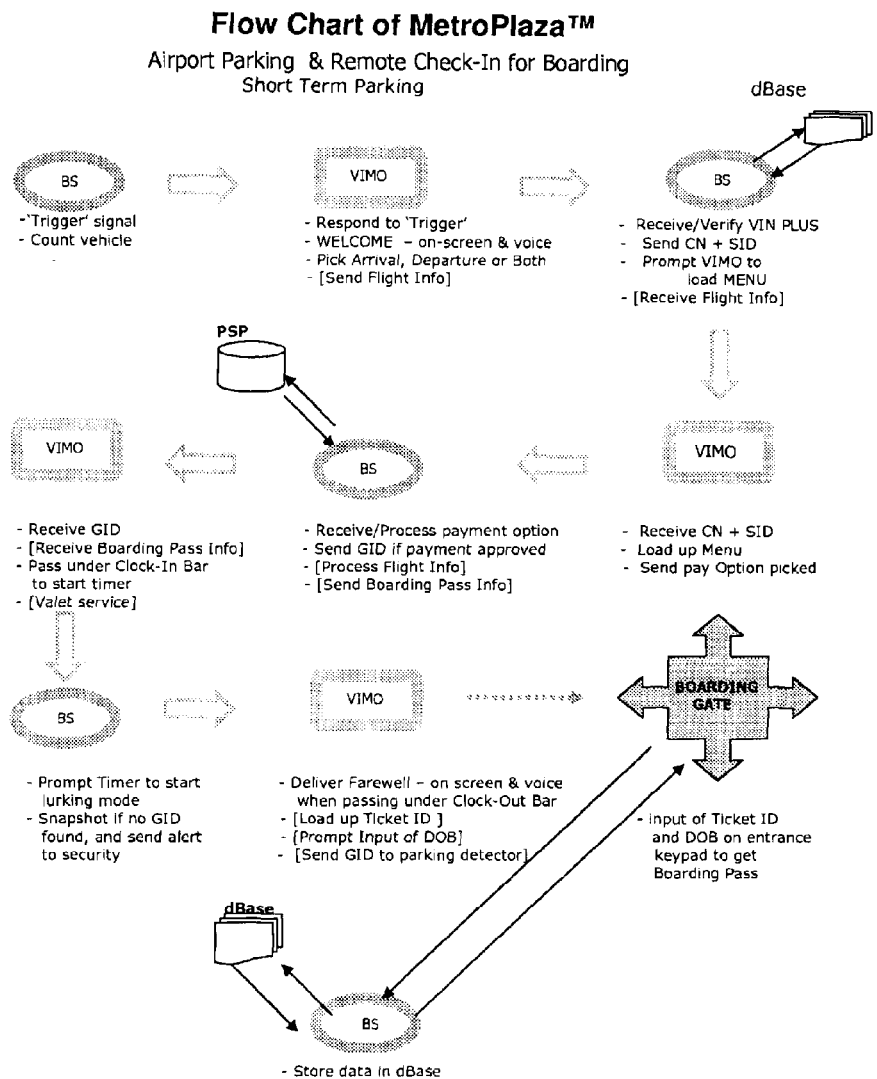

FIG. 130 (formerly FIG. 1009) MP Airport

Figure 131:
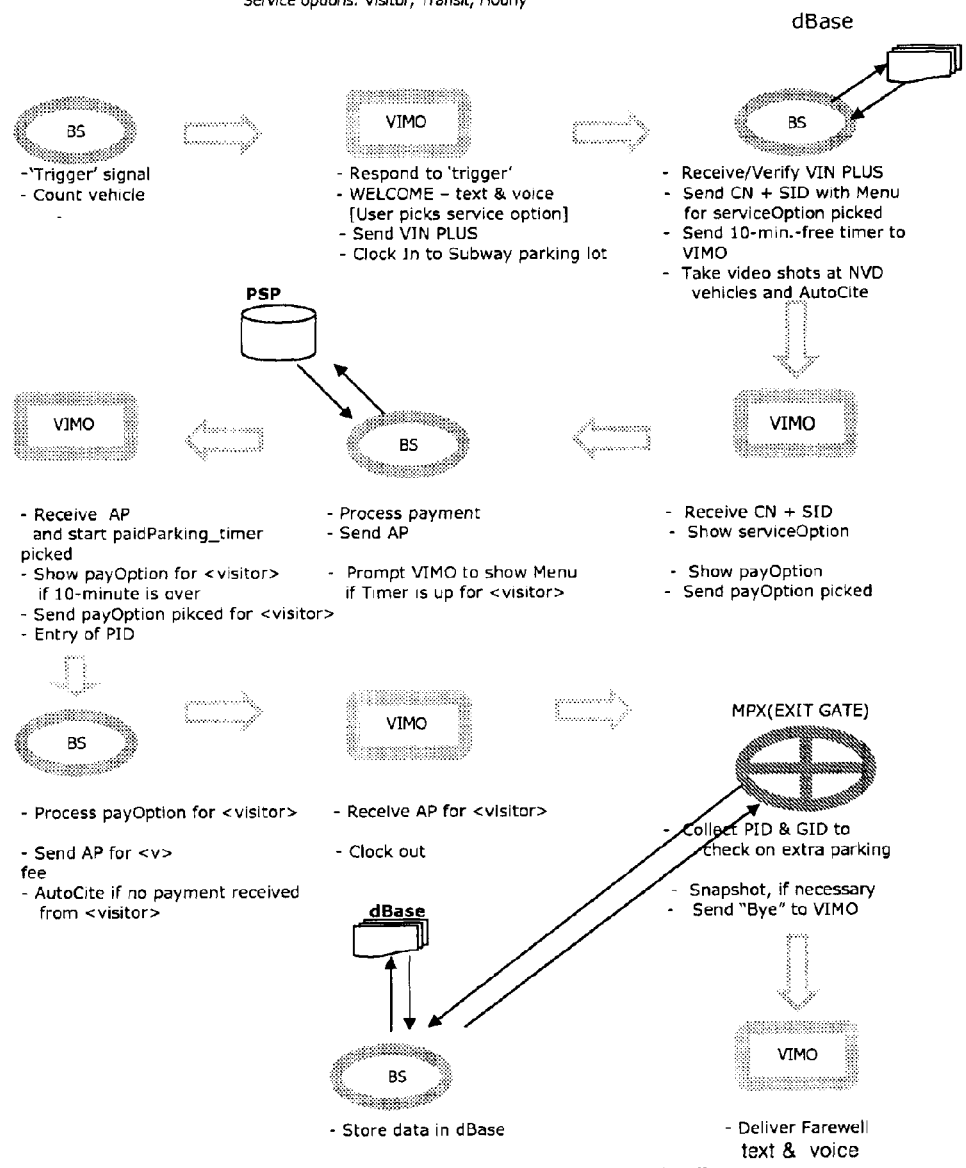

FIG. 131 (formerly FIG. 1010) MP Subway

Figure 132:
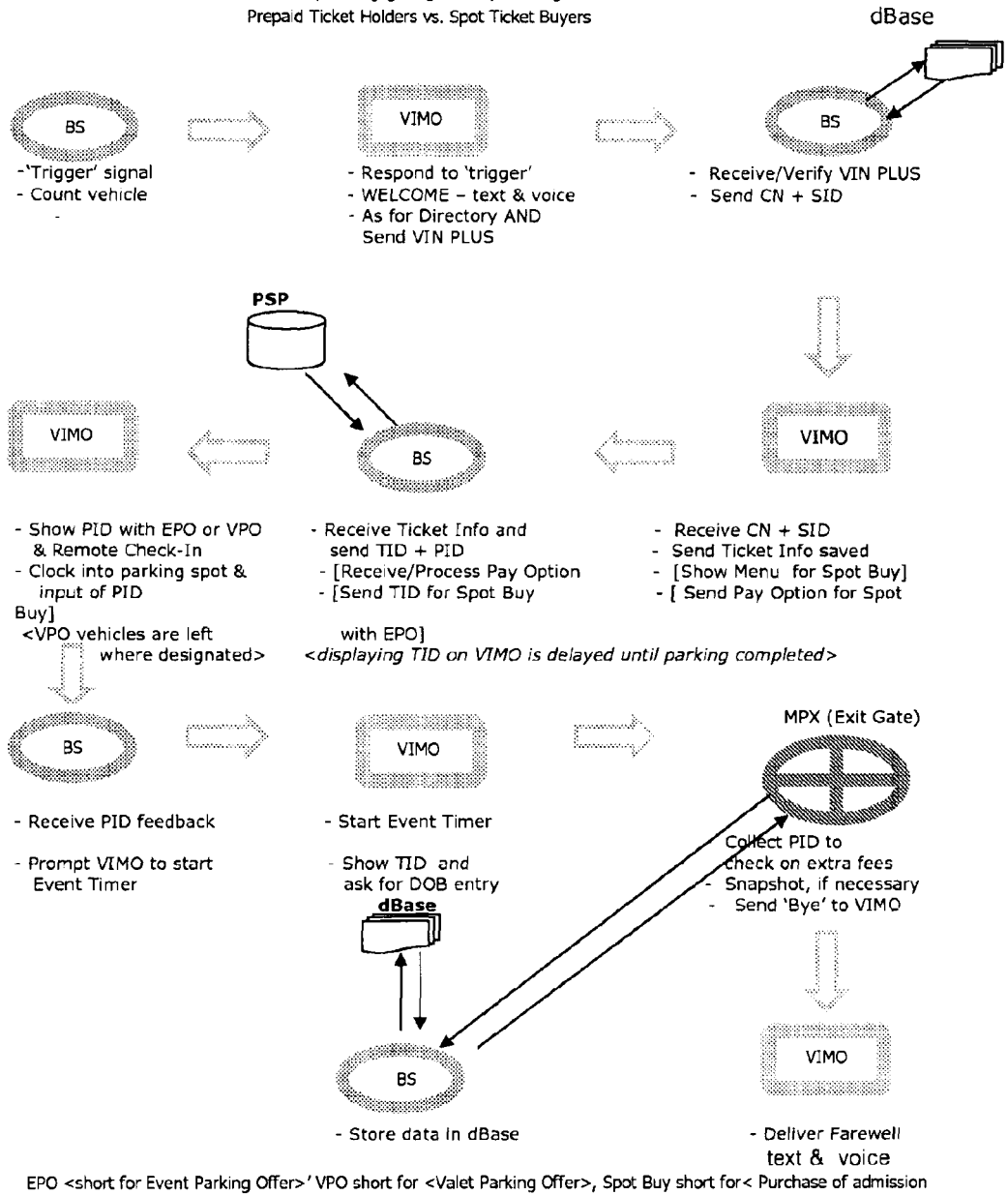

FIG. 132 (formerly FIG. 1011) MP Expos

Additional Disclosure

Figure 133:
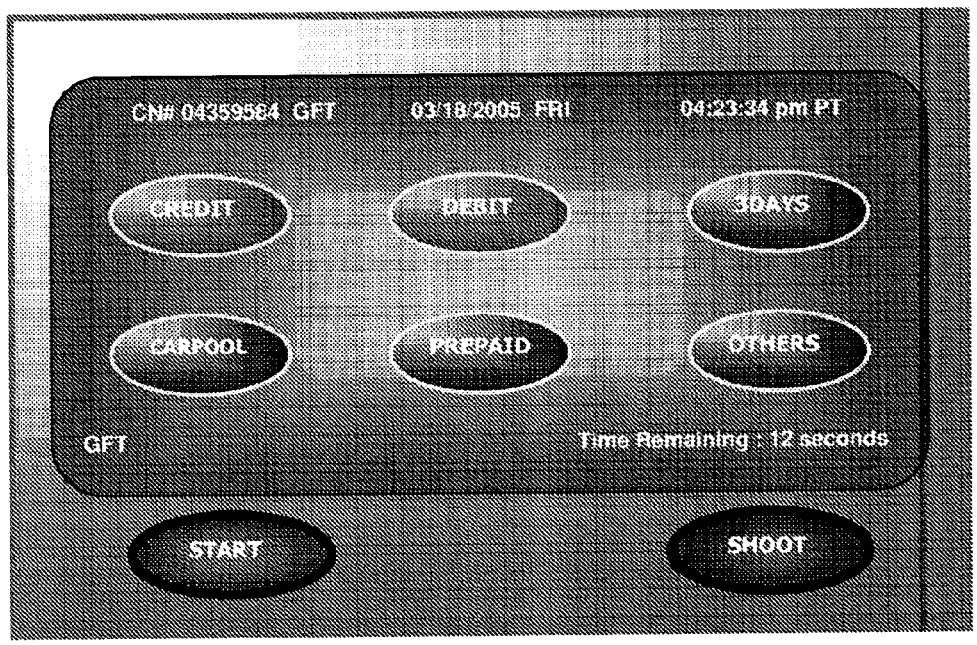

FIG. 133 (formerly FIG. 1012) DriveOnPay™ VIMO™ Payment Option Menu Screen

FIG. 134 (formerly FIG. 1013) DriveOnPay™ VIMO™ Remote Check-In for Departure and Both Departure & Arrival FIG. 135 (formerly FIG. 1014) DriveOnPay™ VIMO™ Top Events of the day <MP DAS>

FIG. 136 (formerly FIG. 1015) DriveOnPay™ VIMO™ Default Screen

FIG. 137 (formerly FIG. 1016) DriveOnPay™ VIMO™ WELCOME Screen

Figure 138:
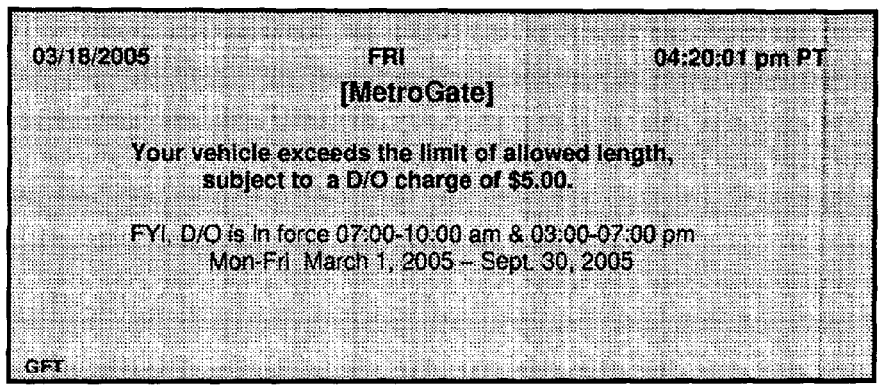

FIG. 138 (formerly FIG. 1017) Diagram for D/O

DETAILED DESCRIPTION OF THE INVENTION

The present invention, DriveOn Pay™, includes a device called VIMO, and seeks for the optimal way of fail-safe User-friendly payment-specific digital data communications between a BS (base station) and a multitude of mobile CPE (Consumer Premise Equipment) named VIMO. Simply put, VIMO utilizes a set of programmed short keys on LCD touchscreen or that of more advanced technology and two blinking off-screen buttons to receive, process, store and send data packets. The bandwidth-intensive OFDMA network technology, including WiMAX 802-16e-2005, is applicable to the invention.

VIMO measures up 7" (W)×4" (L)×½" (T) in a rectangular shape, and is fixed into the center of vehicle dashboard. VIMO is to maximize wireless payment transactions, not via the Internet, but in a random access and mass-producing way. The invention operates within a 5-mile radius of a BS with thousands of VIMO units moving at any vehicle speed of up to 80 mph or over. And it is featured with unmanned operations both on the roads and in the back offices, except for a minimum number of back-office staff.

The present invention is to accommodate multifunctional features to seek an integrity of automotive gadgetry so as to head off an excessive degree of Driver Distraction that may be the result of having too many in-vehicle gadgets and gizmos overcrowding the dashboard. GPS navigators, CD players, satellite radios, mobile TV, live traffic data feeds (audio, text, graphic and video), video games, even IM (Instant Messaging), MP3 players, other 'quad play' gadgets and call logs, may eventually be incorporated into a dashboard-mounted centerpiece in the near future in order to minimize the degree of Driver Distraction.

VIMO is already explained in the section of Glossary in Sequence Listing separately submitted, but will be redundantly explained herein. VIMO comes with two buttons at bottom, outside the LCD touchscreen, and these buttons are exclusively for use at tollgates. These two buttons, START and SHOOT, blink in red and green, respectively, when activated and ready to transmit data for vehicles and for ongoing transactions to BS, and need to be hit by a User so as to transmit the said data. Other programmed short keys come and go on the LCD screen in accordance with the proprietary menu that varies from BS to BS, and the two-way communications between a BS and a VIMO are made utilizing these short keys, instead of using any mouse or keyboard or stylus.

The START button is programmed offline with VIN PLUS (vehicle data, including vehicle ID, class, make, model, year, color, size, license number, the 17-digit VIMO ID, ownership & address, etc. Refer to said Glossary for further details). On the other hand, the SHOOT button is progressively programmed online with such dynamic data as ongoing transaction details. These two color-coded buttons are as a sort of fool-proof gimmick to deal with a moment of the highest tension and time pressure, like when passing a tollgate at a full speed.

Basically, a toll-paying process on a VIMO is a three-touch operation, provided that no trial-and-error delays are made. At a tollgate, you hit the START, and hit a payment option, and then the SHOOT. However, it can be customizable to a two-touch operation by skipping a payment option menu page. By having two pre-selected payment options work in a customized mode, you can skip the process of selecting a payment option and get rid of the reason for trial-and-error delays. The customized two-touch operation is recommended for elderly drivers and motorcyclists.

Each location-specific BS is to offer a proprietary service menu, including payment options, whereas on VIMO, a set of programmed short keys are to load up. Hitting the buttons and keys on the touchscreen enables hassle-free VPN (Virtual Private Network) sessions between a BS and a VIMO unit. On other hand, a BS is to deal with thousands of VIMO units simultaneously, point to multipoint and NLOS (Non-line of sight).

VIMO is powered by a car battery and is always on, when the engine is on. As a vehicle passes by one BS to another, the Welcome screen might differ from one another. In the next decade, every city will hopefully be topologically linked together with other cities by grids of Base Stations assigned with different spectrums of frequencies. While driving on the road, each motorist is at his or her discretion to decide to open any welcome screen on VIMO to see infomercials or do some shopping or whatsoever. In a downtown area, a whole block will be within the effective range of one or two BS, offering an integrated Block Directory, a portal guide that lists up all the stores, car parks, banks, fast food chains, restaurants, gas stations and so on. Even more, commercials targeting passing-by vehicles can only be selected at the sole discretion of motorists.

VIMO is a User-centric and menu-friendly device. Requirements of menu options might differ from BS to BS, depending on the nature of BS. For MG OnGate sessions, service itself is a single item: a fixed amount of toll, while payment options comprise Credit, Debit, Prepaid, 3DAYS, and Carpool.

On the other hand, MG OffGate sessions will require service options, like discount tolls, prepaid tolls, traffic fines, vehicle registration renewals, driver's license renewals, 3DAYS toll due, and raffle tickets, whereas payment options are limited to Credit, Debit, and Prepaid.

Basically, service options and payment options will be determined in accordance with the nature of BS. Meantime, credit cards and debit cards that can be used on VIMO are up to User's choice, not up to banks or credit card companies. On DriveOn Pay™, Users may feel free to enter or change credit and debit card information offline anytime.

The 3DAYS, as a payment option for DriveOn Pay™, is a crucial safeguard against human errors associated with payment means as mentioned in the next paragraph. The 3DAYS is an online pledge to pay a toll within 3 calendar days at a 50% surcharge, and is secured by the vehicle registration. Failure to pay within 3 days will result in a heavier penalty, and if enacted, repeated failures might result in cancellation of vehicle registration.

In the event that even a credit card or debit card cannot pay due to either User's neglect, or a bank system failure, or service interruption by banks or payment service providers, or other third-party reasons and that a motorists does not have enough cash on hand, the payment option of 3DAYS can make the motorist feel safe to pay a toll, without having to worry about payment means on hand. This safeguard is a vital function to ensure the financial integrity of the toll collection operations under any circumstances. The said payment option can be accepted at MP deployments, like airports and shopping centers, if a "roaming" arrangement is made on the condition that local toll authority has the sole responsibility of collecting 3DAYS-based payments in exchange for getting a monopoly of the 50% surcharge. The 3DAYS option will hopefully be used at airports, subway stations, and other car parks to pay parking fees, but not for shopping.

Unlike the prepaid account linked to RFID technology (FasTrak or EZPass), a Prepaid Toll account for DriveOn Pay™ requires no set minimum to be automatically debited from a motorist's bank account or credit card. Instead, Prepaid Toll accounts allow Users to buy any amount of prepaid tolls in units or in lump sum on the spot. In addition, a User can buy Prepaid Tolls in volume at a decent discount. Any surcharge refunds will be credited to said Prepaid Toll account as well.

More important, this Prepaid Toll account is an integral part of Differential Toll that is intended to regulate anticipated traffic surges for traffic flow optimization purposes. Under the said system, if an extra toll of $5.00 is collected in addition to a regular toll of $4.00 during anticipated traffic surges and is later refunded to eligible commuters biweekly, then non-commuters will tend to voluntarily avoid those traffic surge hours on that route.

To enable this Differential Toll system to work, a 100% refund of the said extra toll collected from commuters will be credited to their Prepaid Toll account as credit vouchers (CV), instead of costlier and complicated ways of crediting their bank accounts or mailing checks to them. Generating these credit vouchers will not only save the overheads and labor involved, but also will solidify local toll authority's fund pool as well.

In addition, if the Prepaid Toll account is utilized for "roaming" from one BS to another, it will create a huge potential of becoming cyber cash or e-cash all across the spectrum of JIT e-commerce on the Go.

DriveOn Pay™ envisions ticket-free admissions to ball parks, concerts, theaters, car parks, expos and trade shows. Ticket-free boarding at airports, while skipping time-consuming and tedious security checks, is also possible. Currently, the Frequent Flyer program calls for prior registration of biometrics data of flight passengers so they can be waived from security checks, but this type of biometric authentication system has a lot of drawbacks, including regular costly updates, injury-caused reading failures, accidental misreading and illegal copying, just to name a few. DriveOn Pay™ will provide a more solid and cost-saving authentication system free of biometrics data.

DriveOn Pay™ will greatly contribute toward saving labor costs in every sector of economy in a more constructive manner. Tollbooth attendants, tollgate back-office manpower, parking enforcement attendants, car park attendants, security guards at transportation hubs, and even event crews will be wholly displaced or significantly reduced.

VCN (Video Capture Number) is generated in two different ways: time-based VCN and SID-based VCN. NVD vehicles (Refer to Glossary in Sequence Listing) are given time-based VCN. VD (Vehicle Dossier) without VCN attached will be nullified. Under the current toll collection system, payments are processed and finalized at the same time when passing a tollbooth.

On the other hand, DriveOn Pay™ enables thousands of vehicles to get payment authorizations simultaneously but at random, but requires each authorized transaction to be finalized serially while passing MGX equipped with video cameras. Theoretically, about 4,400 vehicles within a 5-mile radius of a 6-lane GMAN tollgate can pay tolls simultaneously, given an average speed of 80 mph, and based on other hypothetical assumptions.

Though DriveOn Pay™ is scalable to more than 6 lanes, a deployment scenario for over 6 lanes is not economically feasible. FYI, some tollgates have more than 13 lanes now, but the number will be reduced to 6, if a GMAN tollgate is implemented. Currently, vehicles approaching the 13-booth tollgates are to diverge to e.g. 13 lanes and then have to converge to 4 to 6 lanes right after passing. The vicious cycle of 'diverge and converge' can cause a lot of traffic snarls, slowdowns, stop and even accidents.

Theoretically, DriveOn Pay™ can collect tolls from 1,684, 600 vehicles per day on a 6-lane GMAN tollgate. It compares with the current toll collection system, under which a maximum of 112,320 vehicles can pay tolls per day on a 13-lane tollgate, like SF Bay Toll Plaza. Theoretically, DriveOn Pay™ can improve the current speed of toll collection by a factor of 32.5.

In the meantime, the chances are that some vehicles already done with the toll-paying process on VIMO may happen to exit through a nearby off-ramp before passing MGX, due to personal emergency or other reasons. These vehicles have not caused to generate any VCN, and therefore their payments already authorized will be nullified without having to do some redundancy of giving a refund.

The video data for the following vehicles will be sent to and stored in database:
1) NVD vehicles
2) Vehicles that claimed carpool eligibility 3) Private vehicles whose measured lengths, including loads and trailers, happen to exceed the registered vehicle lengths, even after deducting some allowable buffer length, like one meter or less.

To effectuate the D/O, a differential toll system for oversized private vehicles, a vehicle length scanner utilizing a lane-wide light curtain of infrared beam is installed for each lane at MGX (See FIG. 100.7). Time-specific and route-specific enforcements of this D/O system are recommended. For instance, D/O can be enforced on specific routes Monday through Friday during rush hours, like 07:00-10:00 a.m. and 03:00-07:00 p.m., aimed at encouraging voluntary restraints on driving oversized private vehicles on those specific routes during specific days and hours.

Naturally, at the end of each session with each VIMO, the finalized VD will be sent to dBase and archived there for further data mining purposes. Meantime, VIMO will display "Goodbye" on the screen, right after passing through MGX. Alternatively, a motorist who has taken an option of "rollover to OffGate session" to pay a 3DAYS toll due today will be on OffGate screen right after passing by MGX, while VIMO still delivers "Goodbye" in voice.

GMAN's session-independent routines include settling credit and/or debit card transactions by hourly batch closing. Such other routines include tallying up of traffic counts and real-time traffic data broadcasting plus target-specific multicasting of traffic data feeds.

To expand the operational space for MG OffGate sessions within a 5-mile radius of GMAN, the 5-mile stretch after MGX and the 10-mile stretch in the opposite direction of travel are allocated for OffGate sessions (See FIG. 100.8). OffGate sessions will likely help motorists' last-minute efforts to pay vehicle-related bills, in addition to giving them a timely on-the-road reminder as well as a good chance of buying discount tolls and prepaid tolls. To help find extra funding sources, OffGate session may be further utilized to encourage motorists to buy some raffle tickets on VIMO for special on-the-road fundraising events (See FIG. 10.2).

To enable JITeCGO (JIT e-Commerce On the Go), TID (Ticket ID) and 8-digit DOB as an authentication code are an integral part of this new e-Commerce domain. Another major ingredient is the criteria for a hierarchy of displaying the EVENT banners on the VIMO screen.

The hierarchy of showing the on-screen commercials in MP DAS sessions are to be set out by the following criteria:

Pay per replacement hierarchy:
If an EVENT banner is pressed, then it will go off the screen, while pressing and holding said banner will get a user and/or driver to a proprietary menu offering by an ad sponsor. When this banner is zapped off the screen, then there comes a replacement popping up from another frame. This replacement hierarchy will be a basis for a differential ad rate as well. (Refer to FIG. 30.4 Top Events of the Day <MP DAS>)

Meantime, if you want to flip the entire frame to see another frame, you can press 'FLIP' key on VIMO screen. When frame is flipped over by User, the replacement frame does not come in the regular rotating order (RRO), but is shown in the ERO (Exceptional Rotating Order), which will be set independently of RRO. ERO is supposed to interrupt the scheduled run of RRO one time at each flip.

The differential rates may be applicable, depending on whether to replace
1) banner
2) frame.

This specification is largely focused on tollgate operations, but it should be noted that further mode-specific but complementary information not elaborated herein, and location-specific computer-programming instructions plus detailed definition of self-created acronyms directly associated with this invention are provided in the flowcharts, drawings, glossary and pseudocodes separately submitted herewith, so far as different operational modes for airports, public parking, shopping centers, and other fee-collecting locations are concerned.

What is claimed is:

1. A method for performing wireless payment of road tolls from a vehicle, the method comprising:
   performing, by a computer system (which is not a mobile phone and is located inside a vehicle), all of the steps comprising:
   receiving an initial communication from a base station comprising an indication of a road toll amount required to be paid;
   receiving an input from a user inside the vehicle to transmit partially encrypted vehicle data to the base station, wherein the partially encrypted vehicle data comprises license plate number, make, model, year, and color;
   transmitting the partially encrypted vehicle data to the base station;
   receiving a control code, a session ID code, and menu data from the base station, in response to the base station having located data in a database which matches the partially encrypted vehicle data;
   displaying, on a screen of the computer system, the control code and a payment option menu, wherein the payment option menu comprises credit, debit, 3 days (which is a pledge to pay a toll within three calendar days with a surcharge), carpool, and prepaid; and not displaying, on the screen of the computer system, the session ID code;
   receiving an input from a user inside the vehicle to select a payment option from the payment option menu and transmit the payment option to the base station;
   transmitting the payment option to the base station, thereby authorizing payment of the road toll amount required to be paid, the payment to be made via the user-selected payment option;
   receiving, from the base station, an approval code;
   displaying the approval code on the screen of the computer system;
   creating an electronic document, the contents of the electronic document based at least in part on the control code and the approval code;
   receiving an input from a user inside the vehicle, within a predetermined time period after the electronic document is ready for transmission, to select to transmit the electronic document to the base station;
   transmitting the electronic document to the base station before the vehicle passes the tollroad gate for which the payment of the road toll amount was authorized;
   receiving a Gate ID code from the base station before the vehicle passes the tollroad gate for which the payment of the road toll amount was authorized; and
   transmitting the Gate ID code to the tollroad gate for which the payment of the road toll amount was authorized;
   wherein the control code, the session ID code, and the approval code are each based at least in part on an English-language alphabetical character representing one of the 24 hours in a day, a number representing a time interval within the one of the 24 hours, and a number representing a time within the time interval;

wherein the computer system is powered by a battery of the vehicle; and wherein the road toll amount required to be paid is based at least in part on anticipated traffic levels on the tollroad for which the road toll amount is paid.

2. A computer system for performing wireless payment of road tolls from a vehicle, the computer system comprising:

a processor; and a memory, communicatively coupled to the processor;

wherein the computer system is configured to perform a method comprising:

performing, by the computer system (which is not a mobile phone and is located inside a vehicle), all of the steps comprising:

receiving an initial communication from a base station comprising an indication of a road toll amount required to be paid;

receiving an input from a user inside the vehicle to transmit partially encrypted vehicle data to the base station, wherein the partially encrypted vehicle data comprises license plate number, make, model, year, and color;

transmitting the partially encrypted vehicle data to the base station;

receiving a control code, a session ID code, and menu data from the base station, in response to the base station having located data in a database which matches the partially encrypted vehicle data;

displaying, on a screen of the computer system, the control code and a payment option menu, wherein the payment option menu comprises credit, debit, 3 days (which is a pledge to pay a toll within three calendar days with a surcharge), carpool, and prepaid; and not displaying, on the screen of the computer system, the session ID code;

receiving an input from a user inside the vehicle to select a payment option from the payment option menu and transmit the payment option to the base station;

transmitting the payment option to the base station, thereby authorizing payment of the road toll amount required to be paid, the payment to be made via the user-selected payment option;

receiving, from the base station, an approval code;

displaying the approval code on the screen of the computer system;

creating an electronic document, the contents of the electronic document based at least in part on the control code and the approval code;

receiving an input from a user inside the vehicle, within a predetermined time period after the electronic document is ready for transmission, to select to transmit the electronic document to the base station;

transmitting the electronic document to the base station before the vehicle passes the tollroad gate for which the payment of the road toll amount was authorized;

receiving a Gate ID code from the base station before the vehicle passes the tollroad gate for which the payment of the road toll amount was authorized; and transmitting the Gate ID code to the tollroad gate for which the payment of the road toll amount was authorized;

wherein the control code, the session ID code, and the approval code are each based at least in part on an English-language alphabetical character representing one of the 24 hours in a day, a number representing a time interval within the one of the 24 hours, and a number representing a time within the time interval;

wherein the computer system is powered by a battery of the vehicle; and wherein the road toll amount required to be paid is based at least in part on anticipated traffic levels on the tollroad for which the road toll amount is paid.

3. A non-transitory computer-readable medium storing computer software which, upon execution by a computer system, causes the computer system to perform a method for performing wireless payment of road tolls from a vehicle, the method comprising:

performing, by the computer system (which is not a mobile phone and is located inside a vehicle), all of the steps comprising:

receiving an initial communication from a base station comprising an indication of a road toll amount required to be paid;

receiving an input from a user inside the vehicle to transmit partially encrypted vehicle data to the base station, wherein the partially encrypted vehicle data comprises license plate number, make, model, year, and color;

transmitting the partially encrypted vehicle data to the base station;

receiving a control code, a session ID code, and menu data from the base station, in response to the base station having located data in a database which matches the partially encrypted vehicle data;

displaying, on a screen of the computer system, the control code and a payment option menu, wherein the payment option menu comprises credit, debit, 3 days (which is a pledge to pay a toll within three calendar days with a surcharge), carpool, and prepaid; and not displaying, on the screen of the computer system, the session ID code;

receiving an input from a user inside the vehicle to select a payment option from the payment option menu and transmit the payment option to the base station;

transmitting the payment option to the base station, thereby authorizing payment of the road toll amount required to be paid, the payment to be made via the user-selected payment option;

receiving, from the base station, an approval code;

displaying the approval code on the screen of the computer system;

creating an electronic document, the contents of the electronic document based at least in part on the control code and the approval code;

receiving an input from a user inside the vehicle, within a predetermined time period after the electronic document is ready for transmission, to select to transmit the electronic document to the base station;

transmitting the electronic document to the base station before the vehicle passes the tollroad gate for which the payment of the road toll amount was authorized;

receiving a Gate ID code from the base station before the vehicle passes the tollroad gate for which the payment of the road toll amount was authorized; and transmitting the Gate ID code to the tollroad gate for which the payment of the road toll amount was authorized;

wherein the control code, the session ID code, and the approval code are each based at least in part on an English-language alphabetical character representing one of the 24 hours in a day, a number representing a time interval within the one of the 24 hours, and a number representing a time within the time interval;

wherein the computer system is powered by a battery of the vehicle; and wherein the road toll amount required to be paid is based at least in part on anticipated traffic levels on the tollroad for which the road toll amount is paid.

\* \* \* \* \*